(12) United States Patent
Chang

(10) Patent No.: US 9,793,977 B2
(45) Date of Patent: Oct. 17, 2017

(54) SYSTEMS FOR RECOVERY COMMUNICATIONS VIA AIRBORNE PLATFORMS

(71) Applicant: SPATIAL DIGITAL SYSTEMS, INC., Agoura Hills, CA (US)

(72) Inventor: Donald C. D. Chang, Thousand Oaks, CA (US)

(73) Assignee: Spatial Digital Systems, Inc., Agoura Hills, CA (US)

(*) Notice: Subject to any disclaimer, the term of this patent is extended or adjusted under 35 U.S.C. 154(b) by 0 days.

(21) Appl. No.: 15/485,193

(22) Filed: Apr. 11, 2017

(65) Prior Publication Data

US 2017/0222712 A1    Aug. 3, 2017

Related U.S. Application Data

(63) Continuation of application No. 13/778,175, filed on Feb. 27, 2013, now Pat. No. 9,621,254.

(51) Int. Cl.
*H04B 7/185* (2006.01)
*H04W 4/22* (2009.01)
*H04W 72/04* (2009.01)
*H04W 84/12* (2009.01)

(52) U.S. Cl.
CPC ..... *H04B 7/18504* (2013.01); *H04B 7/18506* (2013.01); *H04B 7/18513* (2013.01); *H04W 4/22* (2013.01); *H04W 72/0453* (2013.01); *H04W 84/12* (2013.01)

(58) Field of Classification Search
CPC .......................... H04B 1/0483; H04B 7/18506
See application file for complete search history.

(56) References Cited

U.S. PATENT DOCUMENTS

| | | | | |
|---|---|---|---|---|
| 6,931,232 B1* | 8/2005 | Wolcott | ............. | H04B 7/18502 342/353 |
| 8,983,682 B1* | 3/2015 | Peeters | ................ | B64C 39/024 244/190 |
| 2002/0049055 A1* | 4/2002 | Matthews | .......... | H04B 7/18506 455/431 |
| 2002/0056111 A1* | 5/2002 | Hamlin | .................... | H04N 7/18 725/76 |
| 2003/0164794 A1* | 9/2003 | Haynes | ................ | H04B 1/7172 342/353 |

(Continued)

*Primary Examiner* — Dung B Huynh

(57) ABSTRACT

A communications system for providing recovery communication service to users in a coverage area affected by an emergency disruption of normal communication services. The system comprises a ground hub serving as a gateway to terrestrial networks including a dispatch center and configured to communicate with at least three mobile airborne platforms roving over the coverage area via respective feeder-links in a Ku or Ka band. A first mobile airborne platform communicates in a first frequency band with emergency workers that are working in the coverage area and associated with the dispatch center. A second mobile airborne platform communicates, in place of at least one disrupted base station in the coverage area, with user mobile phones in mobile phone frequency bands or user personal devices in WiFi bands located in the coverage area. A third mobile airborne platform generates real-time imaging of surfaces located in the coverage area.

19 Claims, 28 Drawing Sheets

(56) References Cited

U.S. PATENT DOCUMENTS

| | | | | |
|---|---|---|---|---|
| 2004/0253951 | A1* | 12/2004 | Chang | H04B 7/18506 |
| | | | | 455/431 |
| 2006/0114324 | A1* | 6/2006 | Farmer | G01S 7/003 |
| | | | | 348/144 |
| 2007/0112705 | A1* | 5/2007 | Mardirossian | H04B 7/18504 |
| | | | | 706/21 |
| 2008/0042897 | A1* | 2/2008 | Ghaleb | G01S 13/003 |
| | | | | 342/354 |
| 2008/0081556 | A1* | 4/2008 | Robinson | H04B 7/18519 |
| | | | | 455/12.1 |
| 2009/0098850 | A1* | 4/2009 | Deaton | H04B 7/18506 |
| | | | | 455/404.1 |
| 2011/0010025 | A1* | 1/2011 | Eu | G01S 5/0027 |
| | | | | 701/2 |
| 2012/0050525 | A1* | 3/2012 | Rinner | G06T 7/0028 |
| | | | | 348/117 |

\* cited by examiner

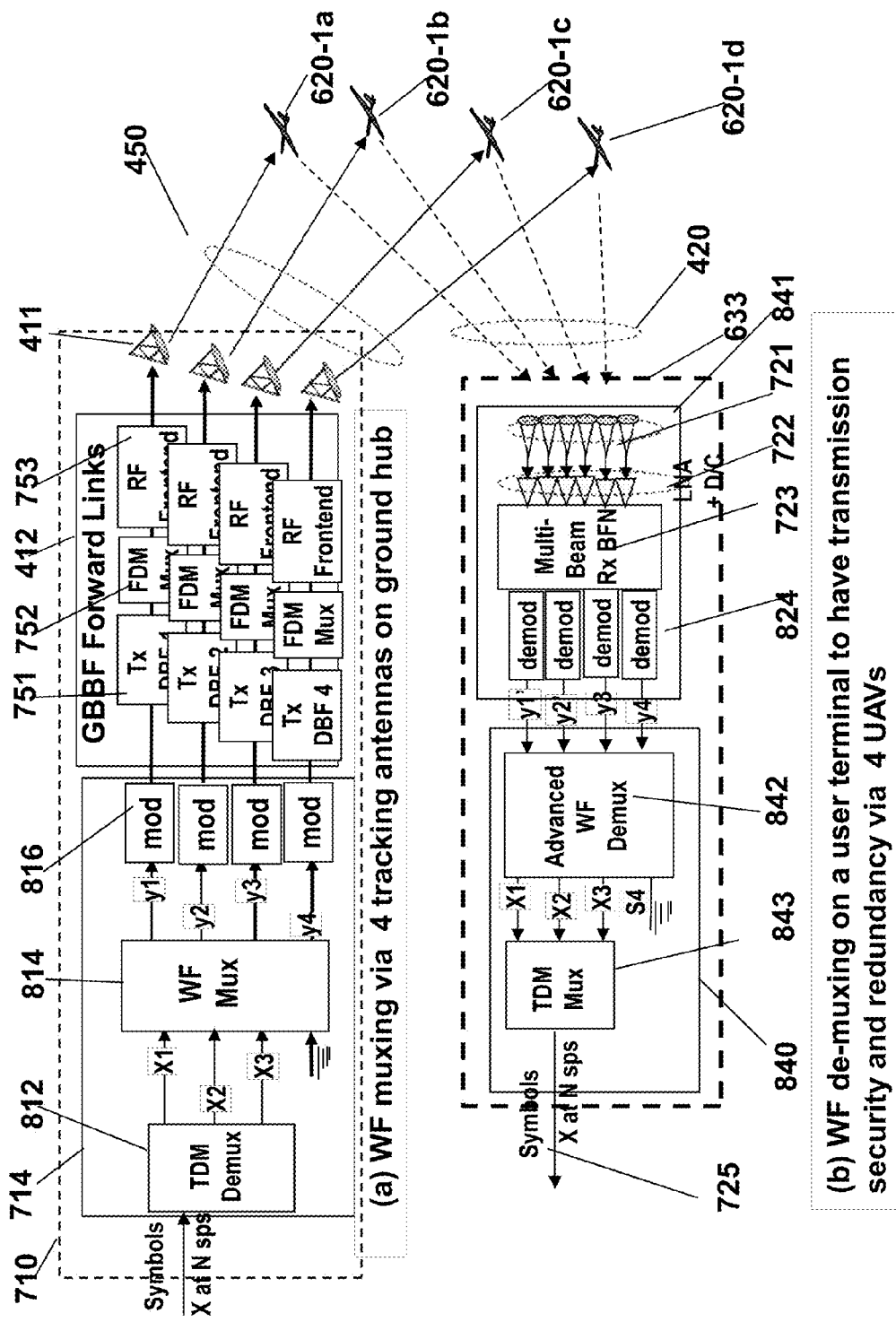

**Forward and return links
with non-coherent data delivery
by WF muxing / demuxing techniques
via 4 UAVs concurrently**

| Original data | 1, 2, 3, 4, 5, 6, 7, 8, 9, 10, 11, 12, | | |
|---|---|---|---|
| Delivery of data via multiple air borne platforms concurrently | | | |
| Air-plaforms | Method 1 | Method 2 | Method 3 |
| UAV 1 | 1, 5, 9 | 10, 26, 42 | 6, 15, 24, 33 |
| UAV 2 | 2, 6, 10 | -2, -2, -2 | 2, 5, 8, 11 |
| UAV 3 | 3, 7, 11 | -4, -4, -4 | 0, 3, 6, 9 |
| UAV 4 | 4, 8, 12 | 0, 0, 0 | -4, -7, -10, -13 |
| | Multibeam Terminal 1 | Multibeam Terminal 2 | Multibeam Terminal 3 |
| Availability | all 4 UAVs | all 4 UAVs | 3 out of 4 UAVs |
| Recovered Data | 1, 2, 3, 4, 5, 6, 7, 8, 9, 10, 11, 12, | | |

Fig. 8c

WF muxing for feeder links Calibration

SYSTEMS FOR RECOVERY COMMUNICATIONS VIA AIRBORNE PLATFORMS

CROSS REFERENCE TO RELATED APPLICATIONS

This application is a continuation of U.S. patent application Ser. No. 13/778,175, filed on Feb. 27, 2013, entitled "Communications Architectures Via UAV". This application is related to U.S. patent application Ser. No. 13/623,882, filed on Sep. 21, 2012, entitled "Concurrent Airborne Communication Methods and Systems", now U.S. Pat. No. 8,767,615, issued on Jul. 1, 2014; and U.S. patent application Ser. No. 13/778,171, filed on Feb. 27, 2013, entitled "Multi-Channel Communication Optimization Methods and Systems", now U.S. Pat. No. 9,596,024, issued on Mar. 14, 2017, both of which are incorporated herein by reference in their entireties.

TECHNICAL FIELD

This disclosure describes exemplary embodiments on improving the operation and use of airborne communication methods and systems such as through concurrent data delivery with redundancy and privacy ranking and related calibration. The present invention relates to smart antenna methods on UAVs providing emergency and disaster communications services for the rescue teams and the community in a disaster area. There are two sets of payloads; one in foreground to interface with users and the other in the background, connecting to a gateway which may communicate with other communications infrastructures.

BACKGROUND

When disasters happen, many terrestrial infrastructures including cell phones and Internet services become less functional. For emergency and disaster recovery systems, there are needs for real time communications to residents, and rescue workers in disaster areas. It is also important for access of surveillances (videos and images) data over the areas. Unmanned Aerial Vehicle (UAVs) will be very useful tools for these peaceful missions. The proposed systems with three real time functions require for peaceful missions;
1. An ad hoc communications network for local residents, operating in commercial cell phone bands, and/or Wifi bands
2. An ad hoc communications network for rescue works, operating in emergency bands, and
3. Communications from air mobile surveillance platforms for videos and images to a central hub.

It is possible to perform all three functions in a large UAV. However, each of the functions may be performed and/or supported by a small UAV. In some embodiments, limits on communications payloads on an UAV may be allocated; such as ~20 Kg in weight, and 200 W power consumptions, and mission flight time of 12 hours at altitudes at least above the "terrestrial weather" initially. It may also be preferred that the UAVs fly above 5 Km in altitudes.

There are four technologies in architectures for emergency services:
a. UAV as communications nodes
b. Foreground communications networks between users and UAVs
   For users with hand-held devices
   utilizing remote-beam forming network (RBFN) with the ground based beam forming (GBBF) facility
c. Background communications networks, (back channels or feeder-links) between ground infrastructures/facilities and UAVs
   Back-channels or feeder-links between UAVs and GBBF processing centers.
d. Wavefront multiplexing/de-multiplexing (WF muxing/demuxing);
   Back-channel calibrations on feeder-link transmission for RBFN/GBBF
   Coherent power combining in receivers on signals from different channels on various UAV;
   Secured transmissions with redundancies via UAVs Multiple smaller UAVs may be "combined" to perform a function, say communicating with local residents when their cell towers become non-functional. We may fast-deploy 4 small UAVs and group them via communications networks to replace the functions of ill functioned local cell towers or base-stations which are damaged due to current emergencies or disasters. The residents may use their existing personal communications devices including their cell phones to communicate to outside worlds via the ad hoc communications network via these small UAVs. In these cases, we may allocate SW&P limits on communications payloads on a small UAV; about <5 Kg in weight, and <50 W power consumptions.

The payloads on surveillance platforms will use optical sensors to generate optical images during day time. There are possibilities of using optical illuminators on the UAVs or different UAVs to allow night operations. Infrared sensors may also be used for night visions and imaging.

Microwave sensors can be used for both night and cloudy (or raining) conditions in which optical sensors may not function well. Active monostatic Radars may be deployed by individual UAVs. Polystatic or multi-static Radars can be deployed via a fleet of UAVs.

Multiple UAVs will be coordinated to form a coherent RF receiving system as a passive Radar receiver via GBBF processing and real time knowledge of the positions/orientations of all receiving elements on various UAV platforms. It will take advantage of ground reflections of existing and known RF illuminators such as Naystar satellite from GPS constellations, or satellites from many other GNSS constellations at L-band. It is also possible to use as RF illuminators by taking advantages of ground reflections of high power radiations by many direct broadcasting satellites (DBS), which illuminate "land mass" with high EIRP over 500 MHz instantaneous bandwidths (of known signals) at S, Ku and/or Ka band. The "known signals" are received signals through a direct path or a second path from the same radiating DBS satellite. Furthermore, high power radiations from Ka spot beams of recently deployed satellites on many satellites either in geostationary or non-geostationary orbits, can also be used as RF illuminators.

The terms of UHF, L, S, C, X, Ku, and Ka bands are following the definitions of IEEE US standard repeated in Table-1

TABLE 1

IEEE Designated Frequency Bands
Table of IEEE band

| Band | Frequency range | Origin of name[1] |
|---|---|---|
| HF band | 3 to 30 MHz | High Frequency |
| VHF band | 30 to 300 MHz | Very High Frequency |
| UHF band | 300 to 1000 MHz | Ultra High Frequency |
| L band | 1 to 2 GHz | Long wave |

TABLE 1-continued

IEEE Designated Frequency Bands
Table of IEEE band

| Band | Frequency range | Origin of name[1] |
| --- | --- | --- |
| S band | 2 to 4 GHz | Short wave |
| C band | 4 to 8 GHz | Compromise between S and X |
| X band | 8 to 12 GHz | Used in WW II for fire control, X for cross (as in crosshair) |
| $K_u$ band | 12 to 18 GHz | Kurz-under |
| K band | 18 to 27 GHz | German Kurz (short) |
| $K_a$ band | 27 to 40 GHz | Kurz-above |
| V band | 40 to 75 GHz | |
| W band | 75 to 110 GHz | W follows V in the alphabet |
| mm band | 110 to 300 GHz | |

FIG. 1 illustrates a scenario of UAV's in a rescue mission. Three vital tasks are provided by the UAVs;
1. Communications networks deployment for local residents in disaster areas using their existing cell phones
   UAV (M1) becomes the replacement of the damaged cell towers in a Spoke-and-hub architecture
   Residents can use their own cell phones ask for assistance when needed
2. Communications networks deployment for rescue teams with special phones
   UAV (M2) becomes the rapid deployed cell towers for communications among the rescue team members and their dispatchers
   Using separated emergency frequency bands
   Spoke-and-hub architecture
3. Surveillance platforms for visual observations
   UAV (M3) takes videos on disaster areas and relays them back to the hub instantaneously
   Dedicated high data rate links All three major tasks will have the same hub which shall have capability to relay the emergency information to the mission authority. Users on the two networks can communicate among themselves through the gateways which are co-located at the same hub, which shall be standard mobile hubs that telecommunications service providers can support An example of desired designs of the communications functions in this disclosure is summarized as follows:
In the airborne segment
  Using 16 elements as array for foreground communications network
    to enable a 4-element subarray with multiple beam capability maintaining links for data rate at 10 Mbps for each subarray.
    To enable a sparse array made from 4 subarrays at S/L bands or C-band with multiple beam capability maintaining links for data rate at 10 Mbps per beam.
    To design Ku-band feeder links with a bandwidth at 160 MHz
In the user segment
  Regular cell phones for the residents in the serviced community
  Common rescue mission equipment at 4.9 GHz
In the ground segment
  Three Ku band antennas to track three UAVs concurrently individually with data rate at 150 MHz back channel bandwidths in both directions.
  GBBF capability with knowledge of evolving array orientations on UAVs

BRIEF DESCRIPTION OF DRAWINGS

FIG. 7a is a functional block diagram for forward link, and FIG. 7b is a functional block diagram for return link.

FIGS. 8a, 8b, and 8c illustrate the operational principle of wavefront multiplexing/demultiplexing for redundancy and signal security for one user. FIG. 8a is a functional block diagram for forward link, and FIG. 8b a functional block diagram for return link. FIG. 8c depicts a numerical example of non-coherent data delivery by WF muxing/demuxing techniques via 4 UAVs concurrently. It works for both forward and return links.

FIG. 9a is a functional block diagram for forward link with on-board optimization processing; FIG. 9b is a functional block diagram for forward link with a pre-distortion technique with an on-ground optimization processing; and FIG. 9c is a functional block diagram for return link with an on-ground optimization processing.

FIG. 10a is a functional block diagram for a forward link from a ground hub to a first user; FIG. 10b is a functional block diagram for a forward link from a ground hub to a second user; and FIG. 10c is a functional block diagram for a forward link from a ground hub to a third user.

DETAILED DESCRIPTION

Figure 1:
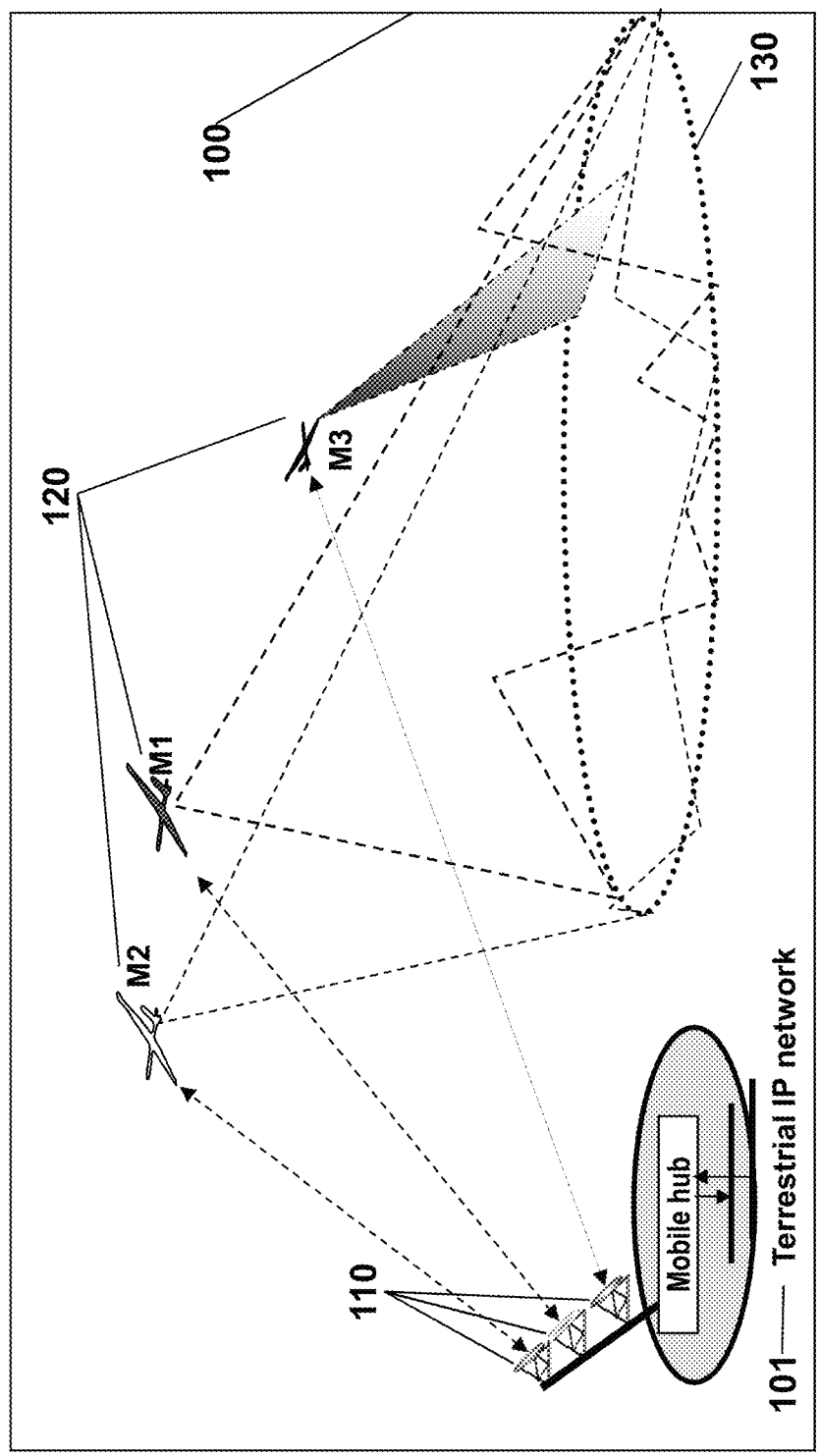
FIG. 1 depicts a scenario of using three separated UAVs as three mobile platforms for emergency and disaster recovery services; UAV M1 for communications among rescue team members, UAV M2 for communications as emergency replacements of mobile and/or fixed wireless base stations for resident communications via their existing mobile phones and/or personal communications devices using WiFi. UAV M3 for surveillances via optical, infrared, and RF sensors.

FIG. 1 depicts a scenario of using three separated UAVs 120 as three mobile platforms for emergency and disaster recovery services; UAV M1 for communications among rescue team members, UAV M2 as emergency replacements of mobile and/or fixed wireless base stations for resident communications via their existing mobile phones and/or personal communications devices using WiFi. The third UAV platform M3 performs real time imaging and surveillances via passive optical, infrared or RF sensors. All three platforms are connected to a ground hub 110 via feeder-links in Ku and/or Ka band spectrum. The ground hub 110 will serve as gateways and have access to terrestrial networks 101.

As a result, rescue works in a coverage area 130 will have access of real time imaging, and communications among co-workers and dispatching centers connected by the hub 110. Residents in disaster/emergency recovery areas 130 will also be provide with ad hoc networks of communications via their own personal devices to outside world, to rescue teams, and/or disaster/emergency recovery authorities.

The feeder-links of the three platforms M1, M2, and M3 are identical in Ku and/or Ka bands. Only the three payloads (P/L) are different; the P/L on the first UAV M1 enables networks for communications in public safety spectrum among members of rescue team; the P/L on the second UAV M2 is to restore resident cell phone and/or fixed wireless communications at L/S band, and the P/L on the third UAV M3 is an real time imaging sensor for real time surveillance.

Three independent technologies are discussed; (1) retro-directive array, (2) ground based beam forming, and (3) wavefront multiplexing and demultiplexing (WF muxing/demuxing). Retro-directive links for feeder-links are to make the feeder links payload on UAVs to communicate with designated ground hubs more effectively, using less power, reaching hubs in further distances, and/or more throughputs.

The architectures of ground base beam forming (GBBF), or remote beam forming (RBF), for UAV platform base communications will support and accomplish designed missions using P/L with smaller SW&P. Beam forming processing may be located remotely on ground (e.g. GBBF) or anchored on other platforms on air, on ground, or at sea. GBBF architectures are used for illustrations in here. However, similar RBF architecture can be developed for the platforms which may be mobile, re-locatable, fixed, and/or combinations of all above to perform remote beam forming functions.

Wavefront multiplexing and demuxing techniques can be applied in many advanced applications for UAV based mobile communications including the following three:
(1) Calibrating back channels in feeder-links
(2) coherent power combining of radiated power by different UAVs in ground receivers in contracts to "spatial power combining" using conventional array antennas;
(3) generating data security and redundancy in segmented data packages for concurrent delivery through various UAVs, different channels in a UAV, and combinations of both.

There are four technologies in this architecture:
1. UAVs 120 as communications nodes
2. Fore-ground communications networks between users in a coverage area 130 and UAVs 120
   For users with hand held devices at L/S bands utilizing remote-beam forming network (RBFN) with the ground based beam forming (GBBF) processing in a ground mobile hub facility 110
3. Back-ground communications networks, (back channels or feeder-links) between ground infrastructures/facilities 110 and UAVs 120
   Back-channels or feeder-links between UAVs and GBBF processing centers via retro-directive antennas.
4. Wavefront multiplexing/de-multiplexing (WF muxing/demuxing);
   Back-channel calibrations on feeder-link transmission for RBF/GBBF
   Coherent power combining in receivers on signals from different channels on various UAVs;
   Secured transmissions with redundancies via UAVs.

Figure 2:
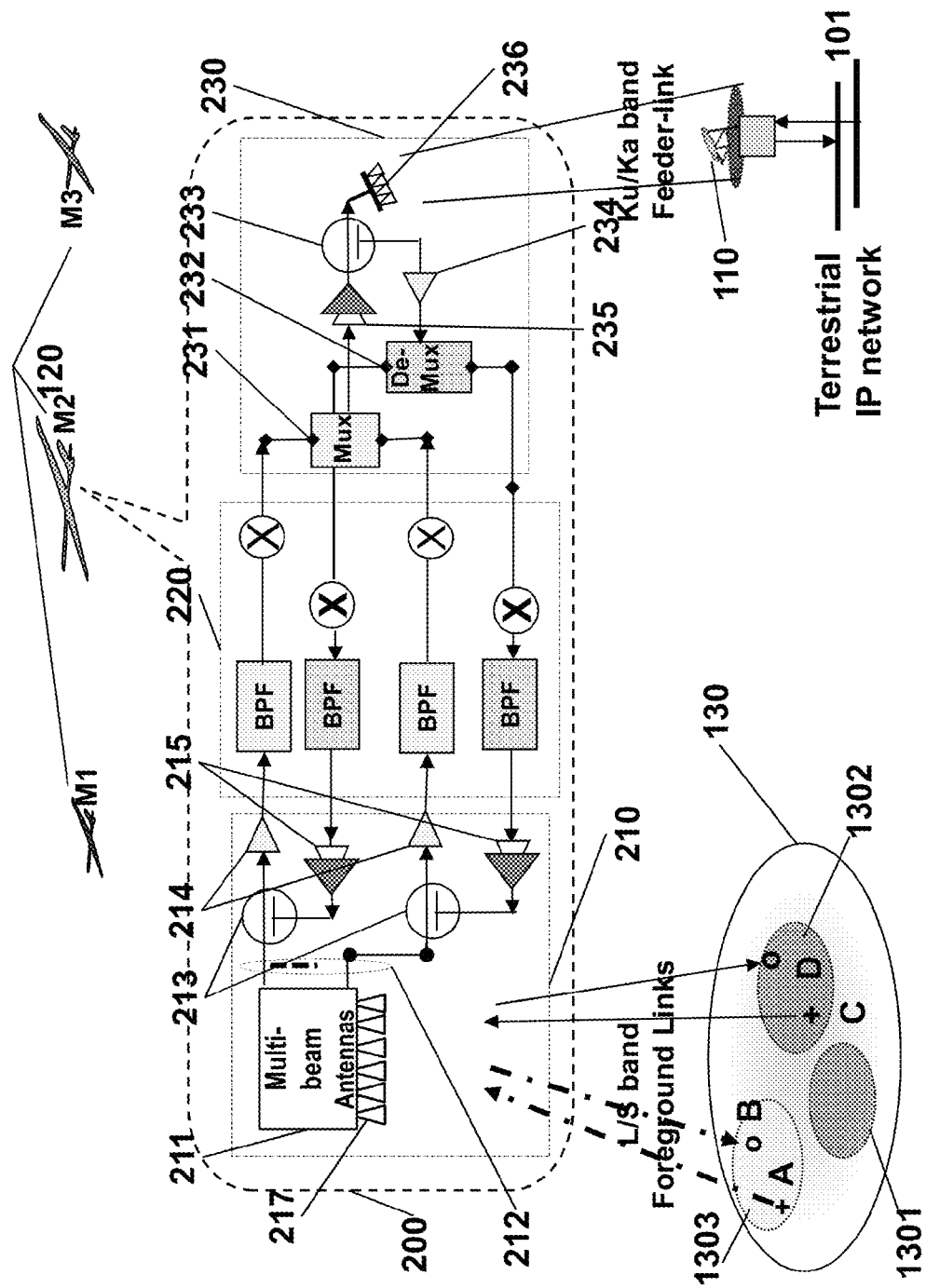
FIG. 2 depicts a simplified block diagram for a mobile communications via UAV with on-board beam forming network (BFN) to mobile users using "foreground" links at L/S band. The ground interconnection to terrestrial communications facility are through feeder-links in Ku or Ka band. Feeder-links are also referred to as back-ground links, or back channels.

FIG. 2 depicts both return links and forward links of a UAV based mobile communications 200 with on-board beam forming network (BFN) 211 over a coverage area 130. The UAV 120 provides interconnections among users A, B, C, and C in two beams 1302 and 1303 via a communication hub 110, which is a "gateway" to terrestrial networks 101. The communication hub 110 is covered by the feeder-link beam illuminated by an on-board feeder-line antenna 236 at Ka or Ku band. We assume these users are at L/S bands, including bands covering commercial cell phones and WiFi band.

The P/L 200 consists of three sections supporting both forward and return links; (1) a foreground communications payload (P/L) 210 at L/S band, (2) frequency translation sections 220 between L/S band of and Ku/Ka bands, and (3) a feeder-link payload 230 at Ku/Ka band.

Similar architectures also are applicable to other selected bandwidths for other foreground communications payload (P/L) 210; such as for emergency rescue workers at 4.9 GHz reserved for public safety spectrum.

A multi-beam antenna 211 with many array elements 217 in the foreground link payload (P/L) 210 at L/S band is used for both transmission in forward links and receptions in return links. There are at least three beams, 1301, 1302, and 1303 over the coverage area 130. The inputs/outputs ports to the multi-beam antenna 211 are the "beam ports" connected by diplexers 213, where the return link beam-ports are connected to LNAs 214 at L/S band, and the forward link beam-ports are connected to power amplifiers 215.

There are at least two pairs of frequency translation units 220. The return link units feature frequency up-conversion from L/S band (1/2 GHz) to Ku/Ka band (12/20 GHz). The forward link units translate signals at Ku/Ka band (14/30 GHz) to those at L/S band L/S band (1/2 GHz).

Feeder-link P/L 230 features two groups of "beam" signals. For the return link signals, the muxing devices of 231 combines the beam signals at various translated frequency slots in Ku/Ka band into a single stream, then power amplified by a PA 235, duplexed by an antenna diplexer 233 before radiated by the feeder-link antenna 236 in a feeder-link payload (P/L) 230. Similarly for signals in forward links, the feeder-link signals received by the antenna 236 and I/O duplexer 233 are conditioned by Ku/Ka band LNA 234. The Ku/Ka band demuxing devices 232 separates beam signals by dividing the conditioned signals into various beam-ports before translating them from proper frequency slots in Ku/Ka band into a common frequency slot in L/S band by the frequency converters 220. These input beam signals are power amplified by individual power amplifiers 215 in the foreground P/L before radiated by the foreground-link multibeam antenna 211.

We have assumed the muxing device 231 performs frequency division multiplexing (FDM) and consistent with an associated device on ground performing frequency division demultiplexing (FDM demuxing). However, the muxing/demuxing functions of 231/232 may perform via other muxing/demuxing schemes such as time division muxing (TDM), code division muxing (CDM), or combinations of FDM, CDM and/or TDM.

FIG. 2 presents systems and methods to restore mobile communications for residents in a disaster area via a small UAV M2 which features on-board beam forming capability and serves as a communications relay to ground gateways. As an example depicted in FIG. 2, a first user A in beam 1303 is sending a data string to a fourth user D in Beam 1302, an on board payload (P/L) of a M2 UAV 120 will pick up the data sent by the first user A in Beam 1303 via the multi-beam antenna 211. The first user A will use his/her own cell-phone or portable devices via WiFi spectrum. The received data string by the multi-beam antenna 211 will be amplified by a LNA 214, filtered and frequency translated by a transponder 220, power amplified 235 and then radiated by the feeder-link antenna 236 at Ka or Ku band. The feeder link antennas on the M2 UAV shall be a high gain tracking beam antenna with a tracking beam always pointed to a ground hub 110 as the M2 UAV 120 moves.

The on-board feeder-link antennas may also be implemented as low gain antennas including omni directional ones to simplify complexity on feeder-link tracking mechanisms with a price of reduced channel capacity and/or operational ranges between the M2 UAV 120 and the ground hub 110.

The hub 110 will assign the received data stream to a forward link beam port, through which the data will be delivered to a desired receiving user, the user D, in Beam 1302.

An uplink data stream in the ground facility 110 designated for a forward link beam port of the on-board BFN 211 is up-loaded via the Ku/Ka band feeder-link and captured by the feeder-link antenna 236. The captured signals are conditioned via a LNA and a band pass filter (BPF) before FDM demuxed to a common IF by a FDM demuxer 232. The demuxed components are different beam signal streams for various input ports of the multibeam antenna 217.

Concurrently a third user C in beam 1302 want to send a different data string to a second user B in Beam 1303, the on board P/L 210 will pick up the data sent by the third user C in Beam 1302 via the multi-beam antenna 211, the received data from the user C will be amplified by a LNA 214, filtered and frequency translated by one of the transponders 220, power amplified 235 and then radiated by the feeder-link antenna 236 at Ka or Ku band. The hub 110 will assign the received data stream to a forward link beam port, which will deliver the data to the desired receiving user, user B, in Beam 1303.

It is clear that there are no "switching or connecting" mechanisms at all among users over the coverage area 130 for the P/L 200 on the UAV 120. The switching and connecting mechanisms are performed in the ground hub 110.

Referring to FIG. 2, the M2UAV 120 may only provide one-way forward communications such as broadcasting or multicasting. Forward links of the M2 UAV 120 based mobile communications with on-board beam forming network (BFN) 211. The M2 UAV 120 provides interconnections to a first receiving mobile user B in the beam position 1303 from a communication hub 110 connected to a first data source which may come from terrestrial networks 101, or via on return links of the UAV 120. The UAV 120 concurrently provides interconnections to a second receiving mobile user D in the beam position 1302 from a communication hub 110 connected to a second data source which may come from terrestrial networks 101, or via return links of the UAVs 120.

Referring to FIG. 2, the M2 UAV 120 may only provide one-way return link (receiving only) services including other applications such as bi-static radar receiver functions. Return links of the M2 UAV 120 based mobile communications with on-board beam forming network (BFN) 211. The M2 UAV 120 provides interconnections from a first data source A in the beam position 1303 to a ground processing hub 110 connected to a first data receiver via terrestrial networks 101, or to a data receiver in the same coverage area 130 via forward links of the UAVs 120. Concurrently, the UAV 120 provides interconnections from a second data source C in the beam position 1302 to a processing hub 110 which may be connected to a second data receiver via terrestrial networks 101 or via forward links of the UAVs 120.

Figure 3:
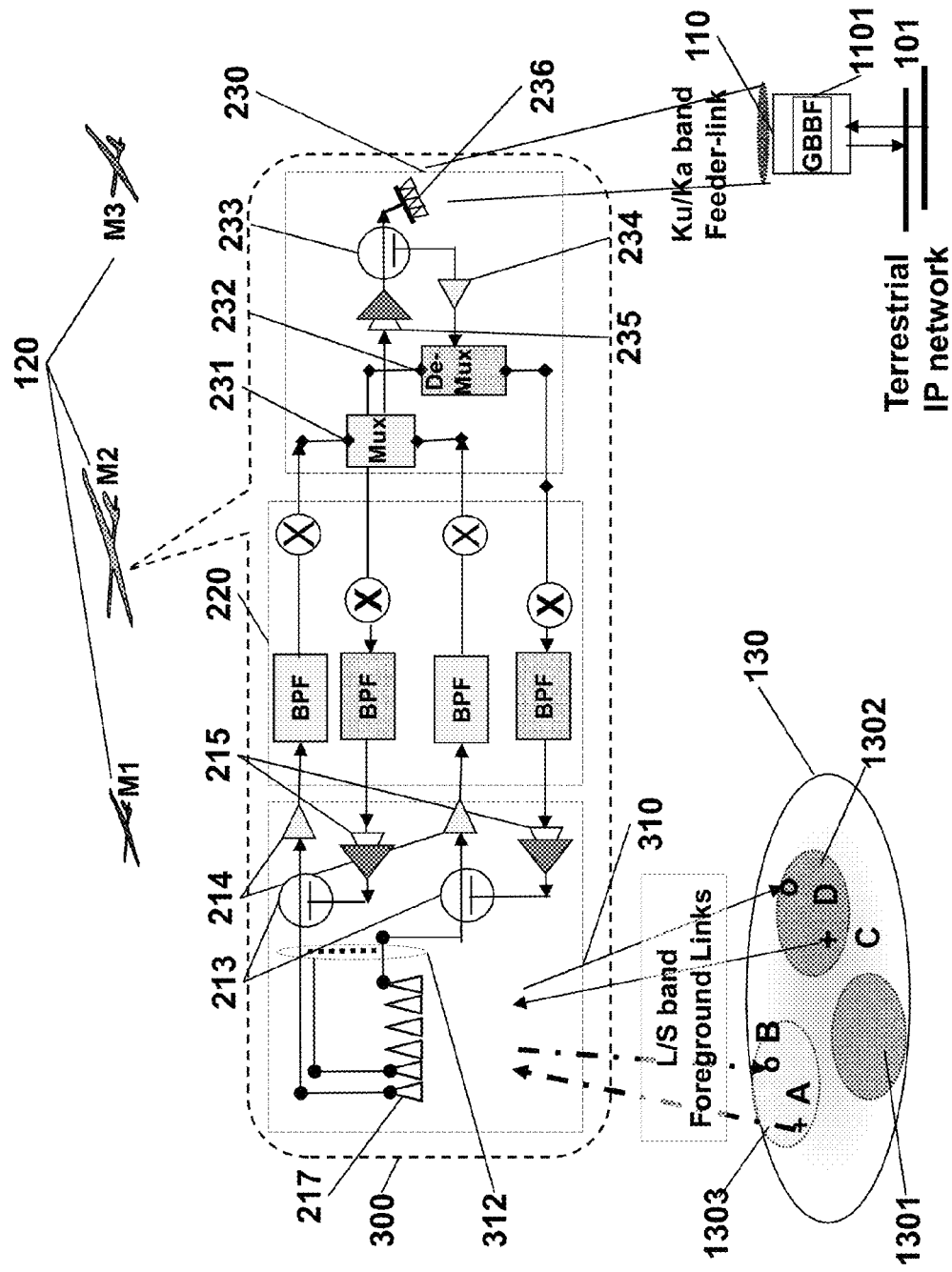
FIG. 3 depicts a simplified block diagram for a mobile communications via UAV to mobile users using "foreground" links at L/S band. The ground based beam forming (GBBF) network and ground interconnection to terrestrial communications facility are through feeder-links in Ku or Ka band. Feeder-links are also referred to as back-ground links, or back channels.

FIG. 3 depicts both return links and forward links of a UAV based mobile communications 200 with no on-board beam forming network (BFN) 211 over a coverage area 130. The UAV 120 provides interconnections among users A, B, C, and C in two beams 1302 and 1303 via a communication hub 110, which is a "gateway" to terrestrial networks 101. The communication hub 110 is covered by the feeder-link beam illuminated by an on-board feeder-line antenna 236 at Ka or Ku band. We assume these users are at L/S bands, including bands covering commercial cell phones and WiFi band.

The P/L 200 consists of three sections supporting both forward and return links; (1) a foreground communications payload (P/L) 210 at L/S band, (2) frequency translation sections 220 between L/S band of and Ku/Ka bands, and (3) a feeder-link payload 230 at Ku/Ka band.

Similar architectures also are applicable to other selected bandwidths for other foreground communications payload (P/L) 210; such as for emergency rescue workers at 4.9 GHz reserved for public safety spectrum.

The on board L/S band antennas in the feeder-link payload (P/L) 230 are many individual array elements 217 at L/S band. They are used for both transmission in forward links and receptions in return links. There are at least three beams, 1301, 1302, and 1303 over the coverage area 130. The inputs/outputs ports to the array elements 217 are the "element-ports" connected by diplexers 213, where the return link element-ports are connected to LNAs 214 at L/S band, and the forward link element-ports are connected to power amplifiers 215.

There are at least two pairs of frequency translation units 220. The return link units feature frequency up-conversion from L/S band (1/2 GHz) to Ku/Ka band (12/20 GHz). The forward link units translate signals at Ku/Ka band (14/30 GHz) to those at L/S band L/S band (1/2 GHz).

Feeder-link P/L 230 features two groups of "element" signals. For the return link signals, the muxing devices of 231 combines various "element" signals at various translated frequency slots in Ku/Ka band into a single stream, then power amplified by a power amplifier (PA) 235, duplexed by an antenna diplexer 233 before radiated by the feeder-link antenna 236.

Similarly for signals in forward links, the feeder-link signals received by the antenna 236 and I/O duplexer 233 are conditioned by Ku/Ka band LNA 234. The Ku/Ka band demuxing devices 232 separates various element-signals by dividing the conditioned signals into various "element-ports" before translating them from proper frequency slots in Ku/Ka band into a common frequency slot in L/S band by the frequency converters 220. These element signals are then power amplified by individual power amplifiers 215 in the foreground P/L 310 before radiated by the individual foreground-link antenna elements 217.

We have assumed the muxing device 231 performs frequency division multiplexing (FDM) and consistent with an associated device on ground performing frequency division demultiplexing (FDM demuxing). However, the muxing/demuxing functions of 231/232 may perform via other muxing/demuxing schemes such as time division muxing (TDM), code division muxing (CDM), or combinations of FDM, CDM and/or TDM.

Figure 4:
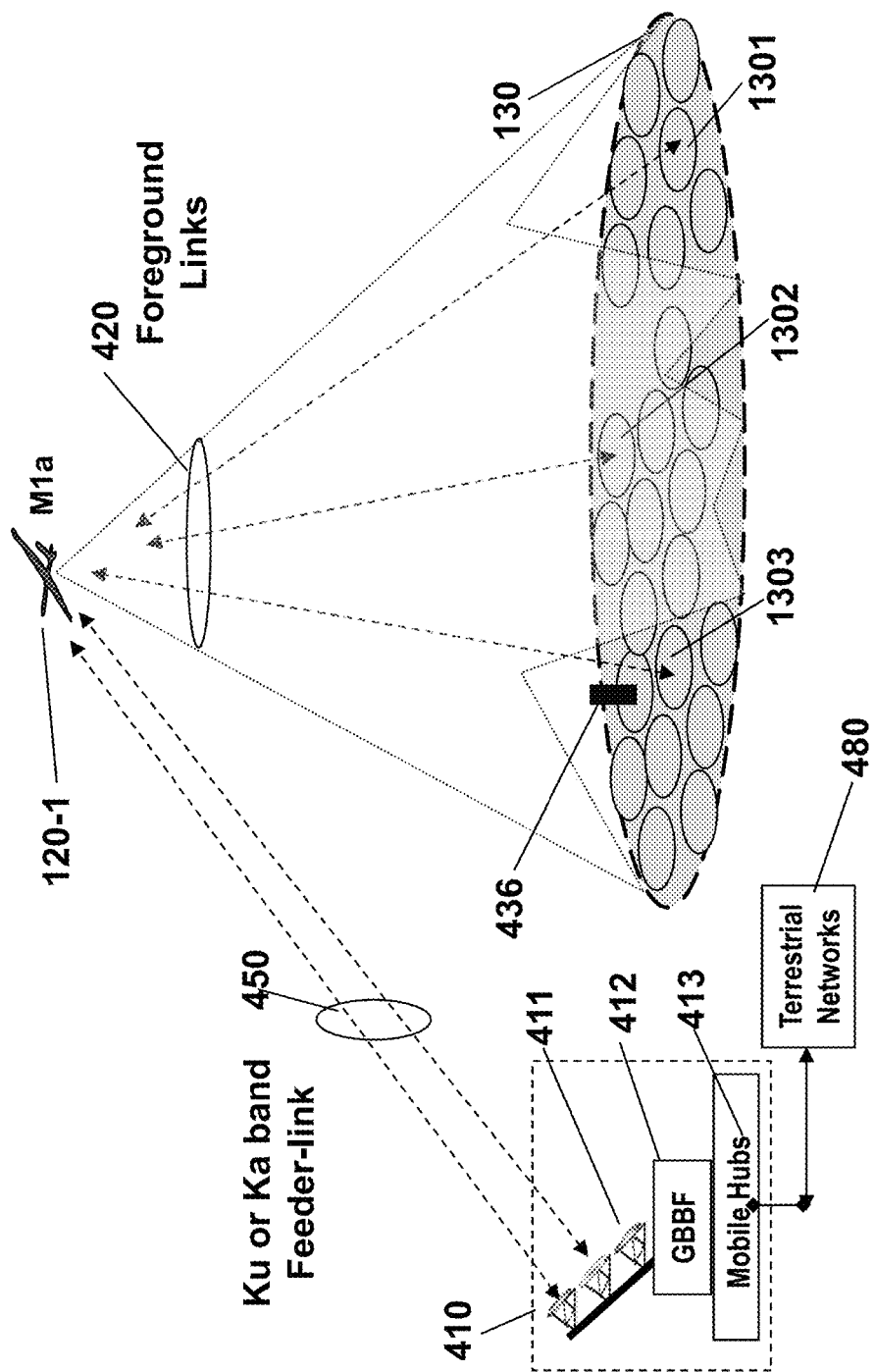
FIG. 4 depicts an operational scenario for a UAV with ground based beam forming through feeder-links, and foreground links for users. The UAV based communications features multiple beams foreground communications.

FIG. 4 depicts a scenario with a small M1a UAV 120-1 performing a communication relay mission via GBBF for residents in L/S bands. The foreground links 420 feature multiple spot beams 1301, 1302, and 1303 in L/S band servicing coverage 130 with <100 Km in diameter. A ground user 436 may use his/her own cell phone communicating to other users in or outside the same coverage area 130. The coverage 130 area may vary depending on requirements on missions.

The ground hub 410 in FIG. 4 will receive and condition signals from the feeder-link 450 in their frontend 411. A ground based beam forming (GBBF) processor 412 will (1) recover the received signals of the on-board elements 217 with precision amplitudes and phases, (2) perform digital beam forming (DBF) processing on the recovered element signals generating received beam signals, and (3) deliver the received beam signals for further receiving functions including demodulation to convert waveforms into data strings before sending them to destinations performed by mobile hubs 413 via terrestrial networks 480. The details of GBBF for both Forward links and Return links will be descripted in details in FIG. 12.

Similarly for signals in forward links, the ground based beam forming (GBBF) processor 412 will (1) receiving the transmitting "beam-signals" from a transmitter after functions including modulation and channel formatting performed by the mobile hubs 413 from signal sources which may come via terrestrial networks 480, (2) performing transmit digital beam forming (DBF) processing on the "beam signals" in baseband generating parallel element-signals in baseband to be transmitted in L/S band by the small M1a UAV 120-1, and (2) up-converting and FDM muxing these element signals to Ku/Ka for uplink to the UAV 120-1 via the feeder-link. Multiple beam-signals are designated to users in various spot beams 1301, 1302, and 1303 over the coverage area 130. These transmitted beam signals will be delivered to various users in the coverage area 130 concurrently Onboard the small M1a UAV 120-1, as depict in FIG. 3, the up-linked signals received by the feeder antenna 236 and I/O duplexer 233 are conditioned by Ku/Ka band LNA 234. The Ku/Ka band demuxing devices 232 separates "element" signals by dividing the conditioned signals to element various ports before translating them from proper frequency slots in Ku/Ka band into a common frequency slot in L/S band by the frequency converters 220. These input beam signals are power amplified by individual power amplifiers 215 in the foreground P/L before radiated by the foreground-link array elements 217.

We have assumed the muxing device 231 performs frequency division multiplexing (FDM) and consistent with an associated device on ground performing demuxing of FDM. However, muxing/demuxing device 231/232 may perform other muxing/demuxing schemes such as time division muxing (TDM), code division muxing CDM, or combinations of TDM, CDM and/or FDM.

Embodiment 1

FIG. 3 presents an example of systems and methods to restore mobile communications for residents in a disaster area via a small UAV M2 which features ground based beam forming (GBBF) or remote beam-forming network (RBFN) capability and serves as a communications relay to ground gateways. Referring to FIG. 3, the M2 UAV 120 may only provide one-way forward communications such as broadcasting or multicasting. Forward links of the M2 UAV 120 based mobile communications with on-board array elements 217 but no beam forming functions at all. The M2 UAV 120 provides interconnections to a first receiving mobile user B in the beam position 1303 from a communication hub 110 after GBBF functions 1101 connected to a first data source which may come from terrestrial networks 101, or via on return links of the UAV 120. The UAV 120 concurrently provides interconnections to a second receiving mobile user D in the beam position 1302 from a communication hub 110 connected to a second data source which may come from terrestrial networks 101, or from a source in the same coverage area 130 via return links of the UAVs 120. The processing/communication hub 101 will also perform transmitting beam-forming functions concurrently for many transmit beams for the array elements on the M2 UAV.

Referring to FIG. 3, the M2 UAV 120 may only provide one-way return link (receiving only) services including bi-static radar receiver functions. Return links of the M2 UAV 120 based mobile communications with on-board array elements 217 but without beam forming network (BFN). The M2 UAV 120 provides interconnections to a first data source A in the beam position 1303 to a ground processing hub 110 connected to a first data receiver via terrestrial networks 101, or via forward links of UAVs 120 to a user in the UAV coverage area 130. Concurrently, the UAV 120 provides interconnections to a second data source C in the beam position 1302 to a processing hub 110 which may be connected to a second data receiver via terrestrial networks 101 or a receiver in the same coverage area 130 via forward links of the UAVs 120. The M2 UAV 120 provides interconnections from residents in the coverage area 130 to a communication hub which shall serve as "gateways" to terrestrial networks. The processing/communication hub 101 will perform receiving beam-forming functions concurrently for many receiving beams for the array elements on the M2 UAV.

FIG. 4 depicts a similar embodiment via a M1 UAV 120-1 for communications mainly to rescue worker community in a coverage area 130. The ground facility 410 features:

1. multiple beam antennas 411 to connected to various UAV platforms 120 concurrently via different Ku/Ka band feeder-links 450,
2. GBBF for both forward link (transmitting) beams and return link (receiving) beams
3. mobile hubs 413 as gateways to terrestrial networks 480 or other UAV based networks.

The M1a UAV 120-1 along with its GBBF processing features multiple beams 1301, 1302, 1303, and etc. in both forward and return links in a reserved public safety frequency band; e.g. 4.9 GHz or 700 MHz in US. The users (rescue worker community) in the coverage areas feature omni directional terminals 436

FIG. 4 presents an example of systems and methods for broadcasting and/or multicasting via a small UAV with GBBF or RBFN. One-way communications are depicted, transmitting to rescue worker community in a coverage area 130 via a M1 UAV 120-1. The ground facility 410 features:

1. multiple beam antennas 411 support a Ku/Ka band feeder-link 450 from the ground facility 410 to the M1a UAV 120-1 platform,
2. GBBF processing including beam forming functions for concurrent forward link (transmitting) multiple beams
3. mobile hubs 413 as gateways to terrestrial networks 480 or other UAV based networks.

The M1a UAV 120-1 along with its GBBF processing features multiple Tx beams 1301, 1302, 1303, and etc. including forward links in a reserved public safety frequency band; eg. 4.9 GHz or 700 MHz in US.

The users (rescue worker community) in the coverage areas shall feature omni directional terminals 436.

The M1a UAV 120-1 provides interconnections from mobile users to a communication hub connected to terrestrial networks.

This embodiment can be used as platforms for bi-static radar receivers. The associated processing facility 411 on ground may be modified to perform not only functions of beam forming via GBBF 412, but also signal processing functions of range gating, Doppler frequency separations, as well as additional radar/imaging processing.

Figure 5:
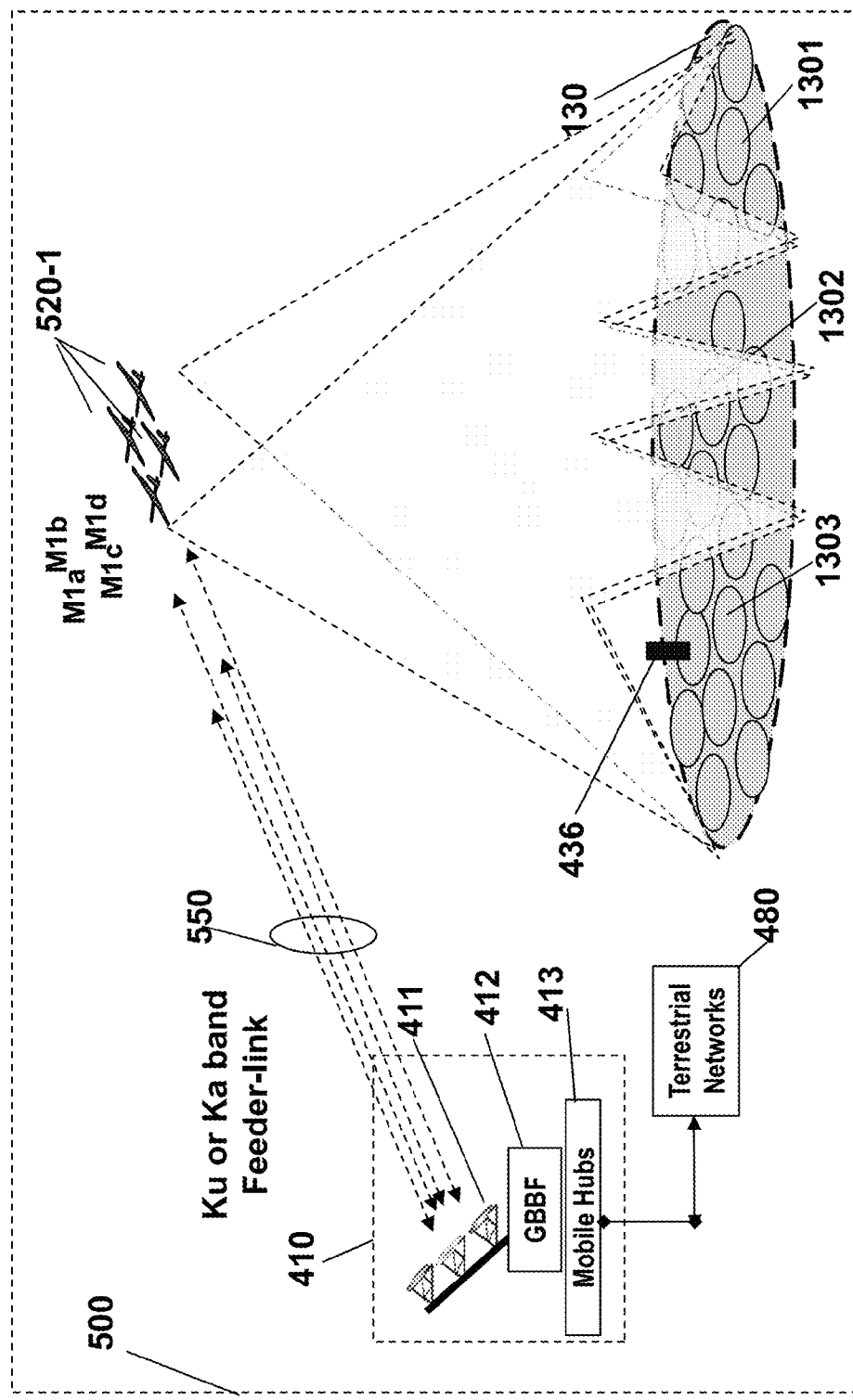
FIG. 5 depicts an operational scenario for multiple UAVs in a closely space formation with ground based beam forming through feeder-links, and foreground links for users. The UAVs are spaced by orders of meters or less. The multiple-UAV based communications features multiple beams foreground communications.

FIG. 5 depicts a scenario with 4 small UAVs 520-1 performing a communication relay mission via GBBF for residents in L/S bands. The four small UAVs 520-1 identified as M1*a*, M1*b*, M1*c* and M1*d* are flying in formations closely spaced among one another (say, 10 m or less). The foreground links 420 feature multiple spot beams 1301, 1302, and 1303 in L/S band servicing coverage 130 with <100 Km in diameter. A ground user 436 may use his or her own cell phone communicating to other users in or outside the same coverage area 130. The coverage 130 may vary depending on requirements on missions.

The ground hub 410 in FIG. 4 will receive and condition signals in the feeder-links 550 in their frontend 411. A ground based beam forming (GBBF) processor 412 will (1) recover the received signals of the on-board elements 217 from all 4 small UAVs 520-1 with precision amplitudes and phases, (2) perform digital beam forming (DBF) processing on the recovered element signals from various UAVs 520-1 generating received beam signals, and (3) deliver the received beam signals for further receiving functions including demodulation to convert waveforms into data strings before sending them to destinations performed by mobile hubs 413 via terrestrial networks 480. The details of GBBF for both Forward links and Return links will be descripted in details in FIG. 12.

Similarly for signals in forward links, the ground based beam forming (GBBF) processor 412 will (1) receiving the transmitting "beam-signals" from a transmitter after functions including modulation and channel formatting performed by the mobile hubs 413 from signal sources which may come via terrestrial networks 480, (2) performing transmit digital beam forming (DBF) processing on the "beam signals" in baseband generating parallel element-signals in baseband to be transmitted in L/S band by the four small UAVs 520-1 concurrently, and (2) up-converting and FDM muxing these element signals to Ku/Ka for uplinks to the 4 small UAV 520-1 via the feeder-links 550. Multiple beam-signals are designated to users in various spot beams 1301, 1302, and 1303 over the coverage area 130. These transmitted beam signals will be delivered to various users in the coverage area 130 concurrently Onboard each of the 4 small UAV 520-1, the processing from feeder-link to foreground links are identical. In the M1*a* UAV 120-1 shown in FIG. 3 as an example, the up-linked signals received by the feeder antenna 236 and I/O duplexer 233 are conditioned by Ku/Ka band LNA 234. The Ku/Ka band demuxing devices 232 separates "element" signals by dividing the conditioned signals to various element ports before translating them from proper frequency slots in Ku/Ka band into a common frequency slot in L/S band by the frequency converters 220. These input beam signals are power amplified by individual power amplifiers 215 in the foreground P/L before radiated by the foreground-link array elements 217.

We have assumed the muxing device 231 performs frequency division multiplexing (FDM) and consistent with an associated device on ground performing demuxing of FDM. However, muxing/demuxing device 231/232 may perform other muxing/demuxing schemes such as time division muxing (TDM), code division muxing CDM, or combinations of TDM, CDM and/or FDM.

Another example presents systems and methods of implementing ad hoc mobile communications for rescued workers in a disaster area via multiple closely spaced small UAVs featuring GBBF or RBFN. The term "M1 UAVs 520-1" is used to represent all 4 small UAVs; the M1*a* UAV, the M1*b* UAV, the M1*c* UAV, and the M1*d* UAV in FIG. 5. FIG. 5 depicts an embodiment via multiple M1 UAVs 520-1 for communications mainly to rescue worker community in a coverage area 130.

The ground facility 410 features:
1. multiple beam antennas 411 to connected to various UAV platforms 520-1 concurrently via different Ku/Ka band feeder-links 550,
2. GBBF for both forward link (transmitting) beams and return link (receiving) beams
3. mobile hubs 413 as gateways to terrestrial networks 480 or other UAV based networks.

The M1*a*, M1*b*, M1*c*, and M1*d* UAVs 520-1 along with their GBBF processing feature multiple beams 1301, 1302, 1303, and etc. in both forward and return links in a reserved public safety frequency band; e.g. 4.9 GHz or 700 MHz in US. The users (rescue worker community) in the coverage areas shall feature omni directional terminals 436.

In a first operational scenario of both forward and return links of mobile communications via multiple closely space M1 UAVs 520-1 with ground based beam forming (GBBF) 412 or remote beam forming network (RBFN) via beam-forming among elements of arrays on a UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams concurrently connecting to all UAV facilitating frequency reuse. On the other hand for the foreground communications P/Ls, various UAVs provide different groups of beams operated at various frequency slots, different groups of codes, and/or time slots. Each supports an independent data stream. The relative positions among arrays on different UAVs become less important. Radiated RF powers associated with many of these independent data streams among various UAVs are not combined. Information or data streams may be combined for high data rate users via channel bonding.

In a second operational scenario of both forward and return links of mobile communications via multiple closely space M1 UAVs 520-1 with ground based beam forming (GBBF) 412 or remote beam forming network (RBFN) via beam-forming among distributed subarrays; each of which is on a separated UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse. The spacing among the M1 UAVs 520-1 shall vary slowly. As a result, the relative geometries among elements in this distributed and slow-varying array are very important in maintaining coherency among subarrays. The slow varying array geometries must be continuously calibrated and then compensated for both forward links and return links properly as a part of GBBF functions 412. This operation scenario will allow coherently added stronger radiated signals from multiple M1 UAVs 520-1 to "punch through" debris or man-made structures reaching users with disadvantage terminals or at disadvantaged locations.

Another example presents systems and methods of implementing one way broadcasting or multicasting communications via multiple closely spaced small UAVs featuring GBBF or RBFN. We shall use the term "M1 UAVs 520-1" to represent all 4 small UAVs; the M1*a* UAV, the M1*b* UAV, the M1*c* UAV, and the M1*d* UAV in FIG. 5. Forward links of the M1 UAVs 520-1 based mobile communications with on-board array elements 217 but no beam forming functions at all. The M1 UAVs 520-1 provide interconnections to a first receiving mobile user B in the beam position 1303 from a communication hub 410 after GBBF functions 412 connected to a first data source which may come from terrestrial networks 408, or via on return links of the M1 UAVs 520-1. The M1 UAVs 520-1 concurrently provides interconnections to a second receiving mobile user D in the beam position 1302 from a communication hub 410 connected to a second data source which may come from terrestrial networks 408, or from a source in the same coverage area 130 via return links of the M1 UAVs 520-1. The processing/communication hub 410 will also perform transmitting beam-forming functions concurrently for many transmit beams for the array elements on the M1 UAVs 520-1.

In a first operational scenario of forward links of mobile communications via multiple closely space M1 UAVs 520-1 with ground based beam forming (GBBF) 412 or remote beam forming network (RBFN) via beam-forming among elements of arrays on a UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse. Various UAVs will provide different groups of beams operated at various frequency slots, different groups of codes, and/or time slots for the foreground communications payloads. Each UAV supports independent data streams. The relative positions among arrays on different UAVs become less important. Radiated RF powers associated with many of these independent data streams among various UAVs are not "coherently combined". Information or data streams may be combined for high data rate signal streams via channel bonding.

In a second operational scenario of forward links of mobile communications via multiple closely space M1 UAVs 520-1 with ground based beam forming (GBBF) 412 or remote beam forming network (RBFN) via additional beam-forming processing among distributed subarrays; each of which is on a separated UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse. The spacing among the M1 UAVs 520-1 shall vary slowly. As a result, the relative geometries among elements in this distributed and slow-varying array are very important in maintaining coherency among subarrays. The slow varying array geometries must be continuously calibrated and then compensated for both forward links and return links properly as a part of GBBF functions 412. This operation scenario will allow coherently added stronger radiated signals from multiple M1 UAVs 520-1 to "punch through" debris or man-made structures reaching users with disadvantage terminals or at disadvantaged locations.

Another example presents systems and methods of implementing one way receive only communications via multiple closely spaced small UAVs featuring GBBF or RBFN.

We shall use the term "M1 UAVs 520-1" to represent all 4 small UAVs; the M1*a* UAV, the M1*b* UAV, the M1*c* UAV, and the M1*d* UAV in FIG. 5.

Referring to FIG. 5, the M1 UAVs 520-1 may only provide one-way return link (receiving only) services including applications of bi-static radar receiver functions. Return links of the M1 UAVs 520-1 based mobile communications with on-board array elements 217 similar to the one shown in FIG. 3. The M1 UAVs 520-1 provide interconnections to a first data source A in the beam position 1303 to a ground processing hub 410 connected to a first data receiver via terrestrial networks 480, or via forward links of M1 UAVs 520-1 to a user in the coverage area 130. Concurrently, the M1 UAVs 520-1 provide interconnections to a second data source C in the beam position 1302 to a processing hub 410 which may be connected to a second data receiver via terrestrial networks 480 or a receiver in the same coverage area 130 via forward links of the M1 UAVs 520-1. The M1 UAVs 520-1 provide interconnections from data sources in the coverage area 130 to a communication hub which shall serve as "gateways" to terrestrial networks. The processing/communication hub 410 will perform receiving beam-forming functions concurrently for many receiving beams for the array elements on the multiple M1 UAVs 520-1.

In a first operational scenario of return links of mobile communications via multiple closely space M1 UAVs 520-1 with ground based beam forming (GBBF) 412 or remote beam forming network (RBFN) via beam-forming among elements of arrays on a UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse. Various UAVs provide different groups of beams operated at various frequency slots, different groups of codes, and/or time slots. Each supports an independent data stream. The relative positions among arrays on different UAVs become less important. Received RF powers associated with many of these independent data streams among various UAVs are not "coherently" combined. Information or data streams may be combined for high data rate users via channel bonding.

In a second operational scenario of return links of mobile communications via multiple closely space M1 UAVs 520-1 with ground based beam forming (GBBF) 412 or remote beam forming network (RBFN) via beam-forming among distributed subarrays; each of which is on a separated UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse.

The spacing among the M1 UAVs 520-1 shall vary slowly. As a result, the relative geometries among elements in this distributed and slow-varying array are very important in maintaining coherency among subarrays. The slow varying array geometries must be continuously calibrated and then properly compensated for return links as a part of GBBF functions 412. This operation scenario will allow coherently added received signals captured by multiple M1 UAVs 520-1 to enhance received signal-to-noise ratio (SNR).

In addition, multibeam GNSS receivers [1, 2, 3] on individual UAVs shall provide current status on information not only for the individual platform positions but also for the platform orientations. Thus all element current positions and orientations of a subarray on a moving UAV can then be precisely calculated in a dynamic coordinate moving with the mean velocity of all participating UAVs. Thus the geometry of a dynamic array distributed among multiple slow moving UAVs can then be calculated precisely for a current flying trajectory position, and may also be projected for next few flying trajectory positions a few seconds ahead.

In bi-static radar receiving applications, coherent combining of captured signal returns among multiple UAVs will provide enhanced SNR and also better spatial resolutions. RF illuminators for these bi-static or multi-static radars may be many of the GNSS satellites at L-band for global coverage, C-band satellites for land and ocean coverage, or Ku and Ka band high power DBS satellites or spot beam satellites for many land mass coverage or near equatorial coverage on land mass, on ocean and in air services.

Figure 6:
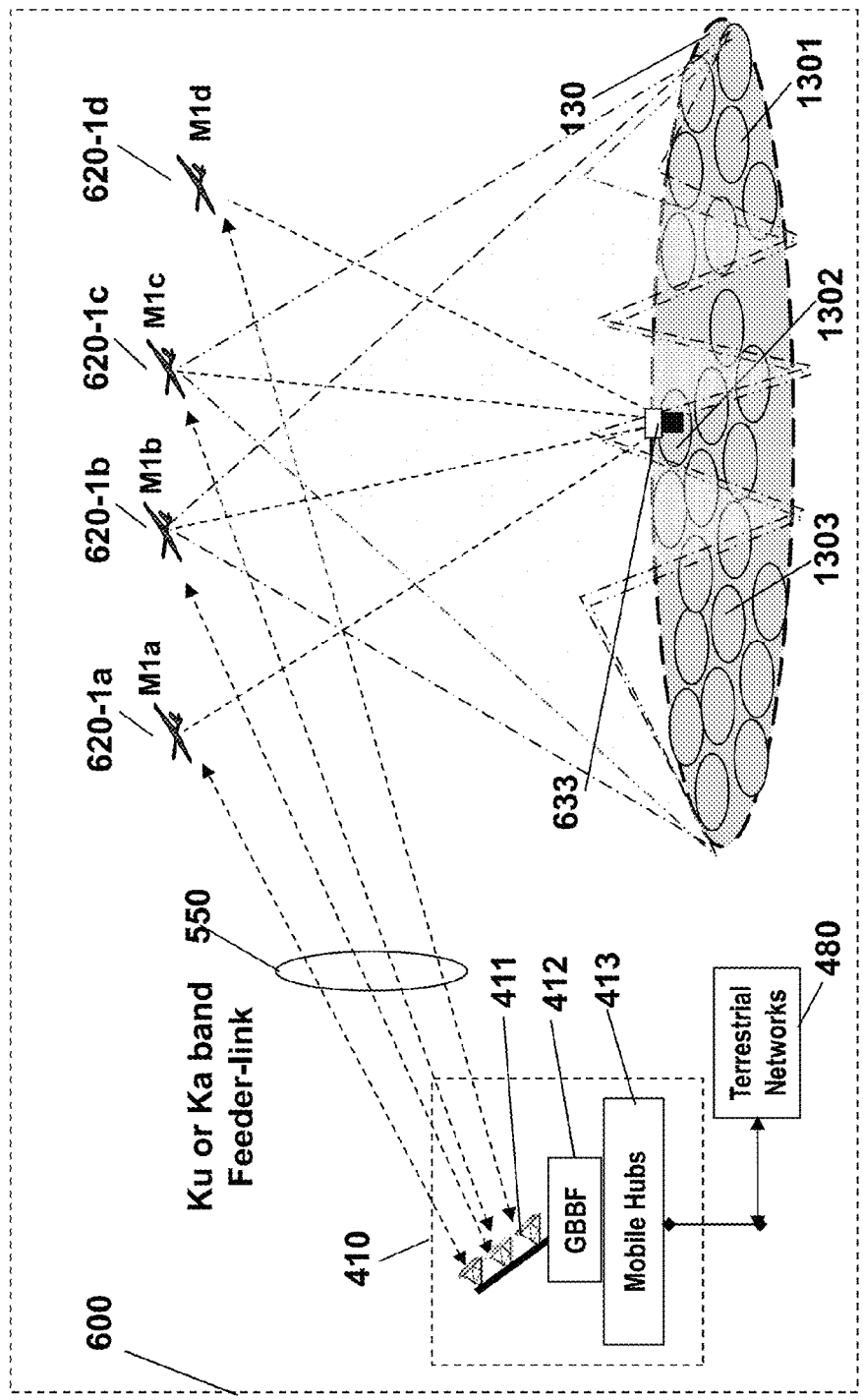
FIG. 6 depicts an operational scenario for multiple UAVs in a formation with ground based beam forming through feeder-links, and foreground links for users. The UAVs are spaced by orders of Kilo-meters. The multiple-UAV based communications features multiple beams foreground communications. Users with terminals of multiple tracking beams can take advantages of the multiple UAVs to achieve multiple folds of channel capacity via frequency reuse.

FIG. 6 depicts a scenario with 4 small UAVs 620-1 performing a communication relay mission via GBBF for residents in L/S bands. The four small UAVs 620-1a, 620-1b, 620-1c and 620-1d identified as M1a, M1b, M1c and M1d are distributed in a fly formation with large distances among them (say, >1 Km). The foreground links 420 of each of the 4 UAVs feature multiple spot beams 1301, 1302, and 1303 in L/S band servicing coverage 130 with <100 Km in diameter. A ground user 436 may use an advanced user device communicating to other users in or outside the same coverage area 130. The advanced user device features multiple tracking beams at concurrently and independently following all 4 small UAVs. The multiple-beams of an advanced user terminals operate at same frequency slots among the links between each of the four UAVs and the ground user. The coverage 130 area may vary depending on requirements on missions.

The ground hub 410 in FIG. 6 will receive and condition signals from the 4 UAVs (M1a 620-1a, M1b 620-1b, M1c 620-1c, and M1d 620-1d) via the 4 separated feeder-links 550 at its frontend 411. A ground based beam forming (GBBF) processor 412 will (1) recover the received signals of the on-board elements 217 from all 4 small UAVs 620-1a, 620-1b, 620-1c, and 620-1d with precision amplitudes and phases, (2) concurrently perform 4 sets of digital beam forming (DBF) processing on the recovered element signals from 4 UAVs 620-1 generating 4 concurrent receiving beam signals for each ground user, and (3) deliver the 4 received beam signals for further receiving functions including demodulation to convert waveforms into data strings, (4) channel-bonding of received signals to form a string of the received beam signals from one user but through 4 different UAV's before sending them to destinations performed by mobile hubs 413 via terrestrial networks 480. The sequence of the processing in (3) and (4) may be reversed if signal modulations in all 4 feeder-links are identical. The details of GBBF for both Forward links and Return links will be descripted in details in FIG. 12.

Similarly for signals in forward links, the ground based beam forming (GBBF) processor 412 will (1) receiving the transmitting "beam-signals" from a transmitter after functions including modulation and channel formatting performed by the mobile hubs 413 from signal sources which may come via terrestrial networks 480, (2) segmenting the modulated signals into 4 substream beam signals (2) performing 4 concurrent but independent transmit digital beam forming (DBF) processing on each of the "substream beam signals" in baseband generating parallel element-signals in baseband to be transmitted in L/S band by the four small UAVs 620-1 concurrently, and (2) up-converting and FDM muxing these element signals to Ku/Ka for uplinks to the 4 small UAV 620-1 via the feeder-links 550. Multiple beam-signals are designated to users in various spot beams 1301, 1302, and 1303 from 4 separated UAV over the same coverage area 130. These transmitted beam signals will be delivered to various users in the coverage area 130 concurrently. The user with an advanced multi-beam terminal will have an advantage of 4 times the channel capacity as compared to the capacity from a single UAV 120

Onboard each of the 4 small UAV 620-1, the processing from feeder-link to foreground links are identical. Taking that of the M1a UAV 120-1 shown in FIG. 3 as an example, the up-linked signals received by the feeder antenna 236 and I/O duplexer 233 are conditioned by Ku/Ka band LNA 234. The Ku/Ka band demuxing devices 232 separates "element" signals by dividing the conditioned signals to various element ports before translating them from proper frequency slots in Ku/Ka band into a common frequency slot in L/S band by the frequency converters 220. These input beam signals are power amplified by individual power amplifiers 215 in the foreground P/L before radiated by the foreground-link array elements 217.

We have assumed the muxing device 231 performs frequency division multiplexing (FDM) and consistent with an associated device on ground performing demuxing of FDM. However, muxing/demuxing device 231/232 may perform other muxing/demuxing schemes such as time division muxing (TDM), code division muxing CDM, or combinations of TDM, CDM and/or FDM.

Next example presents systems and methods of implementing ad hoc mobile communications for rescued workers in a disaster area via largely spaced multiple small UAVs featuring GBBF or RBFN. The rescued workers shall be equipped with multiple beam terminals.

The term "M1 UAVs 620-1" is used to represent all 4 small UAVs; the M1a UAV 620-1a, the M1b UAV 620-1b, the M1c UAV 620-1c, and the M1d UAV 620-1d in FIG. 6. FIG. 6 depicts an embodiment via multiple M1 UAVs 620-1 for communications mainly to rescue worker community in a coverage area 130.

The ground facility 410 features:
1. multiple beam antennas 411 to connected to various UAV platforms 620-1 concurrently via different Ku/Ka band feeder-links 550,
2. GBBF for both forward link (transmitting) beams and return link (receiving) beams
3. mobile hubs 413 as gateways to terrestrial networks 480 or other UAV based networks.

The M1a, M1b, M1c, and M1d UAVs 620-1 along with their GBBF processing feature multiple beams 1301, 1302, 1303, and etc. in both forward and return links in a reserved public safety frequency band; eg. 4.9 GHz or 700 MHz in US.

The users (rescue worker community) in the coverage areas shall feature multiple tracking-beam terminals 633. Each of the advanced user terminals exhibits capability of tracking the 4 M1 UAVs 620-1 with four separated beams operating at the same frequency slots in a reserved public safety band concurrently. Goode isolations among multiple UAVs operating at same frequency bandwidths, codes and time slots are achieved via spatial isolations from the advanced user terminals. As a result, same spectrum is used 4 times more than the scenarios presented in FIG. 5.

In a first operational scenario of both forward and return links of mobile communications via multiple closely space M1 UAVs 520-1 with ground based beam forming (GBBF) 412 or remote beam forming network (RBFN) via beam-forming among elements of arrays on a UAV. Ku/Ka channels in the feeder links 550 shall be designed with adequate instantaneous bandwidths to support all M1 UAVs 620-1 concurrently. These techniques may include advance multi-beam antennas for the feeder-links in ground facility 410 providing orthogonal beams concurrently connecting to all UAV facilitating frequency reuse. Similarly for the foreground communications P/Ls, various UAVs provide different groups of beams operated at same frequency slots supporting independent data streams. The relative positions among arrays on different UAVs become less important. Radiated RF powers associated with many of these independent data streams among various UAVs are not combined. Information or data streams may be combined for high data rate users via channel bonding.

In a second operational scenario of both forward and return links of mobile communications via multiple closely space M1 UAVs 520-1 with ground based beam forming (GBBF) 412 or remote beam forming network (RBFN) via beam-forming among distributed subarrays; each of which is on a separated UAV. Ku/Ka channels in the feeder links 550 shall be designed with adequate instantaneous bandwidths to support all UAVs concurrently. These techniques may include advance multi-beam antennas for the feeder-links in ground facility providing orthogonal beams connecting to all UAV concurrently facilitating frequency reuse. The spacing among the M1 UAVs 520-1 shall vary slowly. As a result, the relative geometries among elements in this distributed and slow-varying array are very important in maintaining coherency among subarrays. The slow varying array geometries must be continuously calibrated and then properly compensated for both forward links and return links as a part of GBBF functions 412. This operation scenario will allow coherently added stronger radiated signals from multiple M1 UAVs 520-1 to "punch through" debris or man-made structures reaching users with disadvantage terminals or at disadvantaged locations.

However, this group of operational scenarios which exhibit coherent combining via Tx DBF in GBBF among multiple moving UAV platforms 620-1 is very difficult and thus less cost-effective to implement due to dynamic path length calibration and compensations among paths via different UAVs.

We will introduce wave-front multiplexing/demultiplexing (WF muxing/demuxing) techniques for path length calibrations and compensations in Embodiment 10.

Figure 7:
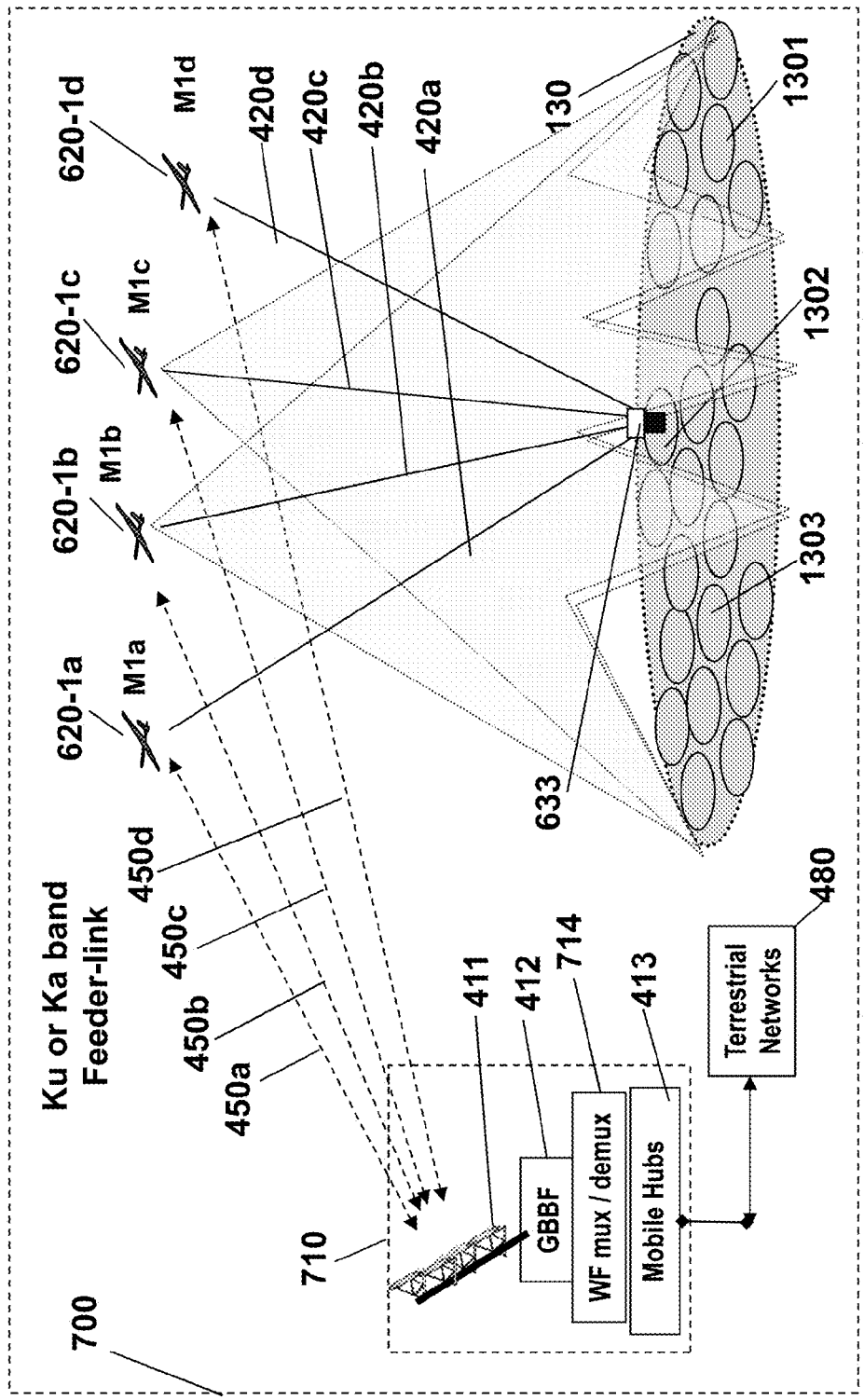
FIG. 7 depicts an operational scenario for multiple UAVs in a formation with ground based beam forming through feeder-links, and foreground links for users. The UAVs are spaced by orders of Kilo-meters. The multiple-UAV based communications features multiple beams foreground communications. Wavefront multiplexing/demultiplexing (WF muxing/demuxing) techniques are used to allow "coherent" power combining of the radiated power from various UAVs in foreground links at user terminals or ground hubs. Users with terminals of multiple tracking beams can take more advantages of the multiple UAVs to achieve multiple folds of channel capacity via frequency reuse.

FIG. 7 depicts a scenario with 4 small UAVs 620-1 performing a communication relay mission via GBBF for residents in L/S bands over an emergency coverage 130. The four small UAVs 620-1$a$, 620-1$b$, 620-1$c$ and 620-1$d$ identified as M1$a$, M1$b$, M1$c$ and M1$d$ are distributed in a fly formation with large distances among them (say, >1 Km). WF muxing and demuxing techniques are utilized in this configuration to perform coherent power combining of radiated signals by the four small UAVs in advanced receivers. The ground hub 710 comprises 4 separated feeder-link tracking antennas 411 at KU/Ka bands, continuously tracking 4 different UAVs 620-1$a$, 620-1$b$, 620-1$c$, and 620-1$d$. These four separated antennas 411 could be replaced by one multi-beam antenna with large instantaneous FOV to track 4 airborne platforms continuously The foreground links 420 of each of the 4 UAVs feature multiple spot beams 1301, 1302, and 1303 in L/S band servicing a coverage 130 with <100 Km in diameter. A ground user 633 may use an advanced user device communicating to other users in or outside the same coverage area 130. The advanced user device 633 features multiple tracking beams at concurrently and independently following all 4 small UAVs 620-1. The multiple-beams of an advanced user terminal operate at same frequency slots among the links between each of the four UAVs 620-1 and the ground user 633. The coverage 130 area may vary depending on requirements on missions.

Onboard each of the 4 small UAV 620-1, the processing from feeder-link to foreground links are identical. Taking that of the M1$a$ UAV 120-1 shown in FIG. 3 as an example, the up-linked signals received by the feeder antenna 236 and I/O duplexer 233 are conditioned by Ku/Ka band LNA 234. The Ku/Ka band demuxing devices 232 separates "element" signals by dividing the conditioned signals to various element ports before translating them from proper frequency slots in Ku/Ka band into a common frequency slot in L/S band by the frequency converters 220. These input beam signals are power amplified by individual power amplifiers 215 in the foreground P/L before radiated by the foreground-link array elements 217.

We have assumed the muxing device 231 perform frequency division multiplexing (FDM) and consistent with an associated device on ground performing demuxing of FDM. However, muxing/demuxing device 231/232 may perform other muxing/demuxing schemes such as time division muxing (TDM), code division muxing CDM, or combinations of TDM, CDM and/or FDM.

Figure 7A:
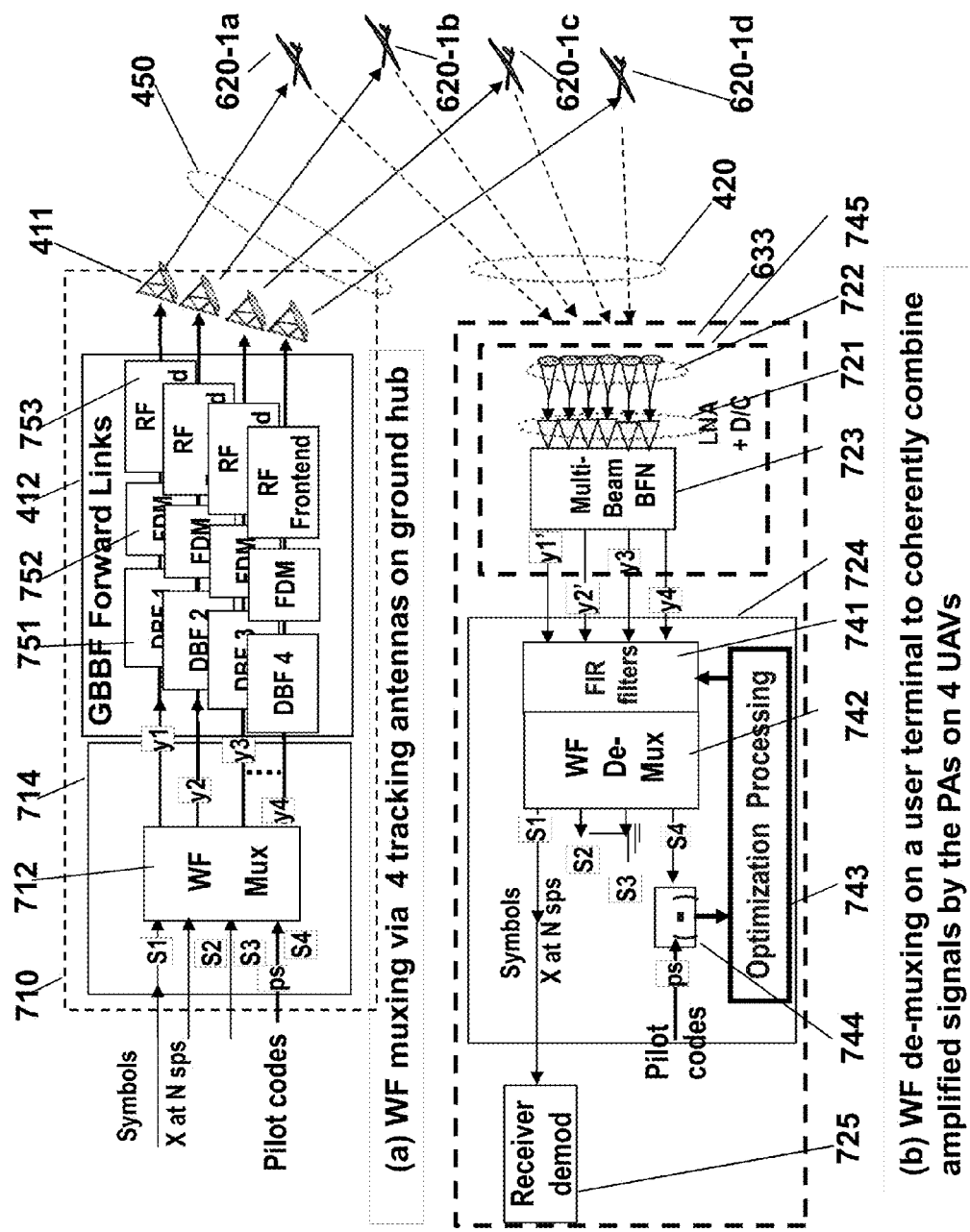
FIGS. 7a and 7b illustrate the operational principle of "coherent power combining" and signal multiplexing via multi-channel waveforms in receivers for three separated users through WF muxing/demuxing techniques.

FIG. 7A depicts a more detailed flow diagram for a forward link transmissions with WF muxing 714 co-located with a GBBF 412 ground facility and WF demuxing 724 in an advanced user terminal 633.

We follow the following notations:
(1) for a WF muxing device
   a. Input ports are referred as "slices":
      First input port of the WF muxer is referred to as "slice 1";
   b. Outputs are called "wave-front components" or "wfcs":
      First output port of the WF muxer is referred to as "wfc 1".
(2) Similarly, for a WF demuxing device
   a. Output ports are referred as "slices":
      First output port of the WF demuxer is referred to as "slice 1";
   b. Inputs are called "wave-front components" or "wfcs":
      First input port of the WF demuxer is referred to as "wfc 1".

In the forward link depicted in FIG. 7A from a ground hub 710 to a user 633 through 4 UAVs 620-1, WF muxing are utilized to transform a first user input, S1, and a probing/diagnostic signal, p1, by a 4-to-4 WF muxer 712 into 4 WF domain signals. S1 connected to slice 1 is designated to be sent to the user terminal 633 in the beam position 1302. Two other signals connected to slice 2 and slice 3 respectively, S2 and S3, are concurrently transmitted through the same 4 UAVs via WF muxing processing. They are intended for other users in the same spot beam 1302. The diagnostic stream, p1, is connected to slice 4.

A WF muxing device may be implemented in many ways including a FFT, a Hadamard matrix in digital formats, or combinations of FFT and Hadamard matrixes. It may also be constructed by a Butler Matrix (BM) in analogue passive circuitry. In FIG. 7$a$, the 4-to-4 WF muxer 712 in the WF muxing/demuxing process facility 714 feature 3 user signal inputs connected to 3 input slices (S1, S2, and S3), and a stream of pilot codes, ps, to the $4^{th}$ input slice.

1. The outputs of the WF muxer 712 are various summations of 4 weighted inputs; s1, s2, s3, and ps. Specifically, y1, y2, y3, and y4 are respectively formulated as:

$$y1(t)=w11*s1(t)+w12*s2(t)+w13*s3(t)+w14*ps(t) \qquad (1.1)$$

$$y2(t)=w21*s1(t)+w22*s2(t)+w23*s3(t)+w24*ps(t) \qquad (1.2)$$

$$y3(t)=w31*s1(t)+w32*s2(t)+w33*s3(t)+w34*ps(t) \quad (1.3)$$

$$y4(t)=w41*s1(t)+w42*s2(t)+w43*s3(t)+w44*ps(t) \quad (1.4)$$

where, $s1(t)$=S1, $s2(t)$=S2, $s3(t)$=S3, and $s4(t)$=S4.

2. A wavefront vector (WFV) featuring 4 WF components (wfc) is defined as a column matrix. There are four such vectors (column matrixes) which are mutually orthogonal:

$$\text{WFV1=WF1=Transport of }[w11,w21,w31,w41] \quad (2.1)$$

$$\text{WFV2=WF2=Transport of }[w12,w22,w32,w42] \quad (2.2)$$

$$\text{WFV3=WF3=Transport of }[w13,w23,w33,w43] \quad (2.3)$$

$$\text{WFV4=WF4=Transport of }[w14,w24,w34,w44] \quad (2.4)$$

3. WFX*WFY=1 if X=Y, otherwise WFX*WFY=0; where X and Y are integers from 1 to 4.
4. $s1(t)$, $s2(t)$, $s3(t)$, and ps(t) are, respectively, "attached" to one of the 4 WF vectors by connecting to a corresponding input port of the WF muxing device 714.
   (1) The outputs $y1(t)$, $y2(t)$, $y3(t)$, and $y4(t)$ are linear combinations of wavefront components (wfcs); the aggregated data streams. The signal stream y1 is the output from the output port wfc-1, y2 from wfc-2, and so on.
   (2) The S1 signal is replicated and appears in all 4 wfc output ports. Actually, S1 is "riding on the WF vector WF1. So are the S2, S3, and ps signals.
   (3) The 4 outputs, y1, y2, y3, and y4 are connected to inputs of 4 separated transmit (Tx) digital beam forming (DBF) processors 751, converting them as parts of 4 sets of element signals for arrays on various UAVs. Assuming Ne array elements for the L/S band foreground communications on each UAV 620-1, a Tx DBF processor 751 shall features Ne element outputs
   (4) Each of the four FDM muxers 752 performs multiplexing on Ne corresponding element signals into a single signal stream, which is frequency up converted and power amplified by a set of RF front end 753 before up-loaded by one of the 4 separated high gain antennas 411 to a designated UAVs 620-1.
   (5) GBBF 412 features 4 sets of multibeam DBF processors 751; each is designated to "service" Ne elements of the array for foreground communications in L/S band. The 4 separated arrays on 4 UAVs for foreground communications will concurrently form L/S band beams pointed to the same beam position 1302. As a result, y1 is delivered to the user terminal 633 via the first UAV 620-1*a*, y2 via the second UAV 620-1*b*, y3 by the third UAV 620-1*c*, and y4 through the 4th UAV 620-1*d*.
   (6) From the point of view of a first user who "owns" the S1 signal stream, the S1 signal stream is relayed to the designated user terminal 633 concurrently by 4 separated UAVs 620-1 through a common frequency slot f1.
   (7) From the point of view of a second user who "owns" the S2 signal stream, S2 signal is relayed to the second user concurrently by the 4 separated UAVs 620-1 through a common frequency slot f1. The second user is collocated in the same beam position 1302 as that of the first user with the terminal 633.
   (8) From the point of view of a third user who "owns" the S3 signal stream, S3 signal is relayed to the third user concurrently by the 4 separated UAVs 620-1 through a common frequency slot f1. The third user is also collocated in the same beam position 1302 as that of the first user with the terminal 633.

These WF domain signals are inputs to four parallel DBF processors 751 in a GBBF facility 710. On the other hand, a multi-beam user receiver 633 features a WF demuxer which will equalize propagation paths enabling the forward link signals which pass through 4 parallel bent-pipe paths including associated electronics with unbalanced phases and amplitude differentials in the uploading ground segment, airborne segment, and ground receiving segment. The four parallel signal paths comprise of propagation segments of (1) 450*a*+420*a*, (2) 450*b*+420*b*, (3) 450*c*+420*c*, and (4) 450*d*+420*d*. The "bent-pipe functions" are performed by the four UAVs M1*a* 620-1*a*, M1*b* 620-1*b*, M1*c* 620-1*c*, and M1*d* 620-1*d*.

Each bent-pipe* functions associated with each UAV 620-1 consist of:
1. receiving array element signals originated from ground processing facility 710 via feeder-link 450,
2. amplifying and filtering received element signals, or conditioning received element signals,
3. frequency-translating, or transponding the conditioned element signals,
4. power-amplifying before re-radiating the transponded element signals by designated array elements toward ground.

The descriptions of "bent-pipe" are to present repeater or transponder functions for signals going through without any regeneration process. These signals may be amplified, filtered, and/or frequency translated. A regeneration process shall include a function of demodulation, and another function of re-modulation.

At a destination, there are 3 functional blocks in the advanced terminal 633;
1. Signals transponded by the four UAVs 620-1 are captured and amplified by a multibeam receiving (Rx) array745. The Rx array comprises of M array elements 722, each followed by a LNA and frequency down converter 721 for conditioning received signals.
2. The M parallel conditioned received signals are sent to a multibeam beam forming network (BFN) 723 which forms multiple tracking beams following the dynamics of the relaying UAVs 620-1. The outputs of the multibeam BFN 723 are 4 received data streams, y1', y2', y3', and y4', which are mainly the corresponding signals of y1, y2, y2, and y4 contaminated by additional noises and external interferences.
3. A WF demux processing 724 consists of a bank of adaptive equalizers 741 and a 4-to-4 WF demuxer 742 to reconstitute the 3 slices of signal streams and a stream of pilot codes;
   (1) The inputs y1', y2', y3', and y4' are connected to 4 adaptive finite-impulse-response (FIR) filters 741 for time, phase, and amplitude equalizations among the 4 propagation paths;
   (2) Individual adaptive filters 741 compensate for phase differentials caused by "dispersions" among the propagation paths (array elements) via a UAV. There will be significant improvement on waveform shape distortions due to dispersions; minimizing a source for inter-symbol interferences.
   (3) Differences among 4 FIR filters 741 are optimized as a group to compensate for time and phase differentials among propagating paths via 4 different UAVs 620-1

(4) weightings of the FIR filters 741 are optimized by an iterative control loop based on comparisons 744 of recovered pilot signals S4 against the injected and known diagnostic signals and an efficient optimization algorithm in an optimization processing 743.
(5) the filtered outputs from the adaptive FIR filters are connected to the WF demuxer.
(6) Among the outputs of the WF demuxer are the 3 slices of desired signal streams, and a pilot signal.
   i. The WF muxer for the first user is customized to receive signals from the first slice, or the $1^{st}$ output port.
   ii. Similarly, the WF muxer for the second user and the third user are, respectively, customized to receive signals from the second slice (the $2^{nd}$ output port) or signals from the third slice (the $3^{rd}$ output port).
(7) The optimization loop utilizing cost minimization criteria in the optimization processing 743 comprises:
   i. Identifying proper observables for the optimization loop including:
      differences between the recovered pilot signal stream and the original;
      correlations of signals from output slices of the WF demuxer 742.
   ii. Generating different cost functions based on various observables
      Converting or mapping various observables into different measurables or cost functions which must be positively defined.
      When an observable meets the desired performance, the corresponding measurable or cost function becomes zero.
      When an observable is only slightly away from the desired performance, the corresponding measurable or cost function is assigned with a small positive number.
      When an observable is far away from the desired performance, the corresponding measurable or cost function is assigned with a large positive number.
   iii. Summing all cost function for a total cost as a numerical indicator the current status of the optimization loop performances,
      When total cost is less than a small positive threshold value, stop the optimization loop; otherwise proceed to procedure 4
   iv. Deriving the gradients of total cost with respect to the weights of the adaptive equalizers which are in the forms of FIR filters.
   v. Calculating new weights of the FIR filters based on a steepest descent algorithm to minimize the total cost of the optimization loop iteratively.
   vi. Updating the weightings in the adaptive equalizer and go to procedure "2."

The pilot codes "ps" is connected to a dedicated input port S4, the $4^{th}$ input slice, of the WF mux 712 in FIG. 7A. It is for illustrations only. The number of inputs may be different than 4, may be more.

In addition, pilot codes may not need dedicated ports for diagnostic. In other embodiments, the pilot codes "ps" use a portion of $4^{th}$ input port S4, the $4^{th}$ input slice, of the WF mux 712 in FIG. 7A through TDM, CDM, and/or FDM techniques. The WF demux 742 in the receive chain 724 must accommodate the time, code, and/or frequency demuxing functions in recovering received pilot codes accordingly.

In another embodiment with time frame by time frame operations, diagnostic signals may feature N independent pilot codes concurrently for the N inputs of the WF mux 712 for a short time slot periodically as a diagnostic time slot, where 4≥N≥1. Majority of the time slots in a frame are dedicated for data transmission only. The WF demux 742 in the receive chain 724 must accommodate the time demuxing functions for the N channels in recovering N independent pilot codes accordingly. The associated optimization may use cross correlations as cost functions among the N-outputs from the WF demux 742 during the diagnostic time slots.

Figure 7B:
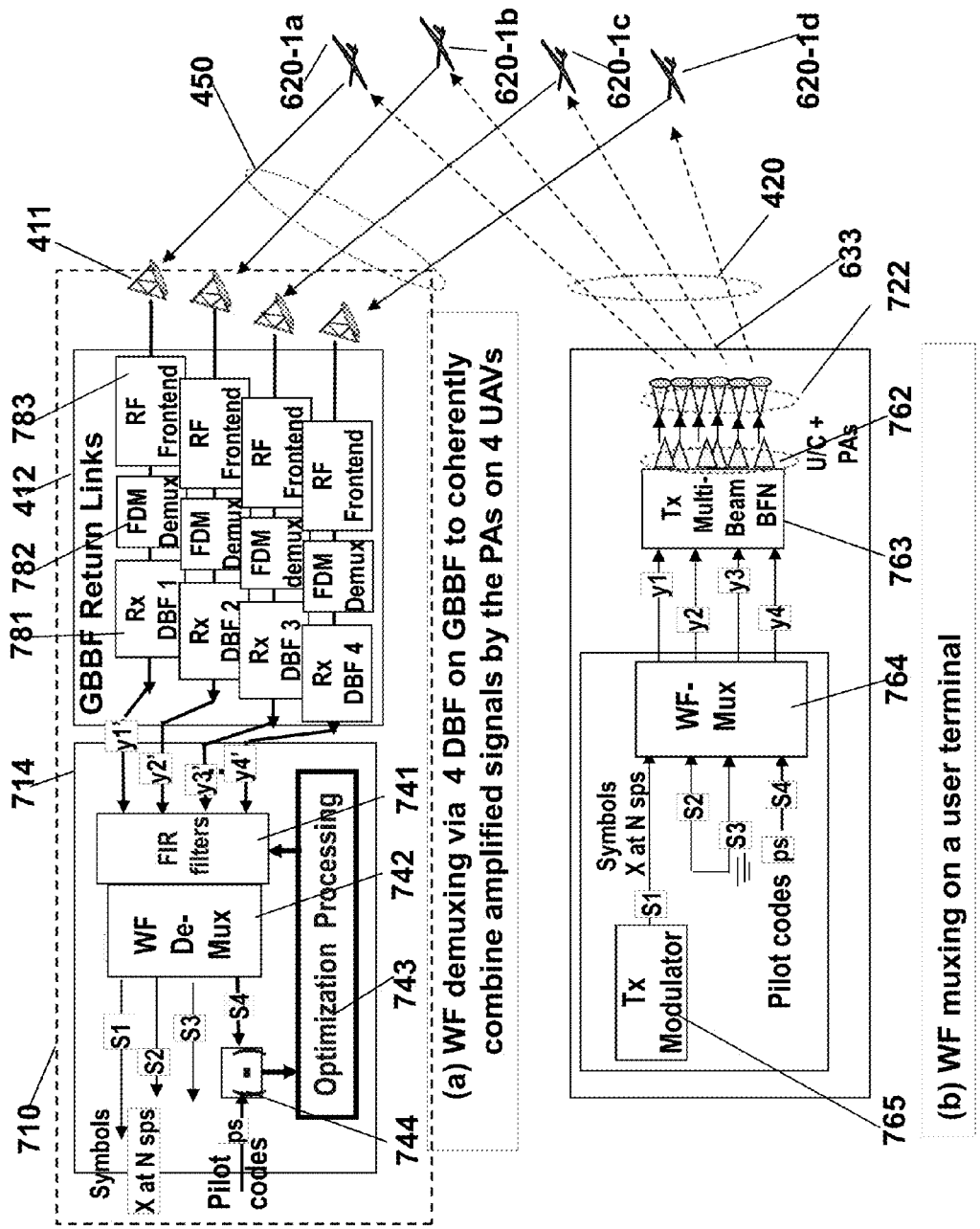

FIG. 7B depicts a more detailed flow diagram for a return link transmissions with WF muxing 764 in an advanced user terminal 633 and a corresponding WF demuxing 742 in the WF mux/demux processing facility 714 collocated with a GBBF 412 ground facility.

For a user in a transmission mode, there are 3 functional blocks in the advanced terminal 633;
1. A WF mux processing featuring a 4-to-4 WF demuxer 764 to transform a stream of modulated signal, S1, in slice-1 originated from a transmitter 765, along with a diagnostic stream in slice-4. Slice-2 and slice-3 are unconnected or grounded.
   a. Other nearby users may use slice-2 and/or slice-3 of other identical WF muxers on individual user terminals for delivering various data streams, S2 and S3, to the same ground hub via the same 4 UAVs 620-1a, 620-1b, 620-1d, and 620-1d over the same frequent slots f1.,
   b. Each user signal stream is riding on a unique WF vector. They would be mutually orthogonal to one other at the outputs of the WF muxers, if they were generated by a WF muxer. But they are generated by three identical WF muxers. In three different user terminals similar to 633.
2. The 4 parallel outputs y1, y2, y3, and y4 from the WF muxer 764 are sent to a multibeam beam forming network (BFN) 723 which forms multiple tracking beams following the dynamics of the relaying UAVs 620-1. The signal stream y1 is from the output port wfc-1, y2 from the output port wfc-2, y3 from the output port wfc-3, and y4 from the output port wfc-4$_{wfc}$.
3. The outputs of the multi-beam transmit BFN 763 are conditioned, frequency up-converted and power amplified by a bank of frequency up-converters and power amplifiers 762, before radiated by array elements 722. The 4 Tx beam signals are mainly the corresponding signals of y1 targeted for the UAV 620-1a, y2 targeted for the UAV 620-1b, y3 targeted for the UAV 620-1c, and y4 targeted for the UAV 620-1d.

Up linked L/S band signals in the foreground are captured and amplified by M receiving (Rx) array elements. The M received element signals on each of the four UAVs 620-1 are transponded and FDM muxed individually. The FDM muxed element signals are relayed back to the GBBF; Those element signals from the UAV M1a 620-1a are via a first down link 450a of the Ku/Ka feeder-links 450. Those element signals from the UAV M1b 620-1b are via a second down link 450b of the Ku/Ka feeder-links 450. Those element signals from the UAV M1c 620-1c and the UAV M1d 620-1de are, respectively via a third down link 450c and a $4^{th}$ downlink 450d of the Ku/Ka feeder-links 450.

These down linked element signals captured by four directional antennas 411 in the mobile hub 710, are conditioned by RF frontend units 783, frequency down converted and FDM demuxed to M outputs at a baseband frequency by FDM demuxers 782, before being sent to multibeam Rx DBFs 781. One of the output ports of each of the 4 Rx DBF shall be assigned to the Tx beams with a common beam position 1302 where the user terminal 633 is located. The outputs from the beams of the 4 Rx DBF 781 aiming at the beam position 1302 are designated as y1", y2", y3", and y4". They are the 4 inputs to the receiving processing of the WF muxing/demuxing processing facility 714. The receiving processing comprises mainly the equalization functions by a bank of 4 adaptive FIR filters 741, and a WF demuxing transformation by a 4-to-4 WF demuxer 742.

After fully optimized via iterative equalizations, the optimized outputs from the first output port slice-1 will be the recovered signals S1 originated from the user terminal 633 in the foreground beam position 1302. The recovered S1 has been riding on the WF1. Similarly, the optimized outputs from the second output port slice-2 will be the recovered signals S2 originated from the second user terminal similar to terminal 633 in the foreground beam position 1302. The recovered S2 has been riding on the WF2.

A receiving processing in the WF muxing/demuxing unit 714 consists of a bank of adaptive equalizers 741 and a 4-to-4 WF demuxer 742 to reconstitute the 3 slices of signal streams and a stream of pilot codes;

(1) The inputs y1', y2', y3', and y4' are connected to 4 adaptive finite-impulse-response (FIR) filters for time, phase, and amplitude equalizations among the 4 propagation paths;

(2) Individual adaptive filters compensate for phase differentials caused by "dispersions" among the propagation paths (array elements) in feeder links via a UAV. There will be significant improvement on waveform shape distortions due to dispersions; minimizing a source for inter-symbol interferences.

(3) Differences among 4 FIR filters 741 are optimized as a group to compensate for time and phase differentials among propagating paths via 4 different UAVs 620-1

(4) weightings of the FIR filters 741 are optimized by an iterative control loop based on comparisons 744 of recovered pilot signals S4 against the injected and known diagnostic signals ps and an efficient optimization algorithm in an optimization processing 743.

(5) the filtered outputs from the adaptive FIR filters 741 are connected to the 4 wfc input ports of the WF demuxer 742.

(6) Among the outputs of the WF demuxer 742 are the 3 slices of desired signal streams, and a pilot signal.
  a. The WF muxer for the first user is customized to receive signals from the first slice, or the $1^{st}$ output port.
  b. Similarly, the WF muxer for the second user and the third user are, respectively, customized to receive signals from the second slice (the $2^{nd}$ output port) or signals from the third slice (the $3^{rd}$ output port).

(7) The optimization loop utilizing cost minimization criteria in the optimization processing 743 comprises:
  a. Identifying proper observables for the optimization loop including:
    differences between the recovered pilot signal stream and the original.
    Correlations of signals from output slices of the WF demuxer 742
  b. Generating different cost functions based on various observables
    Converting or mapping various observables into different measurables or cost functions which must be positively defined.
    a. When an observable meets the desired performance, the corresponding measurable or cost function becomes zero.
    b. When an observable is only slightly away from the desired performance, the corresponding measurable or cost function is assigned with a small positive number.
    c. When an observable is far away from the desired performance, the corresponding measurable or cost function is assigned with a large positive number.
  c. Summing all cost function for a total cost as a numerical indicator the current status of the optimization loop performances,
    When total cost is less than a small positive threshold value, stop the optimization loop;
    otherwise proceed to procedure d
  d. Deriving the gradients of total cost with respect to the weights of the adaptive equalizers which are in the forms of FIR filters.
  e. Calculating new weights of the FIR filters based on a steepest descent algorithm to minimize the total cost of the optimization loop iteratively.
  f. Updating the weightings in the adaptive equalizer and go to procedure b.

Next example presents architectures and methods of implementing forward link of mobile communications in a disaster area via largely spaced multiple small UAVs featuring GBBF or RBFN, and WF muxing/demuxing for coherent power combining in receivers We shall use the term "M1 UAVs 620-1" to represent all 4 small UAVs; the M1a UAV 620-1a, the M1b UAV 620-1b, the M1c UAV 620-1c, and the M1d UAV 620-1d in FIG. 7.

FIG. 7 depicts an embodiment via multiple M1 UAVs 620-1 for communications mainly to rescue worker community in a coverage area 130.

The ground facility 710 features:
1. multiple beam antennas 411 to connected to various UAV platforms 620-1 concurrently via different Ku/Ka band feeder-links 450,
  a. link 450a between the ground facility 710 and M1a UAV 620-1a;
  b. link 450b between the ground facility 710 and M1b UAV 620-1b;
  c. link 450c between the ground facility 710 and M1c UAV 620-1c;
  d. link 450d between the ground facility 710 and M1d UAV 620-1d;
2. GBBF for both forward link (transmitting) beams and return link (receiving) beams;
3. mobile hubs 413 as gateways to terrestrial networks 480 or other UAV based networks.

The M1a, M1b, M1c, and M1d UAVs 620-1 along with their GBBF processing feature multiple beams 1301, 1302, 1303, and others in both forward and return links in a reserved public safety frequency band; eg. 4.9 GHz or 700 MHz in US.

The users (rescue worker community) in the coverage areas shall feature multiple tracking-beam terminals 633. Each of the advanced user terminals exhibits capability of tracking the 4 M1 UAVs 620-1 with four separated beams operating at the same frequency slots in a reserved public safety band concurrently. For a user 633 with a multi-beam terminal there are 4 concurrent links;
1. link 420a between the multi-beam user 633 and M1a UAV 620-1a;

2. link 420*b* between the multi-beam user 633 and M1*b* UAV 620-1*b;*
3. link 420*c* between the multi-beam user 633 and M1*c* UAV 620-1*c;* and
4. link 420*d* between the multi-beam user 633 and M1*d* UAV 620-1*d;*

Good isolations among multiple UAVs 620-1 operating at same frequency bandwidths, codes and time slots are achieved via spatial isolations from the advanced user terminals. As a result, same spectrum is used 4 times more than the scenarios presented in FIG. 5.

WF muxing/demuxing 712/742 is utilized for calibrations and compensations on unbalanced delays and attenuations among four propagation paths and associated electronics. The four paths are:
1. 450-1*a*+620-1*a;*
2. 450-1*b*+620-1*b;*
3. 450-1*c*+620-1*c;* and
4. 450-1*d*+620-1*d;*

In forward links of mobile communications via multiple largely space M1 UAVs 620-1 with ground based beam forming (GBBF) 412 or remote beam forming network (RBFN) via beam-forming 751 among distributed subarrays; each of which is on a separated UAV. Ku/Ka channels in the feeder links 450 shall be designed with adequate instantaneous bandwidths to support all 4 M1 UAVs 620-1 concurrently. These techniques may include advance multibeam antennas for the feeder-links in ground facility providing orthogonal beams connecting to all UAV concurrently facilitating frequency reuse. The spacing among the M1 UAVs 520-1 shall vary slowly. As a result, the relative geometries among elements in this distributed and slow-varying array are very important in maintaining coherency among subarrays. The slow varying array geometries must be continuously calibrated and then properly compensated for forward links.

This operation scenario will allow coherently added stronger radiated signals from multiple M1 UAVs 520-1 to "punch through" debris or man-made structures reaching users with disadvantage terminals or at disadvantaged locations.

It is the WF muxing/demuxing with adaptive equalization process which dynamically compensates for the differentials of amplitudes and phases among the 4 separated propagation paths via 4 individual UAVs based on "recovered" probing signals on WF demuxer, enabling the capability of continuously maintaining "coherency" among signals passing through four independent UAVs.

Next example presents architectures and methods of implementing return link of mobile communications in a disaster area via largely spaced multiple small UAVs featuring GBBF or RBFN, and WF muxing/demuxing for coherent power combining in receivers For a user in a transmission mode, there are 3 functional blocks in the advanced terminal 633 as depicted in FIG. 7B;
1. A WF mux processing featuring a 4-to-4 WF demuxer 764 to transform a stream of modulated signal, S1, in slice-1 originated from a transmitter 765, along with a diagnostic stream in slice-4. Slice-2 and slice-3 are unconnected or grounded.
2. The 4 parallel outputs y1, y2, y3, and y4 from the WF muxer 764 are sent to a multibeam beam forming network (BFN) 763 which forms multiple tracking beams following the dynamics of the relaying UAVs 620-1. The signal stream y1 is from the output port wfc-1, y2 from the output port wfc-2, y3 from the output port wfc-3, and y4 from the output port wfc-4*wfc.*
3. The outputs of the multi-beam transmit BFN 763 are conditioned, frequency up-converted and power amplified by a bank of frequency up-converters and power amplifiers 762, before radiated by array elements 722. The 4 Tx beam signals are mainly the corresponding signals of y1 targeted for the UAV 620-1*a*, y2 targeted for the UAV 620-1*b*, y3 targeted for the UAV 620-1*c*, and y4 targeted for the UAV 620-1*d*.

Up linked L/S band signals in the foreground are captured and amplified by M receiving (Rx) array elements on the UAVs 620-1. The M received element signals on each of the four M1 UAVs 620-1 are conditioned, transponded and FDM muxed individually. The FDM muxed element signals are relayed back to the GBBF 412. Those element signals from the UAV M1*a* 620-1*a* are via a first down link 450*a* of the Ku/Ka feeder-links 450. Those element signals from the UAV M1*b* 620-1*b* are via a second down link 450*b* of the Ku/Ka feeder-links 450. Those element signals from the UAV M1*c* 620-1*c* and the UAV M1*d* 620-1*d* are, respectively via a third down link 450*c* and a $4^{th}$ downlink 450*d* of the Ku/Ka feeder-links 450.

These down linked element signals captured by four directional antennas 411 in the mobile hub 710, are conditioned by RF frontend units 783, frequency down converted and FDM demuxed to M outputs at a baseband frequency by FDM demuxers 782, before being sent to multibeam Rx DBFs 781. One of the output ports of each of the 4 Rx DBF shall be assigned to the Tx beams with a common beam position 1302 where the user terminal 633 is located. The outputs from the beams of the 4 Rx DBF 781 aiming at the beam position 1302 are designated as y1", y2", y3", and y4". They are the 4 inputs to the receiving processing of the WF muxing/demuxing processing facility 714. The receiving processing comprises mainly the equalization functions by a bank of 4 adaptive FIR filters 741, and a WF demuxing transformation by a 4-to-4 WF demuxer 742.

After fully optimized via iterative equalizations, the optimized outputs from the first output port slice-1 will be the recovered signals S1 originated from the user terminal 633 in the foreground beam position 1302. The recovered S1 has been riding on the WF1. Similarly, the optimized outputs from the second output port slice-2 will be the recovered signals S2 originated from the second user terminal similar to terminal 633 in the foreground beam position 1302. The recovered S2 has been riding on the WF2.

The pilot codes "ps" is connected to a dedicated input port S4, the $4^{th}$ input slice, of the WF mux 764 in FIG. 7B. It is for illustrations only. The number of inputs may be different than 4, and pilot codes may not need dedicated ports for diagnostic.

In other embodiments, the pilot codes "ps" using a portion of $4^{th}$ input port or input slice through TDM, CDM, and/or FDM techniques. The WF demux 742 in the receive chain 714 must accommodate the time, code, and/or frequency demuxing functions in recovering received pilot codes accordingly.

In another embodiment with time frame by time frame operations, diagnostic signals may feature N independent pilot codes concurrently for the N inputs of the WF mux 764 for a short time slot periodically as a diagnostic time slot, where 4≥N≥1. Majority of the time slots in a frame are dedicated for data transmission only. The WF demux 742 in the receive chain 714 must accommodate the time demuxing functions for the N channels in recovering N independent pilot codes accordingly. The associated optimization may use cross correlations as cost functions among the N-outputs from the WF demux 742 during the diagnostic time slots.

Embodiment 1

This embodiment presents architectures and methods of implementing mobile communications in a disaster area via largely spaced multiple UAVs featuring GBBF or RBFN, and WF muxing/demuxing for transmission redundancy and data security, not for coherent power combining in receivers. It uses WF muxing transformation on signals, not on waveforms, as preprocessing enabling multi-channel propagations of various waveforms on sums of the same multiple signals with different sets of weighting coefficient. The modulators are placed after WF muxing in the transmission site.

On a multi-channel receiver, received WFM waveforms are demodulated, converting them to WFM signals, which are used to reconstruct original signals via a non-coherent combining performed by a corresponding WF demuxing transformation.

Similar configurations taking advantages of WF muxing/demuxing for non-coherent combining are applicable to communications via multiple satellites, air platforms including UAVs, terrestrial mobile communications, Passive Optical Network (PON) via optical fibers, and/or Internet IP connectivity for transmission redundancy and better data security. The dynamic transmission features built-in redundancy and data privacy. It is always important. For video streaming via multiple mirror sites in IP Internet network, this is a very powerful tool to gain speed on delivery of video packages.

Figure 8B:
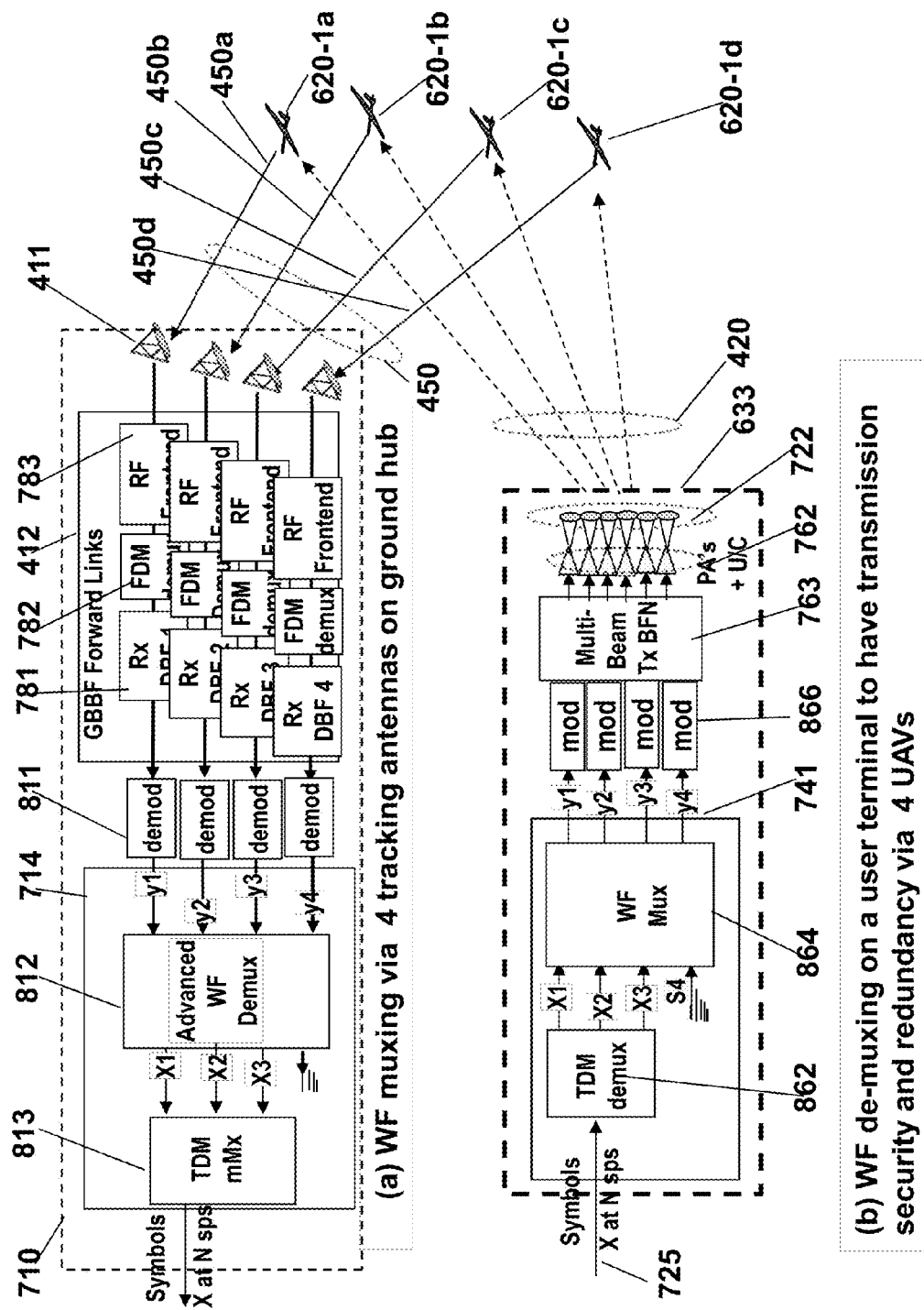

FIG. 8a and FIG. 8b depict functional flow diagrams for a forward link and return link transmissions, respectively, with WF muxing/demuxing techniques not for "coherent power combining" but for data transmission security and redundancy. The techniques concurrently provide redundancy and camouflage on segment data streams. The transmitted data streams in the forms of WF muxed segments can be designed, as an example, with a 4-for-3 redundancy to enable capability at destinations of recovering original data streams with any 3 of the 4 WF muxed segments. Each WF muxed segment is delivered independently via one of the 4 UAVs 620-1.

In the forward link depicted in FIG. 8A from a ground hub 710 to a user 633 through 4 UAVs 620-1, WF muxing are utilized to transform 3 segmented data streams X1, X2, and X3 from a first user input, X, by a 4-to-4 WF muxer 814 into 4 WF domain signals; y1, y2, y3, and y4. The segmented streams are generated by a TDM demuxer 812. The input X of the TDM demuxer 812 is flowing at N samples per second, and its three segmented outputs X1, X2, and X3 are flowing at N/3 samples per second. X1 connected to slice 1 is designated to be sent to the user terminal 633 in the beam position 1302. Two other signals connected to slice 2 and slice 3 respectively, X2 and X3, are transmitted through the same 4 UAVs via WF muxing processing.

A WF muxing device may be implemented in many ways including a FFT, a Hadamard matrix in digital formats, or combinations of FFT and Hadamard matrixes. It may also be constructed by a Butler Matrix (BM) in analogue passive circuitry. In FIG. 8a, the 4-to-4 WF muxer 814 features a 4-to-4 Hadamard matrix. 3 segmented user signals (X1, X2, and X3) are connected to the first 3 input slices, and a "zero" signals stream (grounding) is connected to the $4^{th}$ input slice;

The outputs of the WF muxer 814 are various summations of 4 weighted inputs; X1, X2, X3, and "zero signals". Specifically, y1, y2, y3, and y4 are respectively formulated as:

$$y1(t)=w11*x1(t)+w12*x2(t)+w13*x3(t)+w14*0 \quad (3.1)$$

$$y2(t)=w21*x1(t)+w22*x2(t)+w23*x3(t)+w24*0 \quad (3.2)$$

$$y3(t)=w31*x1(t)+w32*x2(t)+w33*x3(t)+w34*0 \quad (3.3)$$

$$y4(t)=w41*x1(t)+w42*x2(t)+w43*x3(t)+w44*0 \quad (3.4)$$

where,
x1(t)=X1, x2(t)=X2, and x3(t)=X3,
and elements in the 4-to-4 Hadamard matrix are arranged in 4 row vectors:

$$[w11,w12,w13,w14]=[1, 1, 1, 1] \quad (3.5)$$

$$[w21,w22,w23,w24]=[1, 1, 1, 1] \quad (3.6)$$

$$[w31,w32,w33,w34]=[1, 1, 1, 1] \quad (3.7)$$

$$[w41,w42,w43,w44]=[1, 1, 1, 1] \quad (3.8)$$

A wavefront vector (WFV) featuring 4 WF components (wfc) is defined as a column matrix of the 4-to-4 Hadamard matrix. There are four such vectors (column matrixes) which are mutually orthogonal:

$$WFV1=WF1=\text{Transport of } [1,1,1,1] \quad (4.1)$$

$$WFV2=WF2=\text{Transport of } [1,-1,1,-1] \quad (4.2)$$

$$WFV3=WF3=\text{Transport of } [1,1,-1,-1] \quad (4.3)$$

$$WFV4=WF4=\text{Transport of } [1,-1,-1,1] \quad (4.4)$$

WFX*WFY=1 if X=Y, otherwise WFX*WFY=0; where X and Y are integers from 1 to 4.

x1(t), x2(t), x3(t), and "zero signals are, respectively, "attached" to one of the 4 WF vectors by connecting to a corresponding input port of the WF muxing device 814.

The outputs y1(t), y2(t), y3(t), and y4(t) are linear combinations of wavefront components (wfcs); the aggregated data streams. The signal stream y1 is the output from the output port wfc-1, y2 from wfc-2, and so on.

The X1 signal is replicated and appears in all 4 wfc output ports. Actually, X1 is "riding on the WF vector WF1. So are the X2, X3, and "zero" signals.

The 4 outputs, y1, y2, y3, and y4 are connected to 4 separated modulators 816 converting data inputs into transmission waveforms. There are 4 sets of WFM waveforms at the outputs of the four modulators 816 representing 4 segmented data streams; y1, y2, y3, and y4, in the WF muxed format. The data streams; y1, y2, y3, and y4, are referred as WFM signals or WFM data; and the corresponding 4 streams of waveforms are the 4 WFM waveform streams or WFM waveforms.

The 4 sets of waveforms are delivered to 4 separated transmit (Tx) digital beam forming (DBF) processors 751, converting them as parts of 4 sets of element signals for arrays on various UAVs. Assuming Ne array elements for the L/S band foreground communications on each UAV 620-1, a Tx DBF processor 751 shall features Ne element outputs.

Each of the four FDM muxers 752 performs multiplexing on Ne corresponding element signals into a single signal stream, which is frequency up converted and power amplified by a set of RF front end 753 before up-loaded by one of the 4 separated high gain antennas 411 to a designated UAVs

620-1. GBBF 412 features 4 sets of multibeam DBF processors 751; each is designated to "service" Ne elements of the array for foreground communications in L/S band.

The 4 separated arrays on 4 UAVs for foreground communications will concurrently form L/S band beams pointed to the same beam position 1302. As a result, waveforms representing y1 is delivered to the user terminal 633 via the first UAV 620-1a, those for y2 via the second UAV 620-1b, those for y3 by the third UAV 620-1c, and those for y4 through the 4$^{th}$ UAV 620-1d.

From the point of view of the X1 signal stream, the X1 signal stream is relayed to the designated user terminal 633 concurrently by 4 separated UAVs 620-1 through a common frequency slot f1. From the point of view of the X2, and X3 signal stream, they are relayed to the same designated user terminal 633 concurrently by the 4 separated UAVs 620-1 through a common frequency slot f1.

At a destination, there are 3 functional blocks in the advanced terminal 633; (1) a multibeam antenna, (2) advance WF demuxing processor, and (3) a de-segmenting processing.

Multi-Beam Receiver

Signals transponded by the four UAVs 620-1 are captured, amplified and demodulated by a multibeam receiving (Rx) array841. The Rx array 841 comprises of M array elements 721, each followed by a LNA and frequency down converter 722 for conditioning received signals. The M parallel conditioned received signals are sent to a multibeam beam forming network (BFN) 723 which forms multiple tracking beams following the dynamics of the 4 relaying UAVs 620-1. The outputs of the multi-beam BFN 723 featuring 4 received waveform sets representing data streams, y1', y2', y3', and y4' are sent to the 4 demodulators 824 for recovery of the data streams, y1', y2', y3', and y4' contaminated by additional noises and external interferences. The qualities (SNR, and/or BER) of the recovered data streams are highly dependent on the communications links between the mobile hub 710 and user terminals via four UAVs.

Advanced WF Demux

A WF demux processing 824 features a processing based on the 4-to-4 Hadamard matrix with the 16 parameters depicted in equation (3) WF demuxer 842 to reconstitute the 3 slices of signal streams X1, X2, and X3 and a stream of zero signals. Based on equation (3), the demodulated segment streams (WF muxed segments) via the 4-to-4 Hadamard transform 814 shall feature the following;

$$y1'(t)=x1'(t)+x2'(t)+x3'(t)+0 \quad (5.1)$$

$$y2'(t)=x1'(t)-x2'(t)+x3'(t)-0 \quad (5.2)$$

$$y3'(t)=x1'(t)+x2'(t)-x3'(t)-0 \quad (5.3)$$

$$y4'(t)=x1'(t)-x2'(t)-x3'(t)+0 \quad (5.4)$$

There are three unknown X1', X2', X3' with 4 linear combination equations of known values. There is built-in redundancy; only 3 out of the 4 demodulated WF muxed segments are needed to reconstruct the 3 original segments; X1', X2', and X3'.

To take advantage of redundancy in WF muxing processing 814, the advanced WF demuxing process 842 may not use conventional Hadamard Matrix. As an example for illustration, let us assume the 3$^{rd}$ UAV becomes unavailable. Therefore y3'(t) is absent in the reconstruction process. Based on equations (5.1) and (5.4)

$$y1'(t)+y4'(t)=2*x1'(t) \quad (5.5a),$$

therefore, $$x1'(t)=\tfrac{1}{2}(y1'(t)+y4'(t)) \quad (5.5b)$$

Based on equations (5.1) and (5.2), $$y1'(t)-y2'(t)=2*x2'(t) \quad (5.6a),$$

therefore, $$x2'(t)=\tfrac{1}{2}(y1'(t)-y2'(t)) \quad (5.6b)$$

Based on equations (5.2) and (5.4), $$y2'(t)-y4'(t)=2*x3'(t) \quad (5.7a)$$

therefore.

$$x3'(t)=\tfrac{1}{2}(y2'(t)-y4'(t)) \quad (5.7b)$$

This ad hoc solution is good for 1 of possible 24 possibilities with 4-for-3 redundancy.

When all 4 demodulated WF muxed segments from the demodulators 824 are available in a 4-for 3 redundancy configuration, there are 5 different formulations for WF demuxing to reconstruct the 3 segmented data streams X1, X2, and X3. By comparing 5 results from all possible data reduction formulations, similar techniques using advanced WF demux 842 can be used to assessing 4 independent propagation paths, determine if the 4 UAVs 620-1 relaying "contaminated" data, and even determine which one is contaminated if only one of the 4 UAVs is compromised.

De-Segmenting Processing

A TDM muxer 843 is used to "de-segment" the three recovered segmented data streams X1', X2', and X3'. The re-constructed data stream X' shall flow at the data rate of N samples per second.

In this illustration for forward links, a WF mux processing 814 features a processing for creating data security, and redundancy based on segmented data from a signal data streams. The secured segmented data streams are delivered to a destination with multibeam receiving capability. The receiving terminal concurrently captures multiple segments from 4 UAV platforms. It only requires any three out of the 4 segment to faithfully reconstruct the original data streams.

Conceivably, the 3 segmented streams can be three independent data streams for three targeted users within a common beam position (e.g. 1302 in FIG. 7). However, every user must have capability to recover 3 out of the 4 WF muxed data streams, and their receiver must be customized to only access of designated data only. As indicated in equation (5.5b), (5.6b), and (5.7b), a user may derive the designated data streams for him or her by manipulating two of three received data streams.

FIG. 8B depicts a flow diagram for a return link transmissions with WF muxing 764 in an advanced user terminal 633 and a corresponding WF demuxing 724 collocated with a GBBF 412 ground facility.

For a user in a transmission mode, there are 3 functional blocks in his or her advanced terminal 633. A WF mux processing featuring a 4-to-4 WF demuxer 864 to transform 3 segmented data streams, X1 X2 and X3 in its first input ports (slice-1, slice-2 and slice-3) and zero signal stream in slice-4. X1, X2, and X3 are flowing at a rate of N/3 samples per second, and are originated from a data stream 725 via a TDM demuxer 862. The input data stream X is flowing at a rate of N samples per second. A 4-to-4 Hadamard matrix is used as the functions for the WF muxing 864. Formulations of Hadamard Matrix are depicted in Equation 3. They are repeated below $$y1(t)=w11*x1(t)+w12*x2(t)+w13*x3(t)+w14*0 \quad (3.1)$$

$$y2(t)=w21*x1(t)+w22*x2(t)+w23*x3(t)+w24*0 \quad (3.2)$$

$$y3(t)=w31*x1(t)+w32*x2(t)+w33*x3(t)+w34*0 \quad (3.3)$$

$$y4(t)=w41*x1(t)+w42*x2(t)+w43*x3(t)+w44*0 \quad (3.4)$$

where $x1(t)=X1$, $x2(t)=X2$, and $x3(t)=X3$.

The signal stream y1 is from the output port wfc-1, y2 from the output port wfc-2, y3 from the output port wfc-3, and y4 from the output port wfc-4 wfc. The 4 parallel outputs y1, y2, y3, and y4 are sent to 4 parallel modulators 866 before connected to a Tx multibeam beam forming network (BFN) 763 which forms multiple tracking beams following the dynamics of the relaying UAVs 620-1. The modulators 866 convert 4 parallel data streams; (y1, y2, y3, and y4) into 4 sets of flowing waveforms representing the 4 parallel data streams.

The outputs of the multi-beam transmit BFN 763 are conditioned, frequency up-converted and power amplified by a bank of frequency up-converters and power amplifiers 762, before radiated by array elements 722. The 4 Tx beam signals are mainly the corresponding waveforms representing y1 targeted for the UAV 620-1a, those representing y2 targeted for the UAV 620-1b, those representing y3 targeted for the UAV 620-1c, and those representing y4 targeted for the UAV 620-1d.

Up linked L/S band signals in the foreground are captured and amplified by M receiving (Rx) array elements of each of the 4 UAV 620-1. The M received element signals on each of the four UAVs 620-1 are transponded and FDM muxed individually. The FDM muxed element signals are relayed back to the GBBF. Those element signals from the UAV M1a 620-1a are via a first down link 450a of the Ku/Ka feeder-links 450. Those element signals from the UAV M1b 620-1b are via a second down link 450b of the Ku/Ka feeder-links 450. Those element signals from the UAV M1c 620-1c and the UAV M1d 620-1 de are, respectively via a third down link 450c and a 4$^{th}$ downlink 450d of the Ku/Ka feeder-links 450.

These down linked element signals captured by four directional antennas 411 in the mobile hub 710, are conditioned by RF frontend units 783, frequency down converted and FDM demuxed to M outputs at a baseband frequency by FDM demuxers 782, before being sent to multibeam Rx DBFs 781. One of the output ports of each of the 4 Rx DBFs 781 shall be assigned to the Rx beams with a common beam position 1302 where the user terminal 633 is located. The outputs from the beams of the 4 Rx DBFs 781 aiming at the beam position 1302 are sent to 4 demodulators 811. The outputs from the demodulators 811 are designated as y1", y2", y3", and y4". They are the 4 inputs to the receiving processing of the WF muxing/demuxing processing facility 714. The receiving processing comprises mainly a WF demuxing transformation by an advanced WF demuxer 812.

A WF demux processing 812 features a processing based on the 4-to-4 Hadamard matrix with the 16 parameters depicted in equation (3) WF demuxer 842 to reconstitute the 3 slices of signal streams X1', X2', and X3' and a stream of zero signals. Based on equation (3), the demodulated segment streams (WF muxed segments) via the 4-to-4 Hadamard transform 814 shall feature the following;

$$y1'(t)=x1'(t)+x2'(t)+x3'(t)+0 \quad (6.1)$$

$$y2'(t)=x1'(t)-x2'(t)+x3'(t)-0 \quad (6.2)$$

$$y3'(t)=x1'(t)+x2'(t)-x3'(t)-0 \quad (6.3)$$

$$y4'(t)=x1'(t)-x2'(t)-x3'(t)+0 \quad (6.4)$$

There are three unknown X1', X2', X3' with 4 linear combination equations of known values. There is built-in redundancy; only 3 out of the 4 demodulated WF muxed segments are needed to reconstruct the 3 original segments; X1', X2', and X3'.

To take advantage of redundancy in WF muxing processing 864, the advanced WF demux process 812 will not use conventional Hadamard Matrix. As an example for illustration, let us assume the 3$^{rd}$ UAV becomes unavailable. Therefore y3'(t) is absent in the reconstruction process. Based on equations (6.1) and (6.4):

$$y1'(t)+y4'(t)=2*x1'(t) \quad (6.5a),$$

$$\text{therefore, } x1'(t)=\tfrac{1}{2}(y1'(t)+y4'(t)) \quad (6.5b)$$

Based on equations (6.1) and (6.2):

$$y1'(t)-y2'(t)=2*x2'(t) \quad (6.6a),$$

$$\text{therefore, } x2'(t)=\tfrac{1}{2}(y1'(t)-y2'(t)) \quad (6.6b)$$

Based on equations (6.2) and (6.4)

$$y2'(t)-y4'(t)=2*x3'(t) \quad (6.7a)$$

$$\text{therefore } x3'(t)=\tfrac{1}{2}(y2'(t)-y4'(t)) \quad (6.7b)$$

This ad hoc solution is good for 1 of possible 24 possibilities with 4-for-3 redundancy.

When all 4 demodulated WF muxed segments from the demodulators 824 are available in a 4-for 3 redundancy configuration, there are 5 different formulations for WF demuxing to reconstruct the 3 segmented data streams X1, X2, and X3. By comparing 5 results from all possible data reduction formulations, similar techniques using advanced WF demux 842 can be used to assessing 4 independent propagation paths, determine if the 4 UAVs 620-1 relaying "contaminated" data, and even determine which one is contaminated if only one of the 4 UAVs is compromised.

A TDM muxer 813 is used to "de-segment" the three recovered segmented data streams X1', X2', and X3'. The re-constructed data stream X' shall flow at the data rate of N samples per second.

FIG. 8c depicts a numerical example via three different processing and delivering methods via 4 separated air platforms, e.g. the 4 UAVs 620. An original data set featuring 12 numerical numbers, [1, 2, 3, 4, 5, 6, 7, 8, 9, 10, 11, 12], will be "delivered" from a hub H to three user mobile users 1, 2, and 3 via three different methods, respectively. Let us assume all 3 mobile users with advanced multibeam terminals which will track the 4 UAVs 640 continuously and simultaneously.

Three different methods for preprocessing features:
1. Method 1; segmentation only.
2. Method 2; segmentation and WF muxing without redundancy
3. Method 3; segmentation and WF muxing with redundancy.

Method 1: The original data is segmented into 4 subsets each with 3 numbers as following; $x1(n)$=[1, 5, 9], $x2(N)$=[2, 6, 10], $x3(N)$=[3, 7, 11], and $x4(N)$=[4, 8, 12]. These four subsets are uploaded to 4 UAVs, and delivered to the designated mobile user 1 with a multibeam terminal 1, which will need all 4 segmented data subsets for original data reconstitutions.

Method 2; The original data is segmented into 4 subsets each with 3 numbers, and then the 4 subsets are concurrently sent to a 4-to-4 WF muxing device, generating 4 new WF muxed data subsets without redundancy. Each segmented subset features 3 numbers; same results from Method 1. The segmented subsets are x1(N)=[1, 5, 9], x2(N)=[2, 6, 10], x3(N)=[3, 7, 11], and x4(N)=[4, 8, 12]. The 4 subsets of WF muxed data, yk(N) with k from 1 to 4 and N from 1 to 3, are generated via a 4-to-4 WF muxing represented by the following matrix operation;

$$y1(N)=x1(N)+x2(N)+x3(N)+x4(N) \quad (6.8.1)$$

$$y2(N)=x1(N)-x2(N)+x3(N)-x4(N) \quad (6.8.2)$$

$$y3(N)=x1(N)-x2(N)-x3(N)-x4(N) \quad (6.8.3)$$

$$y4(N)=x1(N)-x2(N)-x3(N)+x4(N) \quad (6.8.4)$$

The WF muxed data subsets, y1(N)=[10, 26, 42], y2(N)=[−2, −2, −2], y3(N)=[−4, −4, −4], and y4(N)=[0, 0, 0] are uploaded to 4 UAVs individually, and delivered to the designated mobile user 2 with a multibeam terminal 2. The terminal for the mobile user 2 will need all 4 WF muxed data subsets to reconstitute the original data.

Method 3; The original data is segmented into 3 subsets each with 4 numbers, and then the 3 subsets are concurrently sent to a 4-to-4 WF muxing device, generating 4 new WF muxed data subsets. As a result, there exists built-in redundancy. Each segmented subset features 4 numbers, and they are x1(N)=[1, 4, 7, 10], x2(N)=[2, 5, 8, 11], and x3(N)=[3, 6, 9, 12]. The 4 subsets of WF muxed data, yk(N) with k from 1 to 4 and N from 1 to 4, are generated via a 4-to-4 WF muxing represented by the following matrix operation;

$$y1(N)=x1(N)+x2(N)+x3(N)+0 \quad (6.9.1)$$

$$y2(N)=x1(N)-x2(N)+x3(N)-0 \quad (6.9.2)$$

$$y3(N)=x1(N)-x2(N)+x3(N)-0 \quad (6.9.3)$$

$$y4(N)=x1(N)-x2(N)-x3(N)+0 \quad (6.9.4)$$

The 4 WF muxed data subsets, y1(N)=[5, 15, 24, 33], y2(N)=[2, 5, 8, 11], y3(N)=[0, 3, 6, 9], and y4(N)=[−4, −7, −10, −13] are uploaded to 4 UAVs individually, and delivered to the designated mobile user 3 with a multibeam terminal 3. The terminal for the mobile user 3 will only need any three of the 4 WF muxed data subsets to reconstitute the original data. There is a feature of building redundancy.

End of Embodiment 1

Embodiment 2

This embodiment presents architectures and methods of implementing calibrations and compensations among multiple channels in feeder-links for GBBF using WF muxing and demuxing. Element signals and known diagnostic (probing) signals will be assigned and attached to various multi-dimensional WF vectors. Various multi-dimensional WF vector components will utilize different propagation channels in the feeder-links.

Figure 9A:
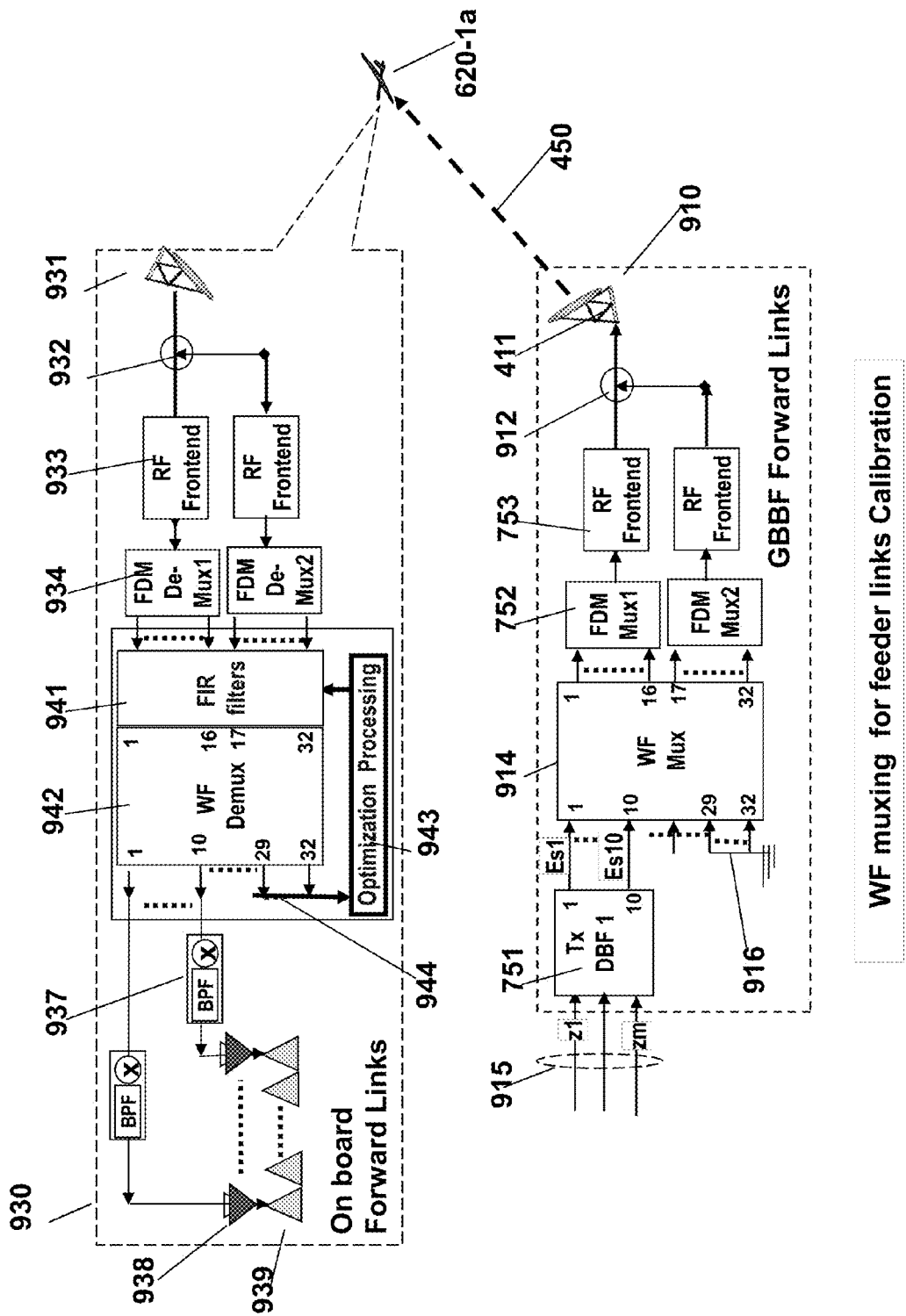
FIGS. 9a, 9b, and 9c illustrate the feeder-link calibration and compensations via principle of wavefront multiplexing/ demultiplexing.

FIG. 9*a* features forward link calibrations with an on-board adaptive equalization/optimization loop before WF demuxing. Parts of the WF demuxing outputs on a UAV are recovered diagnostic signals which are used by the optimization loop.

Figure 9B:
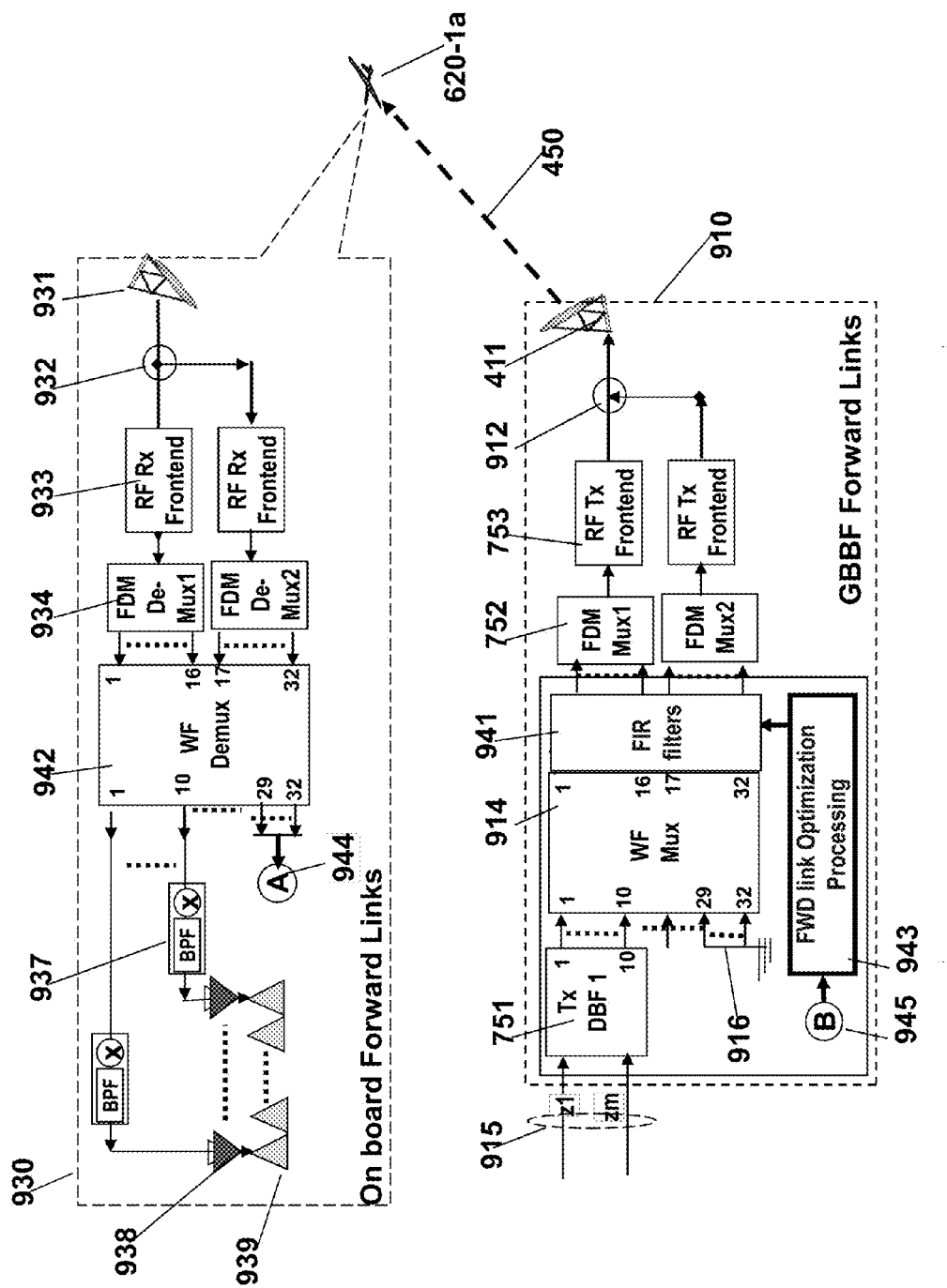

FIG. 9*b* features forward link calibrations with an on-ground adaptive equalization/optimization loop before WF demuxing. Parts of the WF demuxing outputs on a UAV are recovered diagnostic signals which are turned around and passed to ground facility to be used by the ground based optimization loop.

Figure 9C:
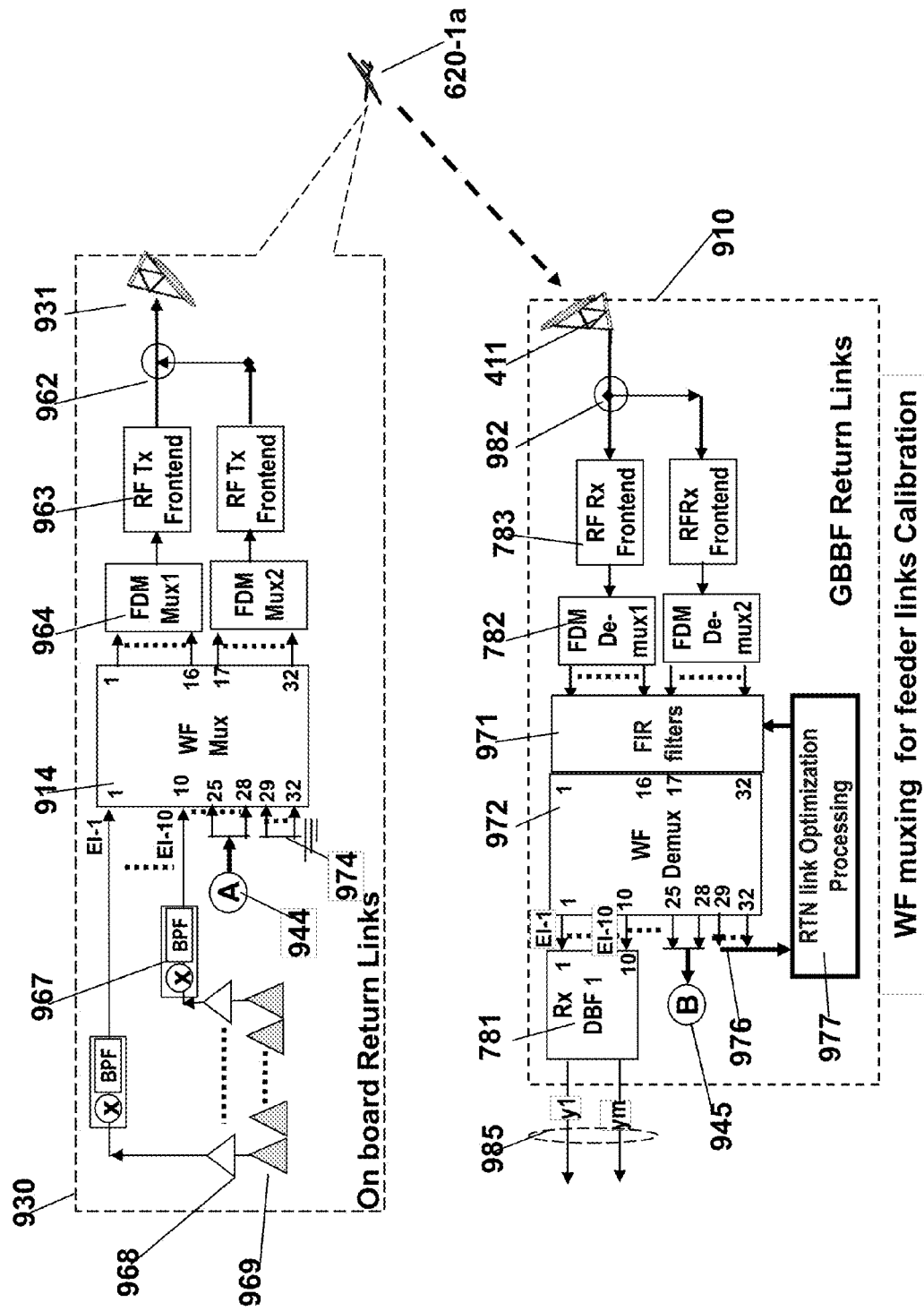

FIG. 9*c* features return link calibrations with an on-ground adaptive equalization/optimization loop before WF demuxing. Parts of the WF demuxing outputs on ground are recovered diagnostic signals which are used by the ground based optimization loop.

FIG. 9*d* features ground-based processing.

FIGS. 9*a*, 9*b* and 9*c* depict functional flow diagrams for a forward link transmissions, respectively, with WF muxing/demuxing techniques for channel equalizations for feeder-links between a ground facility and an UAVs. It is not for "coherent power combining" among multiple UAVs. It is also not for data transmission security and redundancy.

The techniques will enable communication architecture designer more flexibility to utilize feederlinks. We will use 32-to-32 FFT transformations as WF muxing and demuxing functions in the illustration.

Calibrations and compensations of a GBBF processing with a moving UAV platform continuously shall include (1) phase and amplitude differential of unbalanced electronics on board an UAV, (2) phase and amplitude differential of unbalanced electronics on ground facility, (3) phase and amplitude differential due to Ka/K band propagation effects in a feeder-link.

The illustrations are focused to the dynamic compensation of feeder-links at Ku-band. We assume the total available feeder-line bandwidth in a Ku band for forward link is 500 MHz bandwidth in vertical polarization (VP), and the same 500 MHz in horizontal polarization (HP). The 500 MHz at VP is divided into 16 contiguous frequency slots each with ~31 MHz bandwidth. Similarly the 500 MHz at HP is also divided into a second 16 contiguous frequency slots. There total 32 frequency slots assigned to forward links from a ground facility to an UAV features an up-link spectrum around 14 GHz. These allow an operator to continuously support a Tx array with 30 elements on an UAV for GBBF operations with full calibration continuously. Each element features a bandwidth of ~30 MHz.

Similarly we may assume the total available feeder-line bandwidth in a Ku band for return link is also 500 MHz bandwidth in vertical polarization (VP), and the same 500 MHz in horizontal polarization (HP). The 500 MHz at VP is divided into 16 contiguous frequency slots each with ~31 MHz bandwidth. Similarly the 500 MHz at HP is also divided into a second 16 contiguous frequency slots. There total 32 frequency slots assigned to return links from UAVs to a ground features an down-link spectrum around 12 GHz. These allow an operator to continuously support an Rx array with 30 elements on an UAV for GBBF operations with full calibration continuously. Each element features a bandwidth of ~30 MHz In the examples of FIGS. 9*a*, 9*b*, and 9*c* we assume each UAV features 10 L/S band array elements, each with 30 MHz bandwidth, via GBBF for foreground communications.

It is noticed that one such feeder-link may support 3 UAVs concurrently. It is possible to have multiple feeder-links to a single UAV from multiple hubs to perform GBBF concurrently using the same 10 L/S band array elements FIG. 9*a* is functional flow diagram from ground processing facility to a UAV for forward link calibrations of the feeder-link. On a GBBF processing facility 910 on ground, multiple "beam" inputs 915 are sent to a multi-beam Tx DBF processor 751 for a remote array with 10 array elements 939 on a UAV. The outputs from the Tx DBF are 10 parallel processed data streams for the transmissions by the designated elements 939. These processed signals are referred to as element signals (Es1, ..., Es10) which are respectively, connected to the first 10 slices of a 32-to-32 WF muxer 914. The WF muxer features a 32-to-32 FFT function, and may be implemented as an S/W package in a digital circuit either in a single monolithic chip or a digital circuit board.

Many of the input ports, or slices, are not connected. We "ground" the last 4-slices, input ports 29 through 32, as inputs to diagnostic signals with "zero" signals. At the 32 outputs are 32 different linear combinations of the 10 designated element signals. These output ports are referred to as 12 wavefront component (wfc) ports and the outputs are 12 aggregated data streams. The signal stream y1 is the output from the output port wfc-1, y2 from wfc-2, and so on.

As a result of the WF muxing, there are 32 WF vectors which are mutually orthogonal among the 32wfc outputs. Each WF vector features 32 components distributed among the 32 wfc ports. Every input port (slice) is associated to a unique WF vector. Since Es1 is connected to slice-1, Es1 is "attached" to the first WF vector, or "riding on WF1".

The first 16 output (wfc) ports are FDM muxed into IF signals with 500 MHz bandwidth by a FDM Mux1 752. The muxed signals are then frequency up-converted and power amplified via a RF frontend unit 933, before radiated by a directional antenna 411 in vertical polarization (VP) to the designated UAV 620-1a. The amplified signals are radiated via a VP format by connecting the amplified signals to a first input (VP) port of an Orthomode-T 912 for the feed of the directional antenna 411.

The second 16 output (wfc) ports are FDM muxed into IF signals with 500 MHz bandwidth by a FDM Mux2 752. The muxed signals are then frequency up-converted and power amplified via a RF front-end unit 933, before radiated by a directional antenna 411 in horizontal polarization (HP) to the designated UAV 620-1a. The amplified signals are radiated via a HP format by connecting the amplified signals to a second input (HP) port of an Orthomode-T 912 for the feed of the directional antenna 411.

On board a moving platform, UAV 620-1a, a "coherent transponding" process is illustrated in the panel 930. A high gain tracking antenna 931 picks up the up-loaded signals from a ground processing facility 910. The transponding process 930 converts one input at Ku band receiving antenna 931 into 10 outputs for 10 elements 939 in L/S band concurrently.

The output from the high gain antenna 931 is split into HP and VP signals through an orthomode-T 932; each goes through an RF front-end unit 933 and a FDM demuxer 934 converting a 500 MHz muxed signal into 16 channelized signals. These channelized signals are at a common IF with ~30 MHz bandwidth each. There are total 32 channelized signals which are connected to the 32 inputs of a 32-to-32 WF demuxer 942 via 32 parallel adaptive equalizers 941

The 16 channelized signals come from the VP port of the Orthomode-T 932 are assigned to the first 16 (wfc) ports of the WF demuxer 942, and the 16 channelized signals come from the HP port of the "Orthomode-T" 932 are to the next 16 (wfc) ports of the WF demuxer 942.

An optimization loop is built among (1) the 32 sets of FIR weighting in the adaptive equalizer 941, (2) recovered diagnostic signals 944 from the 4 designated output ports of the WF demuxer 942; slice-29 through slice-32, and (3) the optimization processing 943 with selected iterative algorithms. In addition to differences of recovered diagnostic signals and known original diagnostic signals, correlations between the ports of element signals (slice-1 through slice-10) and the ports of diagnostic signals (slice-29 through slice-32) are important observables for the optimization processing 943.

1. The inputs y1', y2', y3', and y32' to the WF demux 942 are connected to 32 adaptive finite-impulse-response (FIR) filters 941 for time, phase, and amplitude equalizations among the 32 propagation channels;
2. Adaptive filters compensate for phase differentials caused by "dispersions" among the propagation paths (array elements) in feeder links via a UAV 620-1a. There will be significant improvement on waveform shape distortions due to dispersions; minimizing a source for inter-symbol interferences.
3. weightings of the FIR filters 941 are optimized by an iterative control loop based on comparisons of recovered pilot signals 944 against the injected and known diagnostic signals 916, correlations between the ports of element signals (slice-1 through slice-10) and the ports of diagnostic signals (slice-29 through slice-32), and an efficient optimization algorithm in an optimization processing 943.
4. Among the outputs of the WF demuxer 942 are the 10 slices of desired element signal streams, and 4 pilot signals.
5. The optimization loop utilizing cost minimization criteria in the optimization processing 743 comprises:
    a. Identifying proper observables for the optimization loop including:
        i. differences between the recovered pilot signal stream and the original.
        ii. Correlations of signals from output slices of the WF demuxer 742.
    b. Generating different cost functions based on various observables:
        i. Converting or mapping various observables into different measurables or cost functions which must be positively defined.
            When an observable meets the desired performance, the corresponding measurable or cost function becomes zero.
            When an observable is only slightly away from the desired performance, the corresponding measurable or cost function is assigned with a small positive number.
            When an observable is far away from the desired performance, the corresponding measurable or cost function is assigned with a large positive number.
    c. Summing all cost function for a total cost as a numerical indicator the current status of the optimization loop performances,
        i. When total cost is less than a small positive threshold value, stop the optimization loop;
        ii. otherwise proceed to procedure d
    d. Deriving the gradients of total cost with respect to the weights of the adaptive equalizers which are in the forms of FIR filters.
    e. Calculating new weights of the FIR filters based on a steepest descent algorithm to minimize the total cost of the optimization loop iteratively.
    f. Updating the weightings in the adaptive equalizer and go to procedure b.

At an optimized state, the amplitude and phase responses of the 32 frequency channels in the feeder-link shall be fully equalized. Thus the 32 associated WF vectors shall become mutually orthogonal at the interfaces between the 32 outputs of the adaptive equalizers 941 and the 32 inputs of the WF demuxer 942. Thus there are no leakages among the outputs of the WF demuxer 942; cross correlations among signals in diagnostic channels (slice-29 through slice-32) and element signals channels (slice-01 through slice-10) shall become zero.

As a result, the recovered element signals from slice 1 through slice 10 are frequency up converted and filtered via frequency up-converters 937 to L/S band, power amplified by PAs 938 before radiated by radiating elements 939. The 10 radiated signals processed by DBF 751 in the GBBF facility 910 will be spatial power combined in far field over different designated beam positions in a coverage area 130 for various user signals.

In this scheme, it is assume that the 10 parallel channels are fully equalized between the radiating elements 939 and beyond the outputs of the WF demuxer 942.

FIG. 9b is nearly identical to FIG. 9a. Both depict functional flow diagrams from ground processing facility to a UAV for forward link calibrations of the feederlink. The only differences are the locations of the adaptive equalizations and optimization loop. Instead of on-board adaptive equalization, FIG. 9b features a scheme with ground base adaptive equalizations and optimization loop for the feederlinks for forward link signals.

On a GBBF processing facility 910 on ground, multiple "beam" inputs 915 are sent to a multi-beam Tx DBF processor 751 for a remote array with 10 array elements 939 on a UAV 620-1a. The outputs from the Tx DBF 751 are 10 parallel processed data streams for the transmissions by the designated elements 939. These processed signals are referred to as element signals (Es1, . . . , Es10) which are respectively, connected to the first 10 slices of a 32-to-32 WF muxer 914. The WF muxer features a 32-to-32 FFT function, and may be implemented as an S/W package in a digital circuit either in a single monolithic chip or a digital circuit board.

Many of the input ports, or slices, are not connected. We "ground" the last 4-slices, input ports 29 through 32, as inputs to diagnostic signals with "zero" signals. At the 32 outputs of the WF muxer 914 are 32 different linear combinations of the 10 designated element signals. These output ports are referred to as 32 wavefront component (wfc) ports and the outputs are 32 aggregated data streams. The signal stream y1 is the output from the output port wfc-1, y2 from wfc-2, and so on.

As a result of the WF muxing, there are 32 WF vectors which are mutually orthogonal among the 32wfc outputs. Each WF vector features 32 components distributed among the 32 wfc ports. Every input port (slice) is associated to a unique WF vector. Since Es1 is connected to slice-1, Es1 is "attached" to the first WF vector, or "riding on WF1".

The first 16 output (wfc) ports are connected to a first set of 16 parallel adaptive equalizers 941 and then FDM muxed into IF signals with 500 MHz bandwidth by a FDM Mux1 752. The adaptive equalizers 941 are for compensations via pre-distortions on cumulated amplitudes and phase differentials of propagating signals in selected 32 channels in a feederlink 450. The muxed signals are than frequency up-converted and power amplified via a RF frontend unit 753, before radiated by a directional antenna 411 in vertical polarization (VP) to the designated UAV 620-1a. The amplified signals are radiated via a VP format by connecting the amplified signals to a first input (VP) port of an "Orthomode-T" 912 for the feed of the directional antenna 411.

The second 16 output (wfc) ports are connected to a second set of 16 parallel adaptive equalizers 941 and then FDM muxed into IF signals with 500 MHz bandwidth by a FDM Mux2 752. The muxed signals are than frequency up-converted and power amplified via a RF front-end unit 753, before radiated by a directional antenna 411 in horizontal polarization (VP) to the designated UAV 620-1a. The amplified signals are radiated via a HP format by connecting the amplified signals to a second input (HP) port of an Orthomode-T 912 for the feed of the directional antenna 411.

On board a moving platform, UAV 620-1a, a "coherent transponding" process is illustrated in the panel 930. A high gain tracking antenna 931 picks up the up-loaded signals from a ground processing facility 910. The transponding process 930 converts one input at Ku band receiving antenna 931 into 10 outputs for 10 elements 939 in L/S band concurrently.

The output from the high gain antenna 931 is split into HP and VP signals through an Orthomode-T 932; each goes through an RF front-end unit 933 and a FDM demuxer 934 converting a 500 MHz muxed signal into 16 channelized signals. These channelized signals are at a common IF with ~30 MHz bandwidth each. There are total 32 channelized signals which are connected to the 32 inputs of a 32-to-32 WF demuxer 942.

The 16 channelized signals come from the VP port of the Orthomode-T 932 are assigned to the first 16 (wfc) ports of the WF demuxer 942, and the 16 channelized signals come from the HP port of the Orthomode-T 932 are to the next 16 (wfc) ports of the WF demuxer 942.

An optimization loop is built among (1) the 32 sets of ground-based FIR filter weighting in the adaptive equalizer 941, (2) recovered diagnostic signals 944 from the 4 designated output ports of the on-board WF demuxer 942; slice-29 through slice-32, and (3) the optimization processing 943 with selected iterative algorithms on ground. In addition to differences of recovered diagnostic signals and known original diagnostic signals, correlations between the ports of element signals (slice-1 through slice-10) and the ports of diagnostic signals (slice-29 through slice-32) are important observables for the optimization processing 943.

1. The inputs y1', y2', y3', and y32' to the on board WF demux 942 can "modulated" by 32 ground based adaptive finite-impulse-response (FIR) filters 941 for time, phase, and amplitude equalizations among the 32 propagation channels via compensations via pre-distortions techniques;
2. Adaptive filters compensate for phase differentials caused by "dispersions" among the propagation paths (array elements) in feeder links via a UAV 620-1a. There will be significant improvement on waveform shape distortions due to dispersions; minimizing a source for inter-symbol interferences.
3. Weightings of the FIR filters 941 are optimized by an iterative control loop based on comparisons of recovered pilot signals 944 against the injected and known diagnostic signals 916, and an efficient optimization algorithm in an optimization processing 943.
4. Among the outputs of the WF demuxer 942 are the 10 slices of desired element signal streams, and 4 recovered pilot signals.
5. The recovered pilot signals 944 are piped down to the GBBF facility via additional input channels to the on-board WF muxer for calibration of the Return link (as depicted in FIG. 9c). As a result, the on-board recovered diagnostic signals 944 shall appear on the ground processing facility 910 as a set of contaminated recovered diagnostic signals 945.

6. The optimization loop utilizing cost minimization criteria in the optimization processing 943 comprises:
   a. Identifying proper observables for the optimization loop including:
      i. differences between the recovered pilot signal stream and the original.
      ii. Correlations of signals from output slices of the WF demuxer 942.
   b. Generating different cost functions based on various observables;
      i. Converting or mapping various observables into different measurables or cost functions which must be positively defined.
         When an observable meets the desired performance, the corresponding measurable or cost function becomes zero.
         When an observable is only slightly away from the desired performance, the corresponding measurable or cost function is assigned with a small positive number.
         When an observable is far away from the desired performance, the corresponding measurable or cost function is assigned with a large positive number.
   c. Summing all cost function for a total cost as a numerical indicator the current status of the optimization loop performances,
      i. When total cost is less than a small positive threshold value, stop the optimization loop;
      ii. otherwise proceed to procedure d
   d. Deriving the gradients of total cost with respect to the weights of the adaptive equalizers which are in the forms of FIR filters.
   e. Calculating new weights of the FIR filters based on a steepest descent algorithm to minimize the total cost of the optimization loop iteratively.
   f. Updating the weightings in the adaptive equalizer and go to procedure b.

At an optimized state, the amplitude and phase responses of the 32 frequency channels in the feeder-link shall be fully equalized. Thus the 32 associated WF vectors shall become mutually orthogonal at the interfaces between the 32 outputs of the adaptive equalizers 941 and the 32 inputs of the WF demuxer 942. Thus there are no leakages among the outputs of the WF demuxer 942; cross correlations among signals in diagnostic channels (slice-29 through slice-32) and element signals channels (slice-01 through slice-10) shall become zero.

As a result, the recovered element signals from slice 1 through slice 10 are frequency up converted and filtered via frequency up-converters 937 to L/S band, power amplified by PAs 938 before radiated by radiating elements 939. The 10 radiated signals processed by DBF 751 in the GBBF facility 910 will be spatial power combined in far field over different designated beam positions in a coverage area 130 for various user signals.

In this scheme, it is assume that the 10 parallel channels are fully equalized between the radiating elements 939 and beyond the outputs of the WF demuxer 942.

FIG. 9c depicts functional flow diagrams from ground processing facility to a UAV for return link calibrations of the feederlink. It has an additional feature of supporting the forward link calibrations as depicted in FIG. 9b.

On board a mobile platform UAV 620-1a, a set of 10 array elements 968 captures radiated signals in L/S band over a coverage area 130. These captured element signals are amplified by LNAs 969 and filtered and frequency converted individually by frequency converter units 967. These processed signals are referred to as element signals (Es1, . . . , Es10) which are respectively, connected to the first 10 slices of a 32-to-32 WF muxer 914. The WF muxer features a 32-to-32 FFT function, and may be implemented as an S/W package in a digital circuit either in a single monolithic chip or a digital circuit board. The WF muxing functions may also be implemented as RF Bulter matrixes or a baseband FFT chip.

Many of the input ports, or slices, are not connected. We "ground" the last 4-slices, input ports 29 through 32, as inputs to diagnostic signals with "zero" signals. Four input ports 944 from slice-25 through slice-28 are used for relaying the recovered diagnostic signals from the forward link calibration. They are connected by 4 output ports (the slice-29, slice-30, slice-31, and slice-32) 944 of the WF demuxer 942 in FIG. 9b.

At the 32 outputs of the WF muxer 914 are 32 different linear combinations of the 10 designated element signals. These output ports are referred to as 32 wavefront component (wfc) ports and the outputs are 32 aggregated data streams. The signal stream y1 is the output from the output port wfc-1, y2 from wfc-2, and so on.

As a result of the WF muxing, there are 32 WF vectors which are mutually orthogonal among the 32wfc (output) ports. Each WF vector features 32 components distributed among the 32 wfc ports. Every input port (slice) is associated to a unique WF vector. Since Es1 is connected to slice-1, Es1 is "attached" to the first WF vector, or "riding on WF1".

The first 16 output (wfc) ports are FDM muxed into IF signals with 500 MHz bandwidth by a FDM Mux1 964. The muxed signals are than frequency up-converted and power amplified via a RF frontend unit 963, before radiated by a directional antenna 931 in vertical polarization (VP) to the GBBF processing facility 910. The amplified signals are radiated via a VP format by connecting the amplified signals to a first input (VP) port of an Orthomode-T 962 for the feed of the directional antenna 931.

The second 16 output (wfc) ports are FDM muxed into IF signals with 500 MHz bandwidth by a FDM Mux2 964. The muxed signals are than frequency up-converted and power amplified via a RF front-end unit 963, before radiated by a directional antenna 931 in horizontal polarization (HP) to a GBBF processing facility 910. The amplified signals are radiated via a HP format by connecting the amplified signals to a second input (HP) port of an Orthomode-T 962 for the feed of the directional antenna 931.

In the GBBF facility 910, a high gain tracking antenna 931 picks up the down-loaded signals from an UAV 620-1a. A transponding process in 910 converts one input at Ku band receiving antenna 411 into 10 element inputs for the RX DBF processor 781

The output from the high gain antenna 411 is split into HP and VP signals through an Orthomode-T 982; each goes through an RF front-end unit 933 and a FDM demuxer 934 converting a 500 MHz muxed signal into 16 channelized signals. These channelized signals are at a common IF with ~30 MHz bandwidth each. There are total 32 channelized signals which are connected to the 32 inputs of a 32-to-32 WF demuxer 942 through a bank of 32 adaptive equalizers 971 implemented by 32 adaptive FIR filters.

The 16 channelized signals come from the VP port of the Orthomode-T 932 are assigned to the first 16 (wfc) ports of the WF demuxer 942, and the 16 channelized signals come from the HP port of the Orthomode-T 932 are to the next 16 (wfc) ports of the WF demuxer 942.

An optimization loop is built among (1) the 32 sets of FIR filter weighting in the adaptive equalizer 971, (2) recovered diagnostic signals 978 from the 4 designated output ports of the WF demuxer 972; slice-29 through slice-32, and (3) the optimization processing 977 with selected iterative algorithms. In addition to differences of recovered diagnostic signals and known original diagnostic signals, correlations between the ports of element signals (slice-1 through slice-10) and the ports of diagnostic signals (slice-29 through slice-32) are important observables for the optimization processing 977.

1. The inputs y1', y2', y3', and y32' to the WF demux 972 can "modulated" by 32 adaptive finite-impulse-response (FIR) filters 971 for time, phase, and amplitude equalizations among the 32 propagation channels via compensations via pre-distortions techniques;
2. Adaptive filters compensate for phase differentials caused by "dispersions" among the propagation paths (array elements) in feeder links via a UAV 620-1a. There will be significant improvement on waveform shape distortions due to dispersions; minimizing a source for inter-symbol interferences.
3. weightings of the FIR filters 971 are optimized by an iterative control loop based on comparisons of recovered pilot signals 978 against the injected and known diagnostic signals 974, and an efficient optimization algorithm in a forward link optimization processing 977.
4. Among the outputs of the WF demuxer 972 are the 10 slices of desired element signal streams, and 4 recovered pilot signals 978 for return link (from slice-29 through slice-32).
5. "contaminated recovered pilot signals 945 for forward links are available at the 4 output ports (from slice-25 through slice-28).
6. The optimization loop utilizing cost minimization criteria in the optimization processing 943 comprises:
    a. Identifying proper observables for the optimization loop including
        i. differences between the recovered pilot signal stream and the original.
        ii. Correlations of signals from output slices of the WF demuxer 942.
    b. Generating different cost functions based on various observables
        i. Converting or mapping various observables into different measurables or cost functions which must be positively defined.
            When an observable meets the desired performance, the corresponding measurable or cost function becomes zero.
            When an observable is only slightly away from the desired performance, the corresponding measurable or cost function is assigned with a small positive number.
            When an observable is far away from the desired performance, the corresponding measurable or cost function is assigned with a large positive number.
    c. Summing all cost function for a total cost as a numerical indicator the current status of the optimization loop performances,
        i. When total cost is less than a small positive threshold value, stop the optimization loop;
        ii. otherwise proceed to procedure d.
    d. Deriving the gradients of total cost with respect to the weights of the adaptive equalizers which are in the forms of FIR filters.
    e. Calculating new weights of the FIR filters based on a steepest descent algorithm to minimize the total cost of the optimization loop iteratively.
    f. Updating the weightings in the adaptive equalizer and go to procedure b.

At an optimized state, the amplitude and phase responses of the 32 frequency channels in the feeder-link shall be fully equalized. Thus the 32 associated WF vectors shall become mutually orthogonal at the interfaces between the 32 outputs of the adaptive equalizers 971 and the 32 inputs of the WF demuxer 972. Thus there are no leakages among the outputs of the WF demuxer 972; cross correlations among signals in diagnostic channels (slice-29 through slice-32) and element signals channels (slice-01 through slice-10) shall become zero.

As a result, the recovered element signals from slice 1 through slice 10 are sent to a Rx DBF 785 in the GBBF processing facility 911

End of Embodiment 2

Embodiment 3

This embodiment presents architectures and methods of implementing multiplexing of three users utilizing 4 UAV based communications channels through Wavefront multiplexing/de-multiplexing. Each of the three user signals after WF muxing features a unique wavefront (WF) through a WF vector which propagates through multiple UAV channels concurrently. There are three users associated with three mutually orthogonal WF vectors. The remaining fourth vector is assigned for diagnostic signals.

Figure 10A:
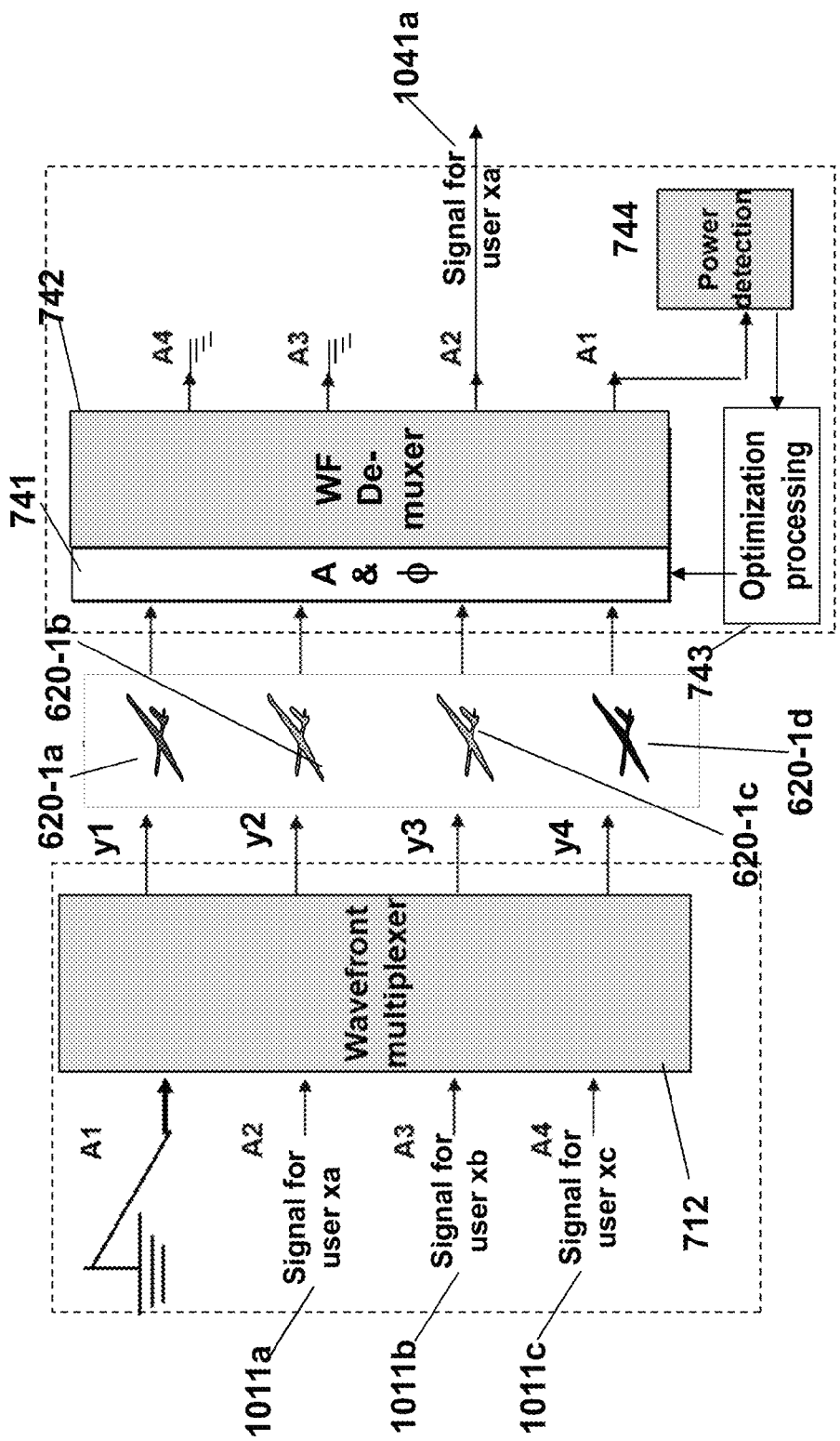
FIGS. 10a, 10b, and 10c illustrate the operational principle of "coherent power combining" and signal multiplexing via multi-channel waveforms in receivers for three separated users through WF muxing/demuxing techniques. All are simplified block diagrams showing a WF muxing operation in signal sources and a WF demuxing operation in a destination for forward links.
Figure 10B:
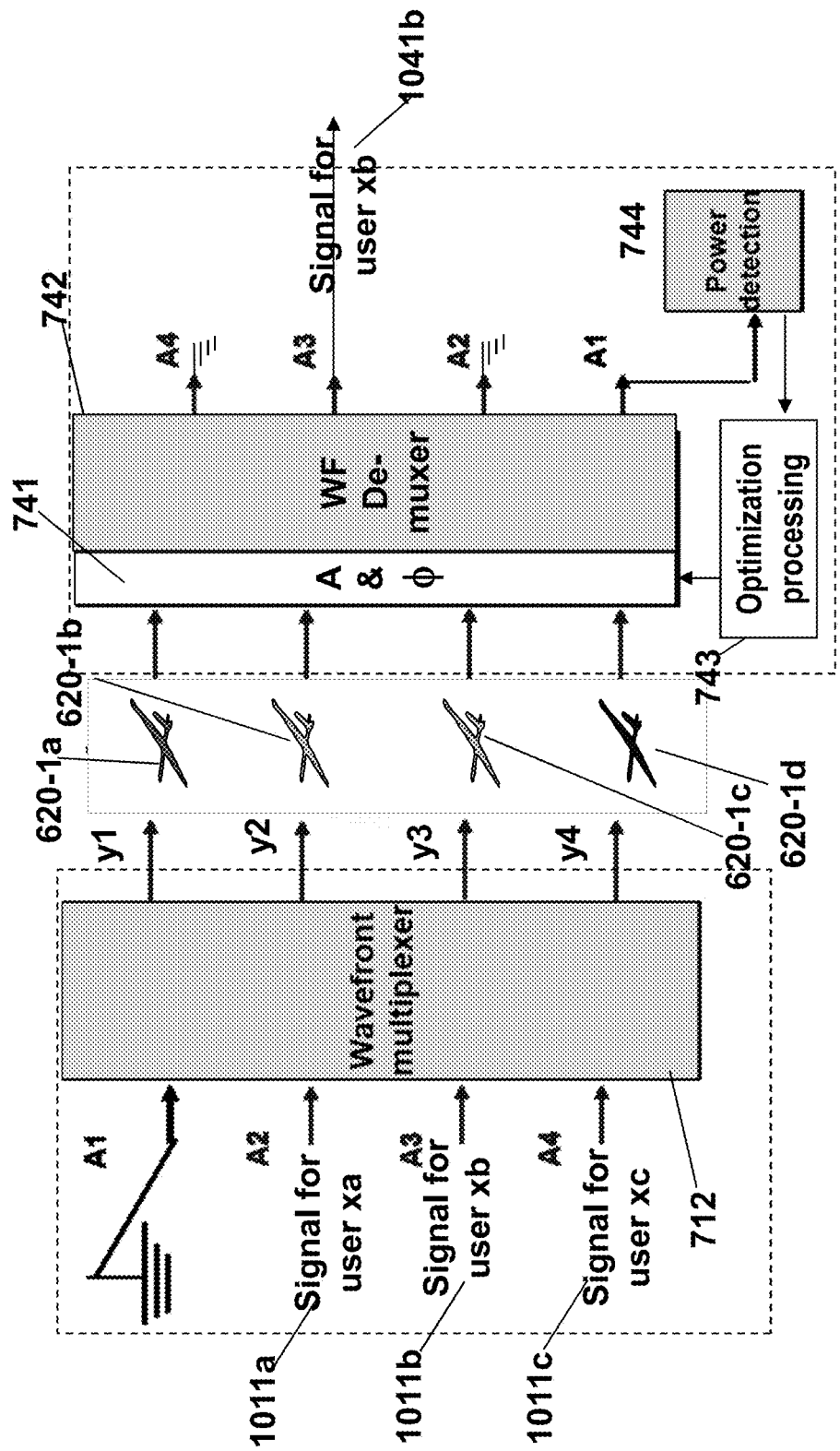

FIG. 10a is for the first user signal stream. The adaptive equalization loop assures the orthogonality among the four recovered WF vectors. FIG. 10b is the block diagram for the second user, and FIG. 10c for the third user signals.

Figure 10C:
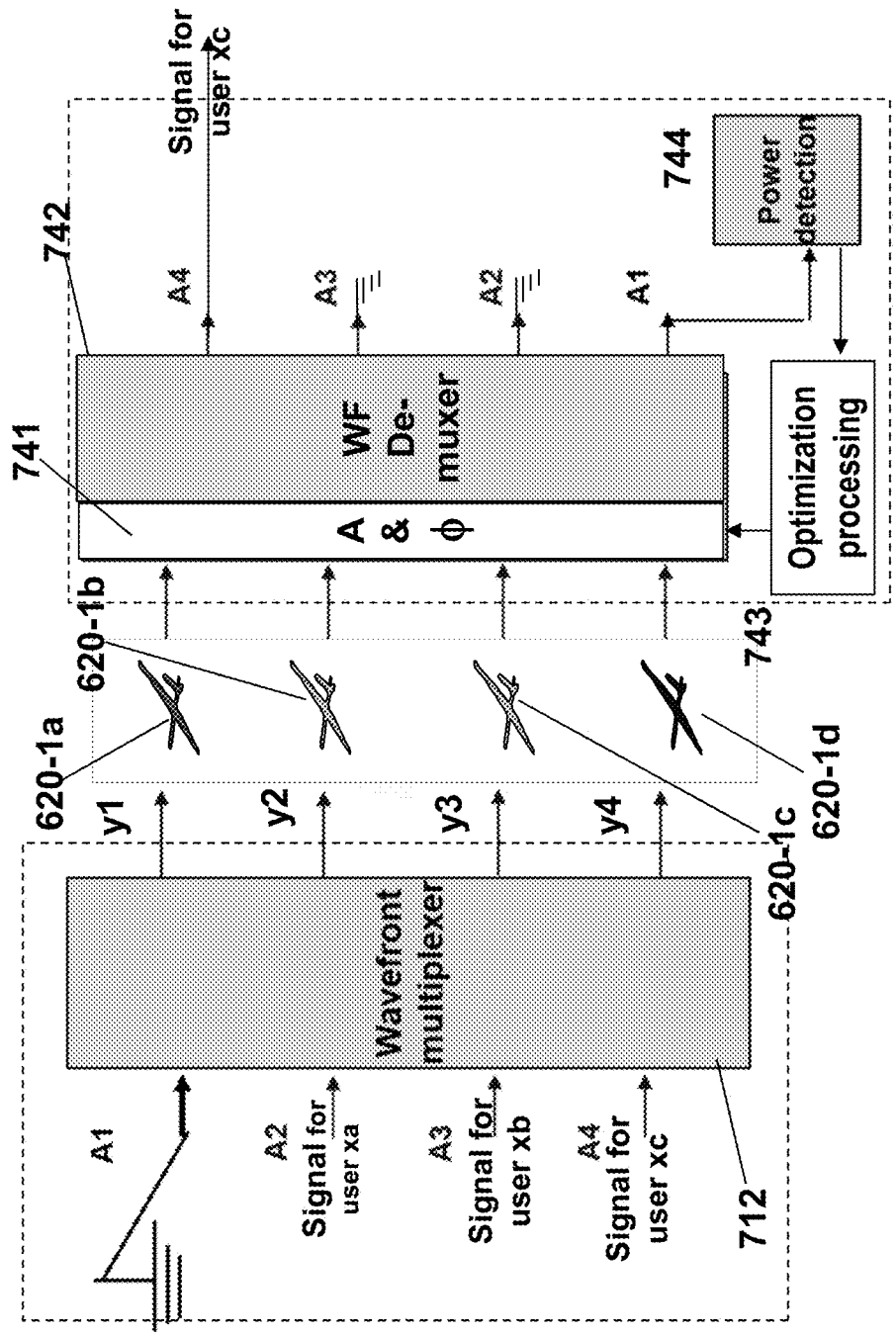

FIGS. 10a, 10b, and 10c depict functions of a WF muxing 712 and a WF demuxing processor 742 concurrently utilizing four independent communications assets in four UAVs for three separated users xa, xb, and xc.

Three user forward link signals 1011a, 1011b and 1011c are converted into 4 WF components y1, y2, y3, and y4 by a 4-to-4 WF muxer 712 before uploaded to 4 separated UAVs 620-1a, 620-1b, 620-1c, and 620-1d. The WF muxer is a 4-to-4 Hadamard matrix. As a result, the four output signals by 4 wfc ports of the WF muxer;

$$y1(t)=0+xa(t)+bt(t)+xc(t) \quad (7.1)$$

$$y2(t)=0-xa(t)+bt(t)-xc(t) \quad (7.2)$$

$$y3(t)=0+xa(t)-bt(t)-xc(t) \quad (7.3)$$

$$y4(t)=0-xa(t)-bt(t)+xc(t) \quad (7.4)$$

Where the A1 slice is grounded, A2, A3, and A4 slices are connected by xa, xb and xc signals respectively. Every input signal stream goes through all 4 UAVs concurrently. The four input signals including the "zero" signal inputs to input slice A1, are riding 4 mutually orthogonal WF vectors at the outputs of the WF muxer 712;

"zero" signals connected to the A1 slice are associated with WFV1=$[1,1,1,1]^T$, xa(t) signals connected to the A2 slice are associated with WFV2=$[1,-1,1,-1]^T$, xb(t) signals connected to the A3 slice are associated with WFV3=$[1,1,-1,-1]^T$, and xc(t) signals connected to the A4 slice are associated with WFV4=$[1,-1,1,-1]^T$.

The four parallel paths on a receiver will feature different amplitude attenuations/amplifications and phase delays even at same carrier frequency due to path length differentials and unbalanced electronics among the four UAV platforms.

The 4 inputs to a bank of 4 parallel adaptive equalizers 741 on a user terminal for the first user feature:

$$z1(t)=am1a*\exp(j\,k\Delta z1a)*y1(t) \quad (8\text{-}1)$$

$$z2(t)=am2a*\exp(j\,k\Delta z2a)*y2(t) \quad (8\text{-}2)$$

$$z3(t)=am3a*\exp(j\,k\Delta z3a)*y3(t) \quad (8\text{-}3)$$

$$z4(t)=am4a*\exp(j\,k\Delta z4a)*y4(t) \quad (8\text{-}4)$$

The adaptive equalizers are to compensate the amplitude and phase differentials among the four propagation paths. Their outputs are connected to the inputs to a 4-to-t WF demuxer 742. The four WF vectors shall be distorted and no longer mutually orthogonal to one another, As a results, there are leakages at the output port (slice) A1 from signals designated for A2, A3, and A4 ports. The diagnostic port no longer features "zero" signals.

An optimization loop will use the leakage power 744 as one of the observables. An optimization processor will convert the observables into a quantitative measurables, or cost functions, which are always positively defined. Total cost, the sum of all cost functions, and gradients of the total cost are derived and measured. New weights are calculated and updated based on a steepest descent method for the adaptive equalizers iteratively via a cost minimization algorithm.

In optimized states, four propagation paths shall be fully compensated so that the inserted phases and amplitudes of the adaptive equalizers $[a1*\exp(j\Phi1)]$, $[a2*\exp(j\Phi2)]$, $[a3*\exp(j\Phi3)]$, and $[a4*\exp(j\Phi4)]$, must fulfill the following requirements, respectively:

$$am1a*\exp(j\,k\Delta z1a)*[a1*\exp(j\Phi1)]$$

$$am2a*\exp(j\,k\Delta z2a)*[a2*\exp(j\Phi2)]$$

$$am3a*\exp(j\,k\Delta z3a)*[a3*\exp(j\Phi3)]$$

$$am4a*\exp(j\,k\Delta z4a)*[a4*\exp(j\Phi4)]=\text{constant} \quad (9)$$

As a result, the associated WF vectors after the adaptive equalizers will become orthogonal again. There are no more leakages at output port (slice) A1 of the WF demuxer 742 from the other three output ports (slices A2, A3, and A4).

The signal stream xa recovered on slice A2 1041a is connected to the designated receiver for the first user.

FIG. 10b, and FIG. 10c depict the same uplinks but a different down links for a second user and a third user at the same beam positions as that of the first user. The signals output for the second user xb is from slice A3 of the WF demuxer 742. The signals output for the third user xc is from slice A4 of the WF demuxer 742.

End of Embodiment 3

Embodiment 4

This embodiment presents architectures and methods of implementing UAV based communications using retro-directive antennas, and ground based beam forming (GBBF). Several scenarios are presented as followed;

1. Analogue retro-directive antennas for on-board feeder-link payloads in FIG. 11,
2. With GBBF but without retro-directive in FIG. 12,
3. With GBBF and with retro-directive in FIG. 12a,
4. Without GBBF but with retro-directive in FIG. 12b.

Figure 11:
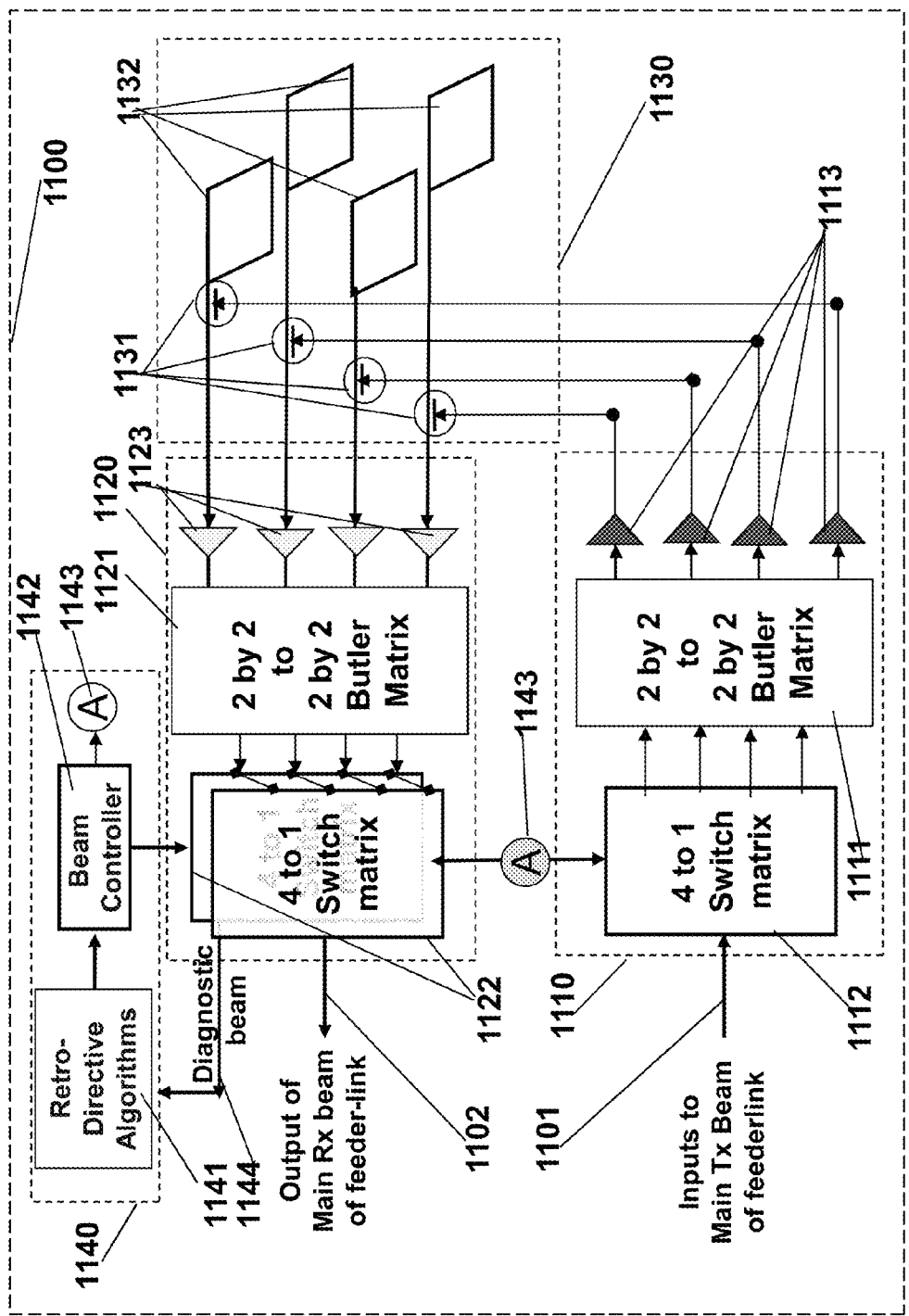
FIG. 11 depicts a functional block diagrams for an on-board retro-directive antennas for Ku/Ka feeder-link interconnecting a ground processing facility and a UAV which anchoring the retro-directive antenna.

FIG. 11 depicts of a Ku retro-directive array on board a UAV. Ku-band arrays 1100 are used for UAVs as feeder link antennas to transfer all signals to and from L/S or C-band elements channels to a gateway where a simple GBBF processing will perform both Tx and Rx array functions. The Ku band "smart" arrays will feature retro-directivity via on-board analogue beam forming network (BFN) 1121 and beam controller 1140 technologies.

The 4 element array 1100 features analog beam-forming and switching mechanisms to gain 6 dB advantage than an omni directional antenna for data links from a UAV to a ground processing center. The depicted smart array 1100 featuring four low profile elements 1132 consists of two regular analogue multiple-beam beam-forming-networks (BFNs) using Butler Matrixes (BMs); one for Rx 1121 and the other for Tx 1111. However, retro-directive antennas for the back-channels may be arrays with 8, 16, or more elements depending on how far the UAV is away from the ground processing center.

The 4 element array 1100 features 4 Rx beams. Received signals by the 4 array elements 1132 after the diplexers 1131 are amplified by LNAs 1123 followed by a BPF (not shown) before a receiving (Rx) BM 1121. The Rx BM 1121 will form 4 orthogonal beams pointing to 4 separated directions covering the entire field of view (FOV) of interest. The beam-width of any one beam will be ½ of the FOV (¼ in terms of stereo-angles), and the four orthogonal beams will cover the entire FOV. Furthermore the peak of any one beam is always a null of all three other beams. The ground processing center will always be covered by one of the four beams. When the 4 elements are on a squared lattice with $\lambda/2$ in between adjacent elements and assuming $\lambda/2$ squared element size for all 4 elements, the 3-dB beam widths from the 4 element array will be ~60° near bore side.

The Rx BM 1121 has 4 outputs; each associated with one of the 4 beam positions. There are two parallel switching trees (ST) 1122 connected to the RX BM in Rx, one for the main signal path 802, the other for a diagnostic beam 1144 connected to a diagnostic circuitry 1140. The ST 1122 associated with the diagnostic beam 1144 will continuous switch among the four beam positions. The diagnostic circuit 1140 will identify the features of desired signals through power level in a frequency channels, special codes, waveforms, or other unique features. Once the beam position for the ground processing is identified based on retro-directive algorithms 1141 and updated new beam positions 1143 when the UAV is on station, the beam controller 1142 will dynamically update the ST for the main signal path to a new beam position 1143.

The depicted functional block is the 4-element retrodirective antenna array at Ku/Ka band 1100. The array elements 1132 may feature low-profile and near conformal designs. Rx multibeam forming processing is through a 2-dimensional Butler Matrix (BM) 1121 followed by a pair of switching matrixes (ST) 1122. The first one is for main signal path which is connected to the interface 1102 via a buffer amplifier 1102a. A first of the two ST 1122 is controlled by a beam controller 1142 which shall make a decision on which beam positions to switch on to receive the forward link element signals uploaded by a GBBF facility

412. Similarly in the return link Ku/Ka Tx P/L, the foreground P/L 1210 shall deliver to the interface 1101 a FDM muxed and frequency up-converted element signals which are received at a public safety band (e.g. 700 MHz or 4.9 GHz). The FDM muxed signals will go through a ST 1112 and a BM 1111. The 4 outputs properly phased by the BM 1111 will then be amplified by power amplifiers 1113 and then radiated by the low profile element 1132. In the designated beam position at far field the radiated signals shall be spatially combined coherently due to cancellation of incurred phase differentials during the propagations by the pre-phased individual element signals by the BM 1111

The current "beam position" decision shall be made based on information derived by the second of the two ST 1122 which is also controlled by the beam controller 1142. The second ST will be continuous switched or rotated among all possible beam positions with diagnostic beam outputs. The data collected from the second ST will be used by a on board processor 1140, among other recorded data, to identify a beam position which is currently associated to the strongest signal level of desired signals identified via their unique features. The beam controller will then inform both the Tx ST 1112 and the ST (first of the two Rx ST 112) for the Rx main signals about the current beam positions for the retro-directive antenna.

When the elements are spaced by X the resulting 4 outputs from a BM 1121 will be 4 finger beams; each with multiple peaks (or grading lobes).

In Tx, the configuration is identical except the signal flows are in reverse direction. The beam controller will also control the ST 1112 for the Tx BM 1111.

Figure 12:
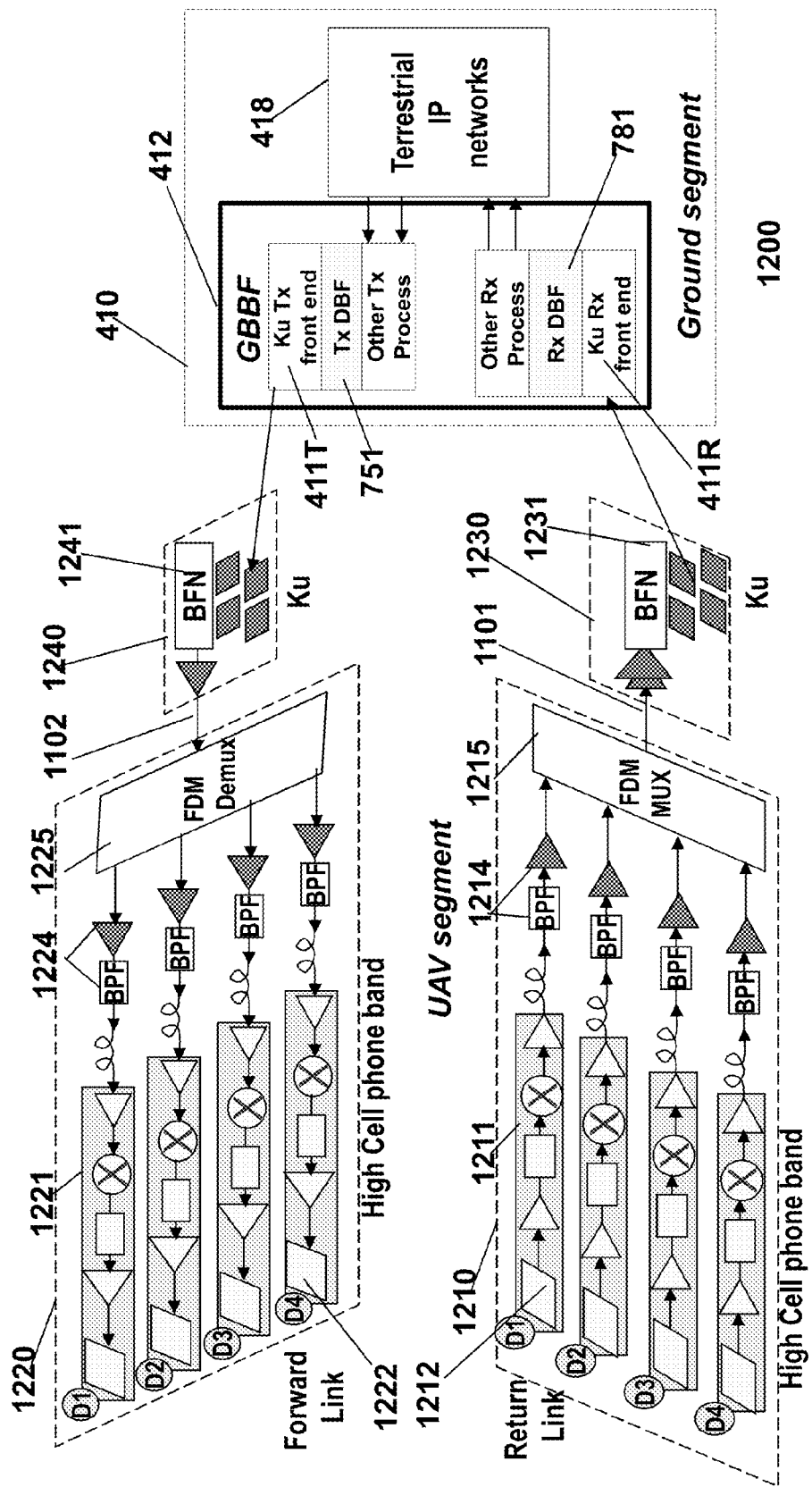
FIG. 12 depicts inter-connectivity among three functional blocks of mobile communication architecture via a UAV with 4-element array in feeder-links and GBBF; (1) on board return link payload and feeder-link payload, (2) ground processing facility with ground based beam forming, and (3) on board feeder-link payload and forward link payload. The first level functional details of all three functional blocks are illustrated. On-board feeder links are implemented by a 4-element active array with beam forming network. There are no beam forming for the foreground communications payloads

FIG. 12 1200 is a simplified block diagram for a communications payload (P/L) on a UAV for the communications at regular cell phone frequency bands among the cell phone users in a coverage area. There are five major functional blocks; from top left and clockwise (1) forward link transmitting (Tx) payload 1220 at L/S band for foreground communications, (2) forward link receiving (Rx) payload 1240 at Ku/Ka band for feeder-link communications, (3) Ground processing facility 410 including GBBF processing 412, (4) return link transmitting (Tx) payload 1110 at Ku/Ka band for feeder-link communications, and (5) return link receiving (Rx) payload 1210 at L/S band for foreground communications.

In the first major functional block on the top right for the forward link transmitting (Tx) payload 1220 at L/S band for foreground communications; signals flow from right to left. The up-linked signals 1102 received by the on board Ku array 1240 feature "element signals" properly processed by a GBBF designated for the 4 Tx elements 1222 at L/S band. The uplink signals 1102 from the back channels are FDM de-multiplexed 1225 and frequency down converted, filtered and amplified 1224 before radiated by the 4 Tx subarrays D1, D2, D3, and D4 1222. There are no on board beam forming processing at L/S band at all.

The second major functional block in the middle top panel is for the forward link receiving (Rx) payload 1240 at Ku band for feeder-link communications. The onboard Ku 4 element array is programmed driven to point its receive beam toward the ground processing center 410. The Ku Rx beam forming network (BFN) 1241 may be implemented by a 4-to-4 Butler matrix followed by a 4-to-1 switch or equivalent.

The panel on the right depicts functional flow diagrams in a ground processing facility 410 including a ground based beam forming (GBBF) facility 412 and gateways 418 to terrestrial networks. In a forward link, in-coming traffic from terrestrial IP network 418 will go through many transmitting functions including the modulation for the designated beam signals. Modulated beam signals are sent through multibeam Tx digital beam forming (Tx DBF), converting beam signals into element signals before frequency up converted and power amplified by Ku Tx front end 411T, and then radiated by Ku transmitting antennas (not shown)

In a return link, signals captured by Ku transmitting antennas (not shown) are conditioned by low noise amplifier, filtered and then frequency down converted by Ku Tx front end 411R, and then sent to a multibeam Rx digital beam forming (Rx DBF), converting beam signals from element signals. These recovered beam signals will go through many receiving functions including the demodulation for the designated beam signals which may become outgoing traffic to terrestrial IP networks via designated gateways 418

The 4$^{th}$ major functional block in the middle lower panel is for the return link Transmitting (Tx) payload 1230 at Ku band for feeder-link communications. The onboard Ku 4 element array is programmed driven to point its transmitting beam toward the ground processing center 410. The Ku beam forming network (BFN) 1231 may be implemented by a 4-to-1 followed by a 4-to-4 Butler matrix or equivalent circuits.

The on board feeder-links antennas 1240 and 1230 are conventional "program-driven" and not "retro-directive."

The 5$^{th}$ functional block is a return links L/S band P/L 1210 for foreground communications. There are four Rx elements D1, D2, D3, and D4 1212; each of which is connected by a LNA, a BFP, and an up-converter 1211 to Ku band. There are no beam-forming processors on board for antennas at cell phone frequencies. The four received signals, up-converted from the 4 Rx subarrays are FDM multiplexed 1215 into a single stream 1101, which is then power amplified and transmitted to a ground facility 4 via a 4-element Ku array 1230. The Ku Tx beam forming network (BFN) 1231 may be implemented by a 1-to-4 switch followed by a 4-to-4 Tx Butler Matrix (BM). Each of the 4 outputs of the Tx BM will then be connected to an active array element.

Figure 12A:
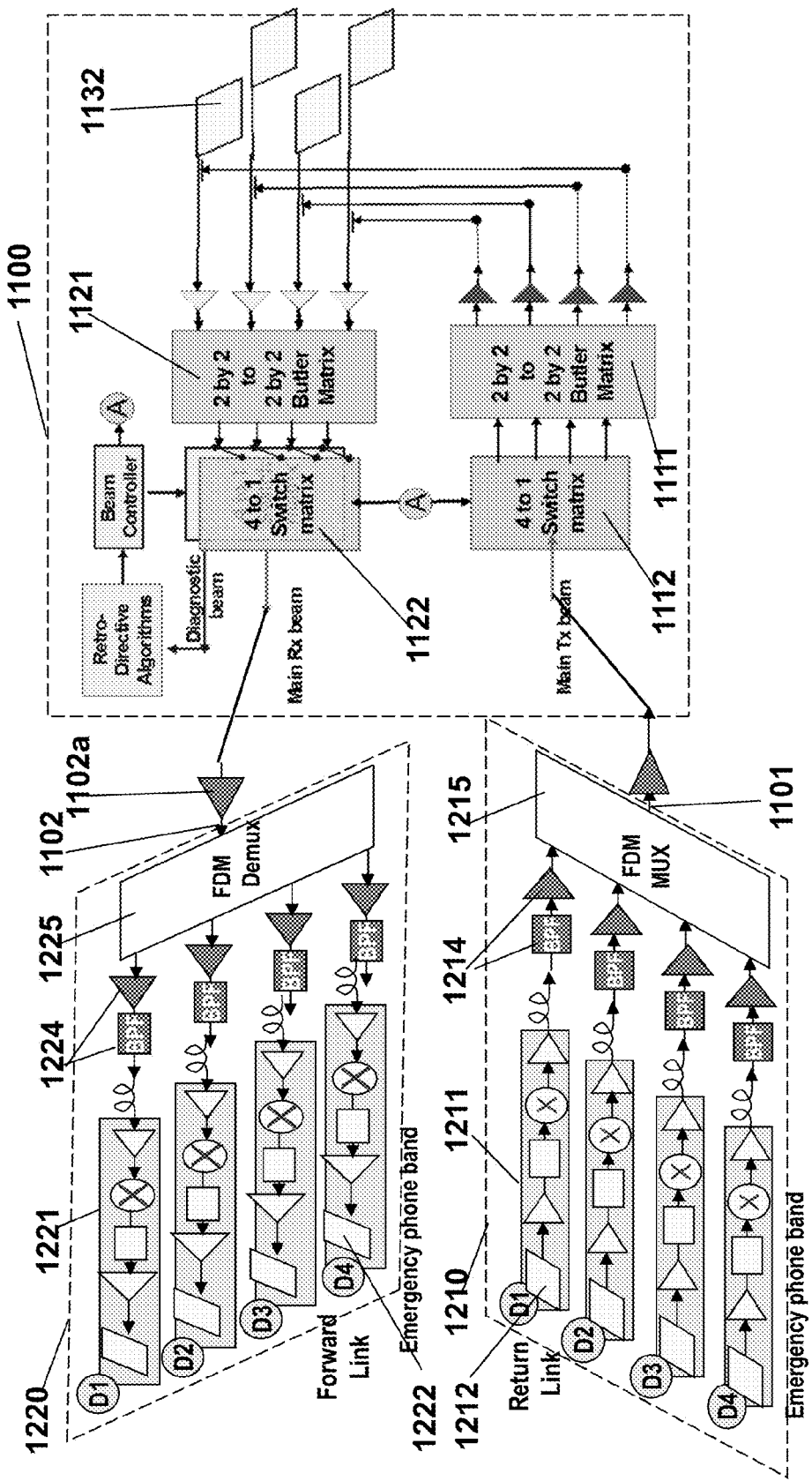
FIG. 12a depicts inter-connectivity among three functional blocks of mobile communication architecture via a UAV with 4-element array in feeder-links and GBBF; (1) on board return link payload and feeder-link payload, (2) ground processing facility with ground based beam forming, and (3) on board feeder-link payload and forward link payload. The first level functional details of all three functional blocks are illustrated. On-board feeder links are implemented by a 4-element retro-directive antenna.

FIG. 12a is a simplified block diagram for a communications payload (P/L) on a UAV for the communications at 4.9 GHz emergency band among the rescue team members. It is almost identical to those in FIG. 12, except:
1. Operating frequencies of the foreground communications are in public safety band; such as 700 MHz or 4.9 GHz in US.
2. The on-board Ku/Ka feeder-links are via a Retrodirective antenna array 1100 instead of command driven arrays 1230 and 1240;
   i. Interfaces are at 1102 for the forward link, and 1101 for the return link;
   ii. Details of the retro-directive array are depicted in FIG. 11.
3. Ground processing is identical to that 410 in FIG. 12.

There are three major functional blocks; from top left and clockwise:
1. forward link transmitting (Tx) payload 1220 at public safety bands for foreground communications,
2. feeder-link payload 1100
   i. forward link receiving (Rx) payload 1240 at Ku/Ka band for feeder-link communications and
   ii. return link transmitting (Tx) payload 1110 at Ku/Ka band for feeder-link communications, and
3. return link receiving (Rx) payload 1210 at L/S band for foreground communications.

In the first major functional block on the top right for the forward link transmitting (Tx) payload 1220 at L/S band for foreground communications; signals flow from right to left. The up-linked signals 1102 received by the on board Ku array 1100 feature "element signals" properly processed by a GBBF designated for the 4 Tx elements 1222 at L/S band. The uplink signals 1102 from the back channels are FDM de-multiplexed 1225 and frequency down converted, filtered and amplified 1224 before radiated by the 4 Tx subarrays D1, D2, D3, and D4 1222. There are no on board beam forming processing at public safety bands at all.

The second functional block depicted on the right side is the 4-element Retrodirective antenna array at Ku/Ka band 1100. The array elements 1132 may feature low-profile and near conformal designs. Rx multibeam forming processing is through a 2-dimensional Butler Matrix (BM) 1121 followed by a pair of switching matrixes (ST) 1122. The first one is for main signal path which is connected to the interface 1102 via a buffer amplifier 1102a. A first of the two ST 1122 is controlled by a beam controller 1142 which shall make a decision on which beam positions to switch on to receive the forward link element signals uploaded by a GBBF facility 412. Similarly in the return link Ku/Ka Tx P/L, the foreground P/L 1210 shall deliver to the interface 1101 a FDM muxed and frequency up-converted element signals which are received at a public safety band (e.g. 700 MHz or 4.9 GHz). The FDM muxed signals will go through a ST 1112 and a BM 1111. The 4 outputs properly phased by the BM 1111 will then be amplified by power amplifiers 1113 and then radiated by the low profile element 1132. In the designated beam position at far field the radiated signals shall be spatially combined coherently due to cancellation of incurred phase differentials during the propagations by the pre-phased individual element signals by the BM 1111

The current "beam position" decision shall be made based on information derived by the second of the two ST 1122 which is also controlled by the beam controller 1142. The second ST will be continuous switched or rotated among all possible beam positions with diagnostic beam outputs. The data collected from the second ST will be used by a on board processor 1140, among other recorded data, to identify a beam position which is currently associated to the strongest signal level of desired signals identified via their unique features. The beam controller will then inform both the Tx ST 1112 and the ST (first of the two Rx ST 112) for the Rx main signals about the current beam positions for the retro-directive antenna.

The $3^{rd}$ functional block is a return link P/L 1210 in public safety band for foreground communications. There are four Rx elements D1, D2, D3, and D4 1212; each of which is connected by a LNA, a BFP, and an up-converter 1211 to Ku band. There are no beam-forming processors on board for antennas at cell phone frequencies. The four received signals, up-converted from the 4 Rx subarrays are FDM multiplexed 1215 into a single stream 1101, which is then power amplified and transmitted to a ground facility 4 via a 4-element Retrodirective Ku/Ka array 1100.

Figure 12B:
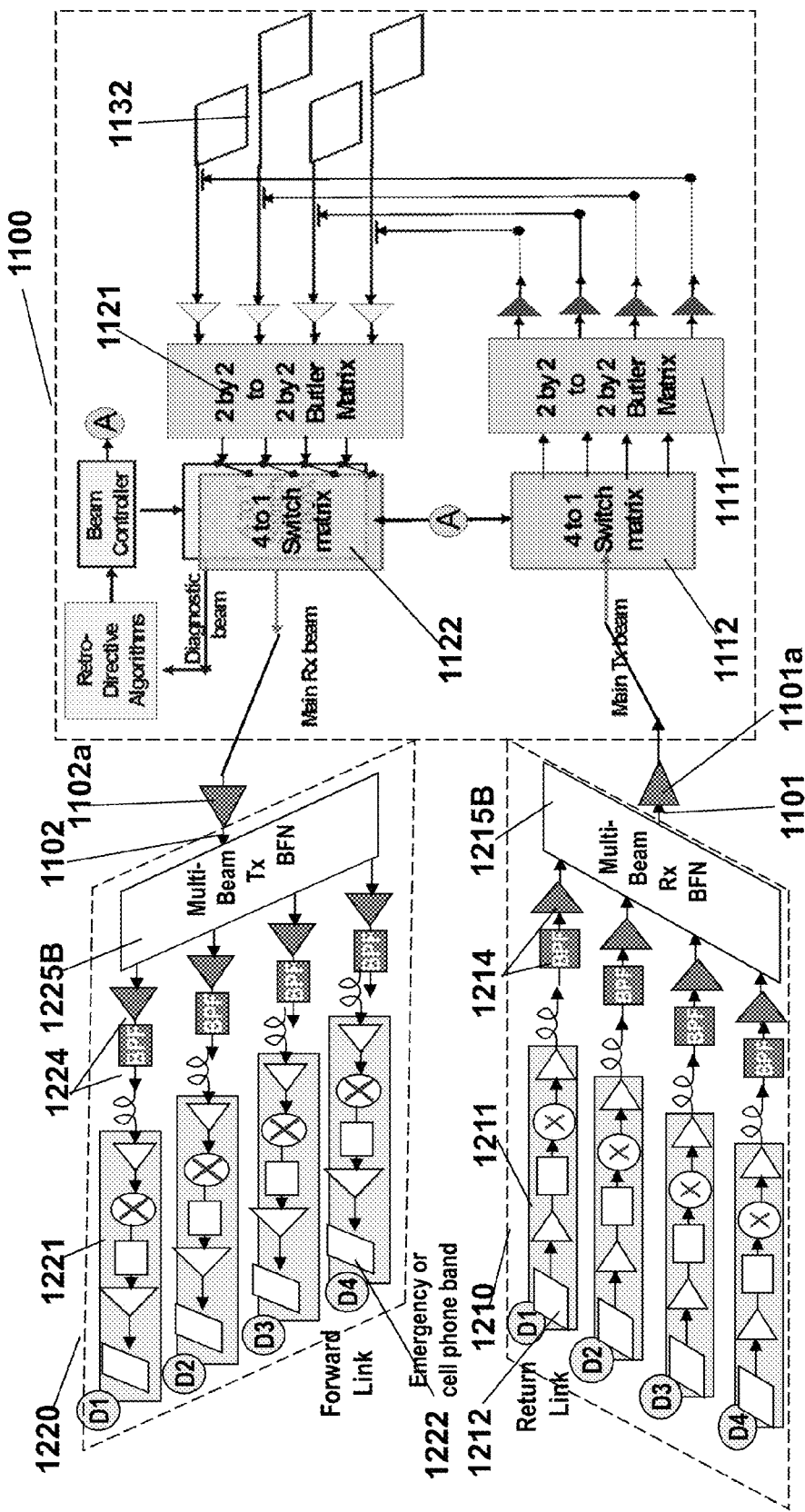
FIG. 12b depicts inter-connectivity among three functional blocks of mobile communication architecture via a UAV with 4-element array in feeder-links and GBBF; (1) on board return link payload with on-board beam forming network and feeder-link payload, (2) ground processing facility but without ground based beam forming, and (3) on board feeder-link payload and forward link payload with onboard beam-forming network. The first level functional details of all three functional blocks are illustrated. On-board feeder links are implemented by a 4-element retro-directive antenna.

FIG. 12b is a simplified block diagram for a communications payload (P/L) on a UAV for the communications at 4.9 GHz emergency band among the rescue team members. It is for on-board beam forming almost identical to those in FIG. 12A, except 1. A on-board multi-beam Tx beam forming network (BFN) 1225B replacing a FDM demuxer 1225 for the foreground communications in public safety band 2. A on-board multi-beam Rx beam forming network (BFN) 1215B replacing a FDM muxer 1215 for the foreground communications in public safety band End of Embodiment 4

Embodiment 5

This embodiment presents architectures and methods of implementing UAV based communications with retrodirective antennas, ground based beam forming (GBBF), and WF muxing demuxing for feederlink equalizations. Equalizations comprise of calibrations and compensation for differential phases and amplitudes incurred to signals propagating through multiple paths. Several scenarios are presented as following;
1. With GBBF and with retro-directive and onboard adaptive forward link equalization/optimization loop before WF demuxer in FIG. 13a;
2. Associated ground processing in FIG. 13b;
3. With GBBF and with retro-directive and on-ground adaptive forward link equalization/optimization loop before WF demuxer in FIG. 14a;
4. Associated ground processing in FIG. 14b;
5. DBFs in Ground processing facility in FIG. 15.

Figure 13A:
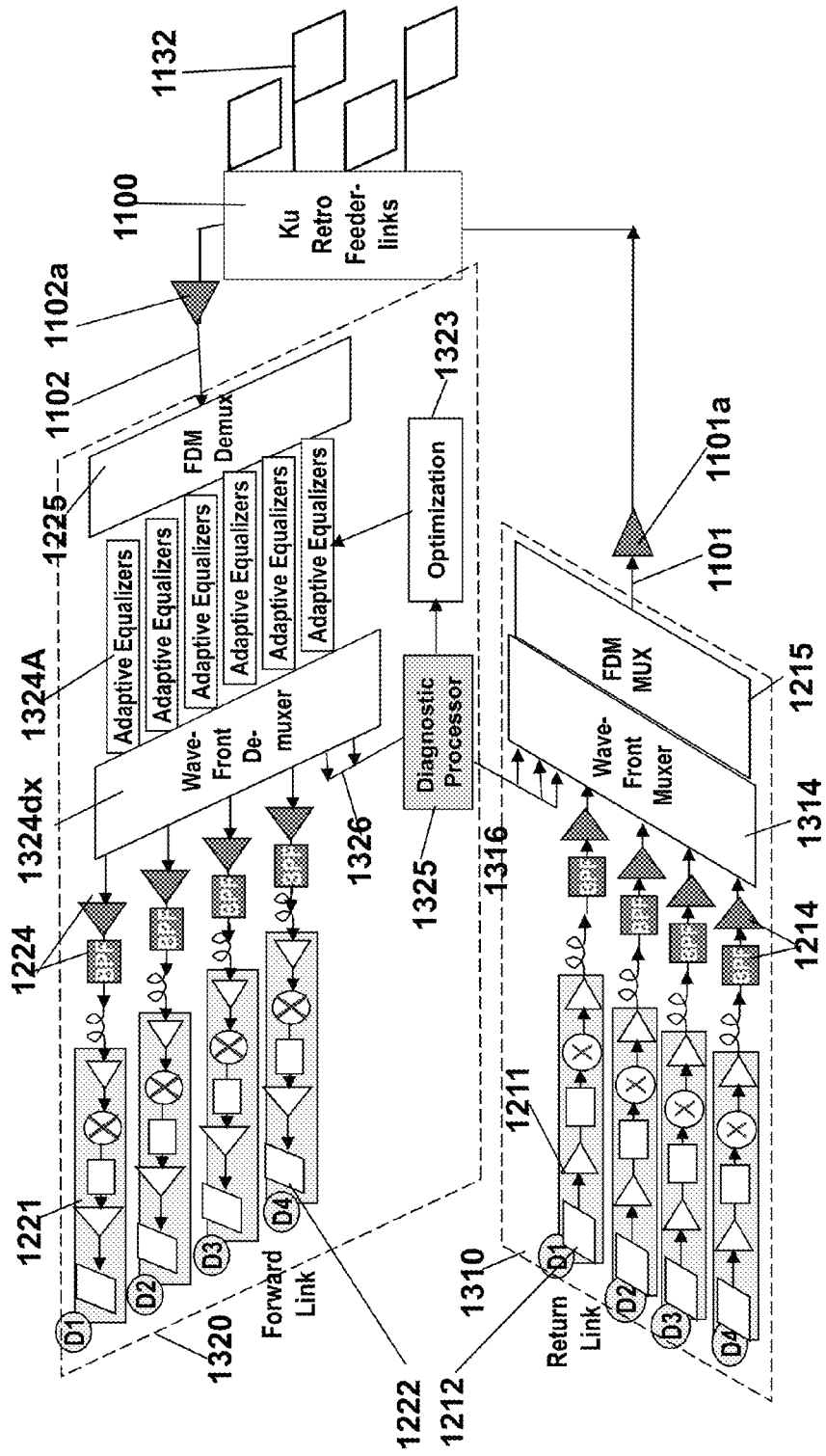
FIG. 13a depicts two on board functional blocks of mobile communication architecture with GBBF via a UAV with 4-element array in feeder-links similar to FIG. 12a. The additions to FIG. 12a are feeder-link calibration and compensation mechanisms via Wavefront muxing/demuxing for both forward and return links. (a) on board return link payload and feeder-link payload with on-board optimization for forward link, and (b) on board feeder-link payload and forward link payload. On-board feeder links are implemented by a 4-element retro-directive antenna.

FIG. 13a is a simplified block diagram for a communications payload (P/L) on a UAV for the communications at 4.9 GHz emergency band among the rescue team members. It is for Ground based beam forming (GBBF), same as the functional block diagrams in FIG. 12a, except WF muxing/demuxing techniques are used for feeder-links calibrations and compensations.

There are three major functional blocks; from top left and clockwise:
1. forward link transmitting (Tx) payload 1320 at public safety bands for foreground communications,
2. feeder-link payload 1100
   i. forward link receiving (Rx) payload at Ku/Ka band for feeder-link communications and
   ii. return link transmitting (Tx) payload at Ku/Ka band for feeder-link communications, and
3. return link receiving (Rx) payload 1310 at public safety bands for foreground communications.

In the first major functional block on the top right for the forward link transmitting (Tx) payload 1320 at public safety band, as an example, for foreground communications; signals flow from right to left. The up-linked element signals 1102 received by the on board Ku array 1100 feature "element signals" properly processed by a GBBF designated for the 4 Tx elements 1222 in a public safety band. The uplink signals 1102 have been wavefront-muxed along with diagnostic signals in a GBBN facility, and are uplinked to a UAV via back channel. The received element signals are FDMde-multiplexed 1225 to recover WF muxed signals which are processed by a bank of adaptive equalizers 1324A before connected to a WF demuxer 1324dx. Many outputs of the WF demuxer 1324dx are then frequency down converted, filtered and amplified 1224 before radiated by the 4 Tx subarrays D1, D2, D3, and D4 1222. There are no on board beam forming processing at public safety bands at all. Some of the outputs 1326 of the WF demuxer 1324dx are recovered diagnostic signals 1326 which will be processed by a diagnostic processor 1325 to map the recovered diagnostic signals into cost functions which must be positively defined individually. Total cost as sum of all cost functions are used by an optimization process 1323 iteratively based on a cost minimization algorithm in estimating a set of new weightings for the adaptive equalizers 1324A in each iteration. When fully equalized the total cost for the current optimization shall become less than a small positive threshold.

The second functional block depicted on the right side is the 4-element Retro directive antenna array at Ku/Ka band 1100.

The $3^{rd}$ functional block is a return link P/L 1310 in public safety band for foreground communications. There are four Rx elements D1, D2, D3, and D4 1212; each of which is connected by a LNA, a BFP, and an up-converter 1211 to Ku band. There are no beam-forming processors on board for antennas at public safety frequencies. The four received element signals after amplified and frequency up-converted to a common IF frequency band are connected to many input slices of a WF muxer 1314. A few probing signals 1316 are also connected to many of the remaining slices of the WF muxer 1314 as diagnostic signals. The outputs, or the wavefront component (wfc) ports, are connected to a FDM mux 1215 with an output of muxed single stream signals 1101, which is then power amplified and transmitted via a 4-element Retrodirective Ku/Ka array 1100 to a ground facility 1310 shown in FIG. 13B.

The forward link Tx payload and associated return link Rx payload for foreground communications may be in L/S band mobile communications band, 2.4 GHz ISM band, or other frequency bands.

Figure 13B:
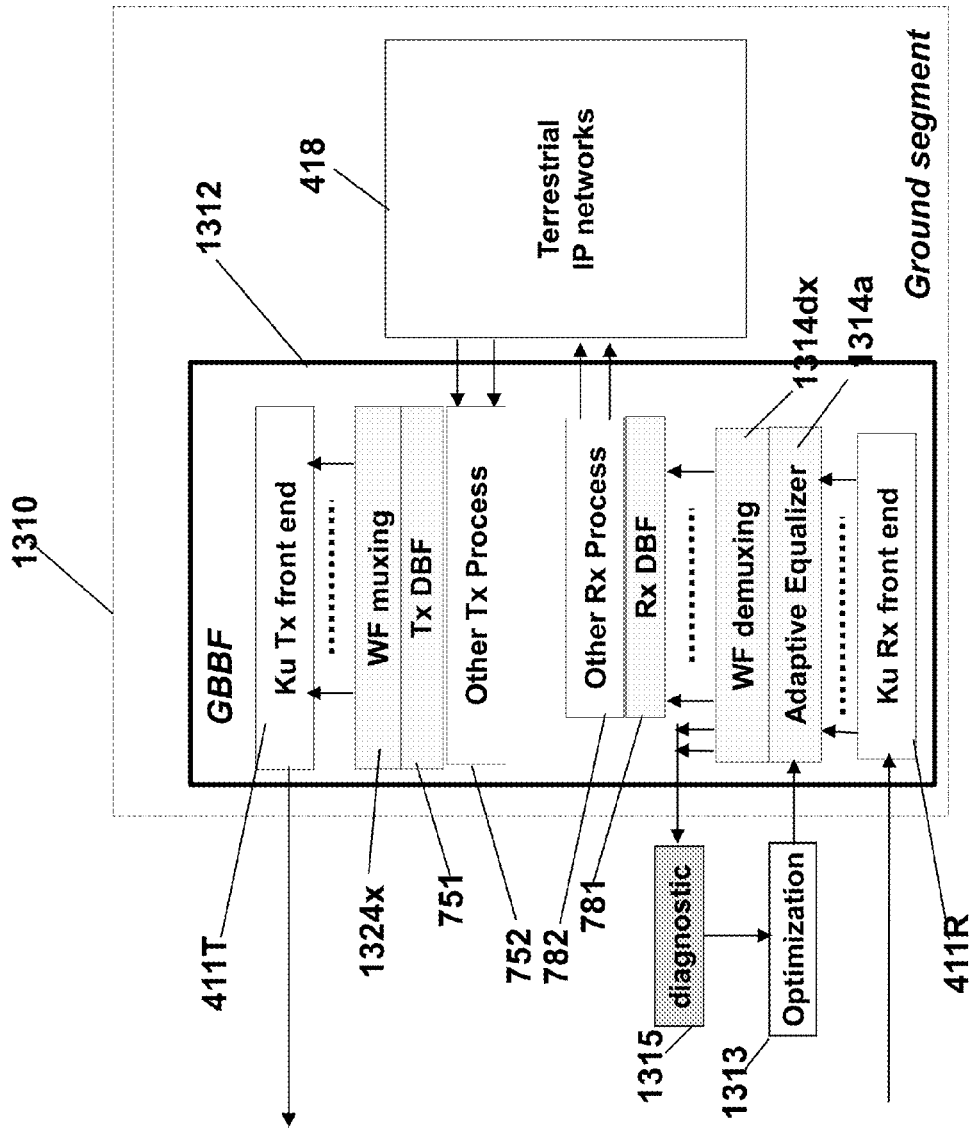
FIG. 13b depicts a functional blocks of mobile communication architecture with GBBF for ground processing facility with calibration and compensation mechanisms via Wavefront muxing/demuxing for both forward and return links. An optimization loop for return link WF demuxing is on-ground.
Figure 14A:
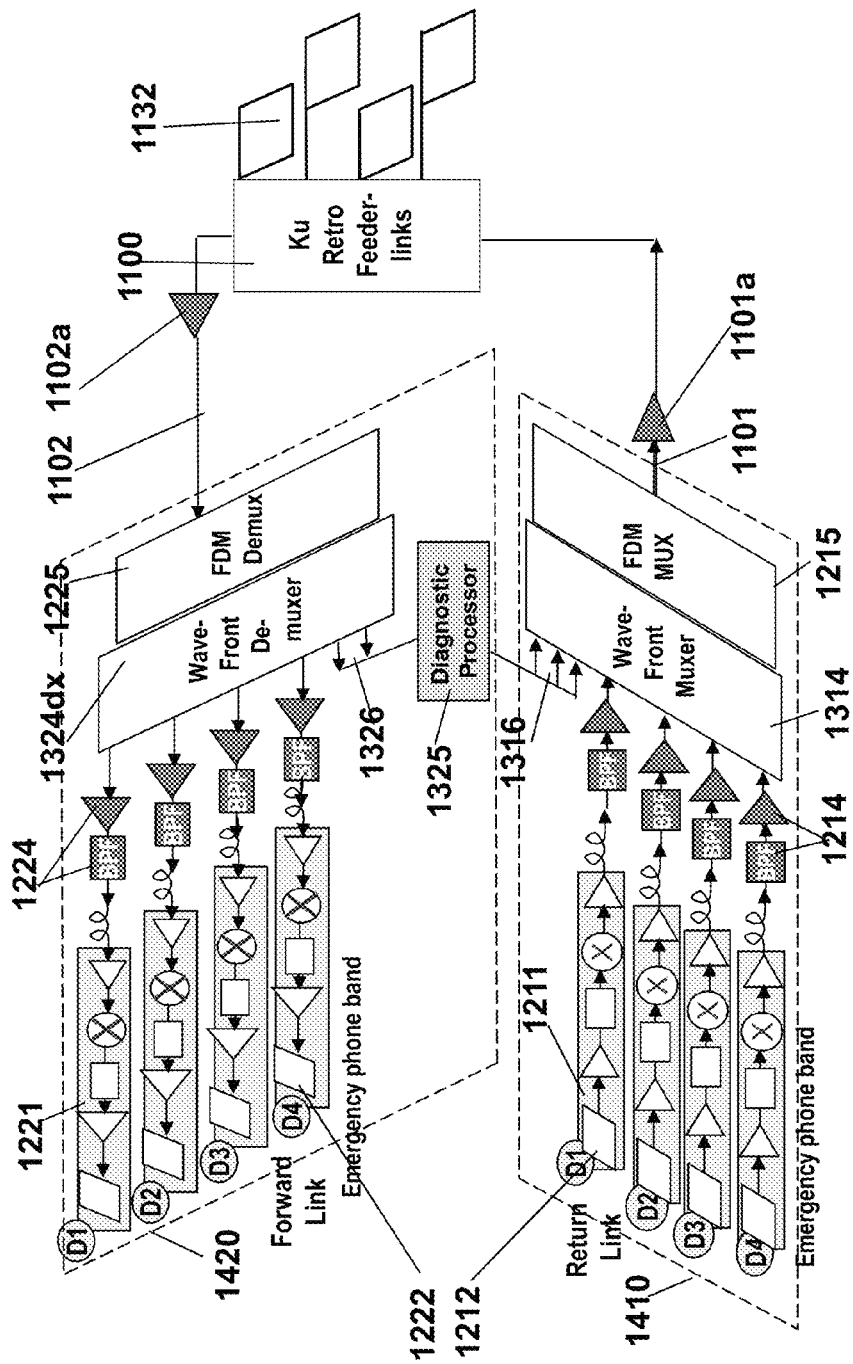
FIG. 14a depicts two on board functional blocks of mobile communication architecture with GBBF via a UAV with 4-element array in feeder-links similar to FIG. 12a. The additions to FIG. 12a are feeder-link calibration and compensation mechanisms via Wavefront muxing/demuxing for both forward and return links; (a) on board return link payload and feeder-link payload without on-board optimization for forward link, and (b) on board feeder-link payload and forward link payload. On-board feeder links are implemented by a 4-element retro-directive antenna.

FIG. 13b depicts a functional flow diagram for ground processing facility 1310, which include:
1. receiving processing blocks;
   a. Ku receiving (Rx) frontend 411R,
   b. WF demuxing 1314dx and associated adaptive equalizer 1314a
      i. an iterative optimization loop with a diagnostic unit 1315 and an optimization processor 1313
      ii. for equalization of feederlink in return link directions,
   c. Rx DBF 781,
   d. other Rx functions including gateway functions 782 interfacing with terrestrial networks 418 WF,
2. transmit processing blocks;
   a. other transmitting (Tx) functions including gateway functions 752 interfacing with terrestrial networks 418 WF,
   b. Tx DBF 751
   c. WF muxing 1324x, and
   d. Ku band transmitting (Tx) frontend 411T FIG. 14a is a simplified block diagram for a communications payload (P/L) on a UAV for the communications at 4.9 GHz emergency band among the rescue team members. It is for Ground based beam forming (GBBF), same as the functional block diagrams in FIG. 13A, except the adaptive equalization for the WF demuxing 1324dx are used for performed on ground as a pre-compensation scheme.

There are three major functional blocks; from top left and clockwise:
1. forward link transmitting (Tx) payload 1420 at public safety bands for foreground communications,
2. feeder-link payload 1100
   iii. forward link receiving (Rx) payload at Ku/Ka band for feeder-link communications and
   iv. return link transmitting (Tx) payload at Ku/Ka band for feeder-link communications, and
3. return link receiving (Rx) payload 1410 at public safety bands for foreground communications.

In the first major functional block on the top right for the forward link transmitting (Tx) payload 1420 at public safety band, as an example, for foreground communications; signals flow from right to left. The up-linked element signals 1102 received by the on board Ku array 1100 feature "element signals" properly processed by a GBBF designated for the 4 Tx elements 1222 in a public safety band. The uplink signals 1102 have been wavefront-muxed along with diagnostic signals in a GBBN facility, and are up-linked to a UAV via back-channels (in feederlink). The received element signals are FDMde-multiplexed 1225 to recover WF muxed signals which are connected to a WF demuxer 1324dx. Many outputs of the WF demuxer 1324dx are then frequency down converted, filtered and amplified 1224 before radiated by the 4 Tx elements (or subarrays) D1, D2, D3, and D4 1222. There are no on board beam forming processing at public safety bands at all.

Some of the outputs 1326 of the WF demuxer 1324dx are recovered diagnostic signals 1326 which will be processed by a diagnostic processor 1325 to map the recovered diagnostic signals into cost functions which must be positively defined individually. Processed diagnostic signals and/or derived cost functions will be relayed back to the ground processing facility via additional input slices 1316 of a WF muxer 1314 which is installed for the return link calibrations.

Total cost as sum of all cost functions are used by an optimization process 1323 (in the processing facility) in estimating a set of new weightings for the adaptive equalizers 1324A in each iteration. The iterative optimization processing is based on a cost minimization algorithm. When fully equalized, the total cost for the current optimization shall become less than a small positive threshold.

The second functional block depicted on the right side is the 4-element Retro directive antenna array at Ku/Ka band 1100.

The $3^{rd}$ functional block is a return link P/L 1410 in public safety band for foreground communications. There are four Rx elements D1, D2, D3, and D4 1212; each of which is connected by a LNA, a BFP, and an up-converter 1211 to a common IF or Ku band. There are no beam-forming processors on board for the antenna elements 1212 at public safety frequencies. The four received element signals after amplified and frequency up-converted to a common IF frequency band are connected to many input slices of a WF muxer 1314. A few probing signals 1316 are also connected to many of the remaining slices of the WF muxer 1314 as diagnostic signals. The outputs, or the wavefront component (wfc) ports, are connected to a FDM mux 1215 with an output of muxed single stream signals 1101, which is then power amplified and transmitted via a 4-element Retrodirective Ku/Ka array 1100 to a ground facility 1310 shown in FIG. 14B. The diagnostic signals 1316 will include information (derived data and/or received diagnostic waveforms 1326) on the feederlink uplink status.

The forward link Tx payload and associated return link Rx payload for foreground communications may be in L/S band mobile communications band, 2.4 GHz ISM band, or other frequency bands.

Figure 14B:
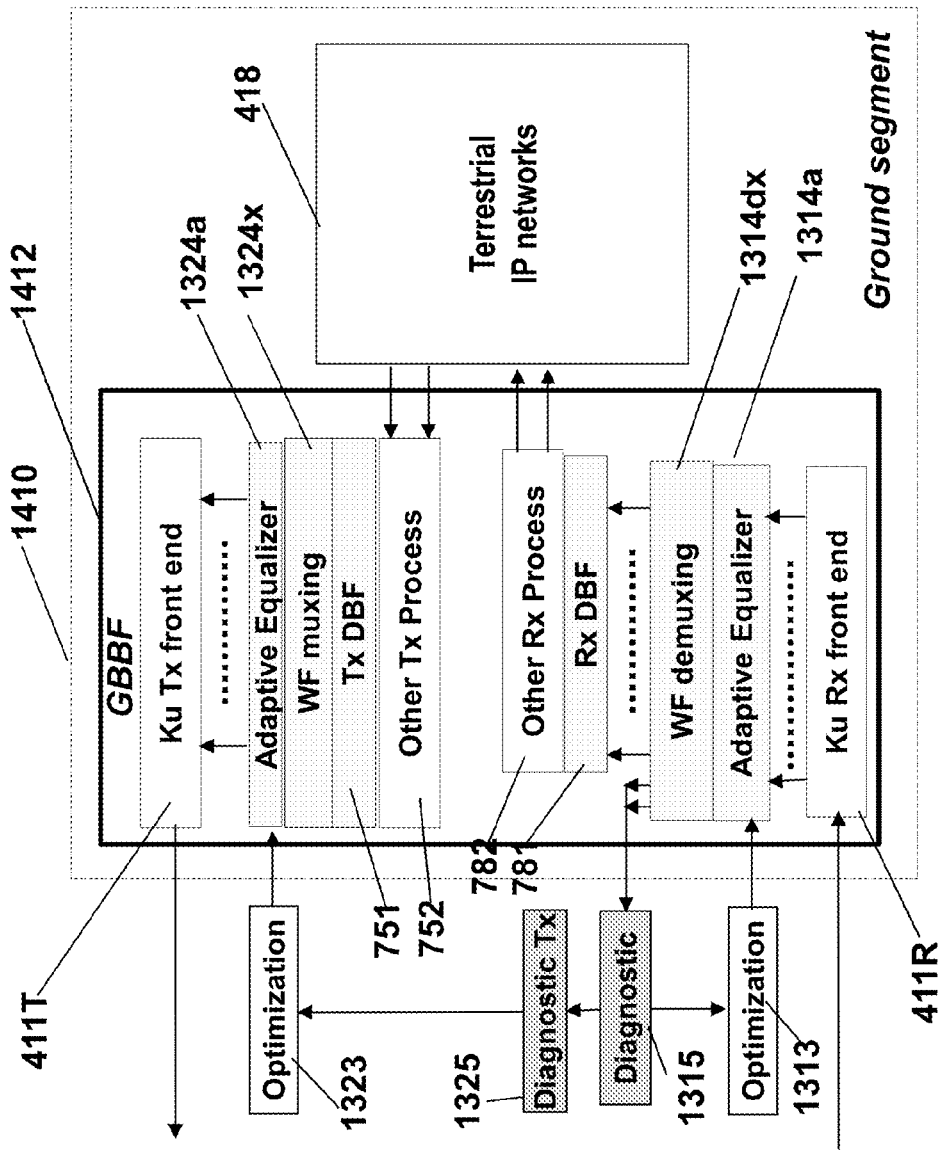
FIG. 14b depicts a functional blocks of mobile communication architecture with GBBF for ground processing facility with calibration and compensation mechanisms via Wavefront muxing/demuxing for both forward and return links. An optimization loop for forward link WF demuxing is implemented on-ground as pre-distortion techniques for differential phase and amplitude equalizations. A separated optimization loop for return link WF demuxing is also implemented on-ground.

FIG. 14b depicts a functional flow diagram for ground processing facility 1310, which include:
1. receiving processing blocks;
   i. Ku receiving (Rx) frontend 411R,
   ii. WF demuxing 1314dx and associated adaptive equalizer 1314a
      a. an iterative optimization loop with a diagnostic unit 1315 and an optimization processor 1313
      b. for equalization of feederlink in return link directions, iii. Rx DBF 781,
and
iv. other Rx functions including gateway functions 782 interfacing with terrestrial networks 418;
and
2. transmit processing blocks;
   i. other transmitting (Tx) functions including gateway functions 752 interfacing with terrestrial networks 418,
   ii. Tx DBF 751
   iii. WF muxing 1324x,
      a. an iterative optimization loop with a remote diagnostic Tx unit 1325 on UAV, relayed on-board information via 1315 and an optimization processor 1323
      b. for adaptive equalizers 1324a of feederlink in forward link directions, and
   iv. Ku band transmitting (Tx) frontend 411T

Figure 15:
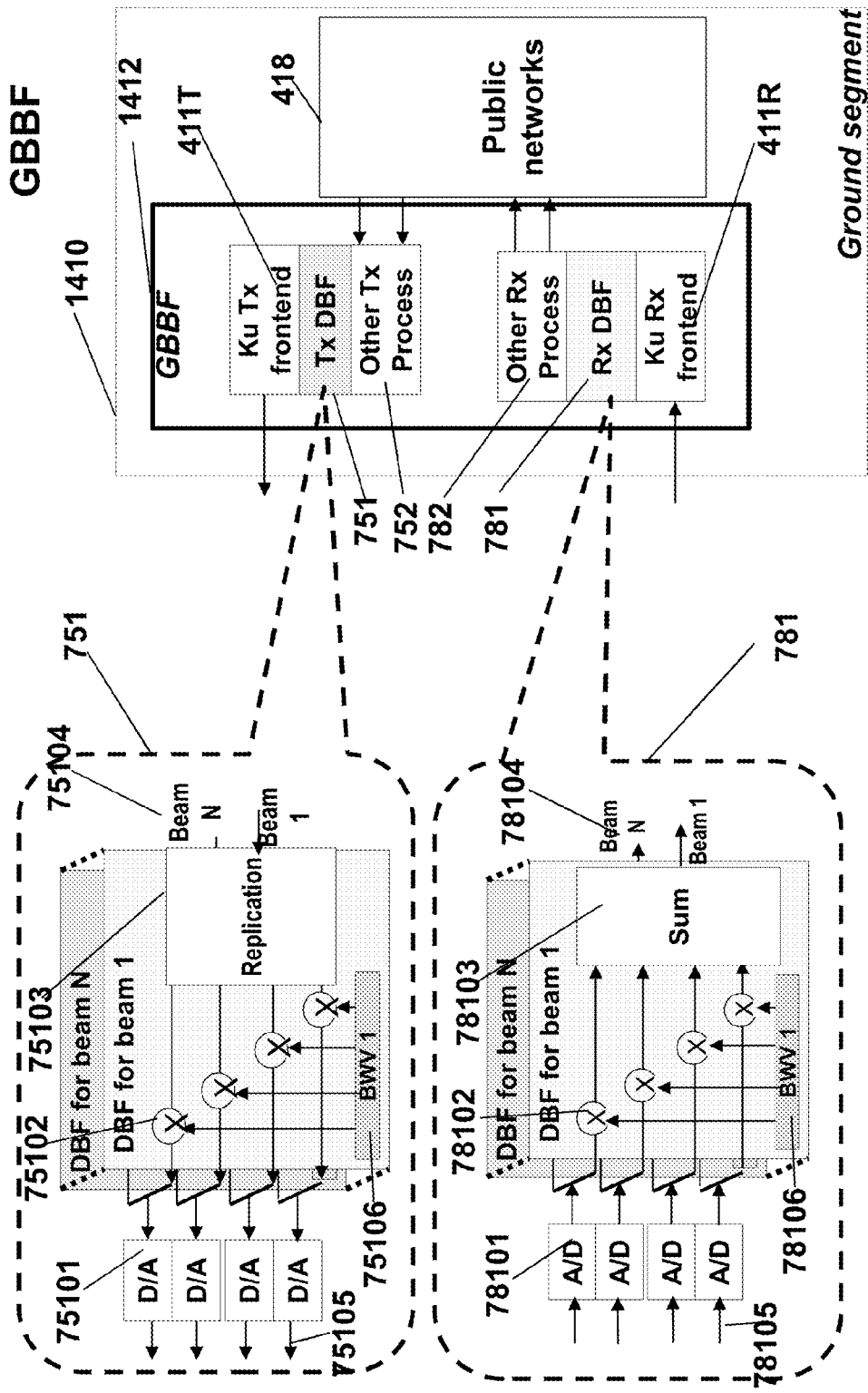
FIG. 15 depicts functional block diagrams of two digital beam forming (DBF) processors in a GBBF for ground processing facility; one for a multiple-beam transmitting (Tx) DBF and the other one for a multiple-beam receiving (Rx) DBF.

FIG. 15 depicts an Rx DBF processing 781 and a Tx DBF processing 751 in a GBBF facility 1412. The recovered baseband element signals 78105 by Ku Rx frontends 411R are converted to digital formats by a bank of A/Ds 78101, and replicated into N sets; each for a Rx beam which is characterized by a unique beam weight vector (BWV) 78106. Each of the element signals is weighted in real time through a complex multiplier 78102 by a complex component of the BWV 78106. The weighted sum of received element signals by a summer or combiner 78103 becomes one of the N beam outputs 78104 of a real time Rx beam specified by a BWV and the current array Geometry on the UAV. These N beam outputs 78104 are then sent for further receiving process 782 such as channelization, synchronization and demodulations before delivered to destinations including users connected via public network 418.

For the Tx DBF processing 751, the signals flows are reversed. Signals from different sources are modulated, multiplexed, and grouped into multiple beam signals 752 designated to various beam positions to be delivered by the foreground communications Tx array 1222 on a UAV. Each beam signal after replicated into M copies or divided by a 1 to M divider 75103 is weighted respectively by m components of a BWV 75106. The weightings are carried out by M complex multipliers 75102. For N Tx beams there are N sets of weighted m element signals. The final set of the m element signals, as summations of the N sets of the individually weighted m element signals, are then converted to analogue formats by D/As 75101 before frequency up-converted and power amplified by Ku Tx front end 411T.

End of Embodiment 5

Figure 16:
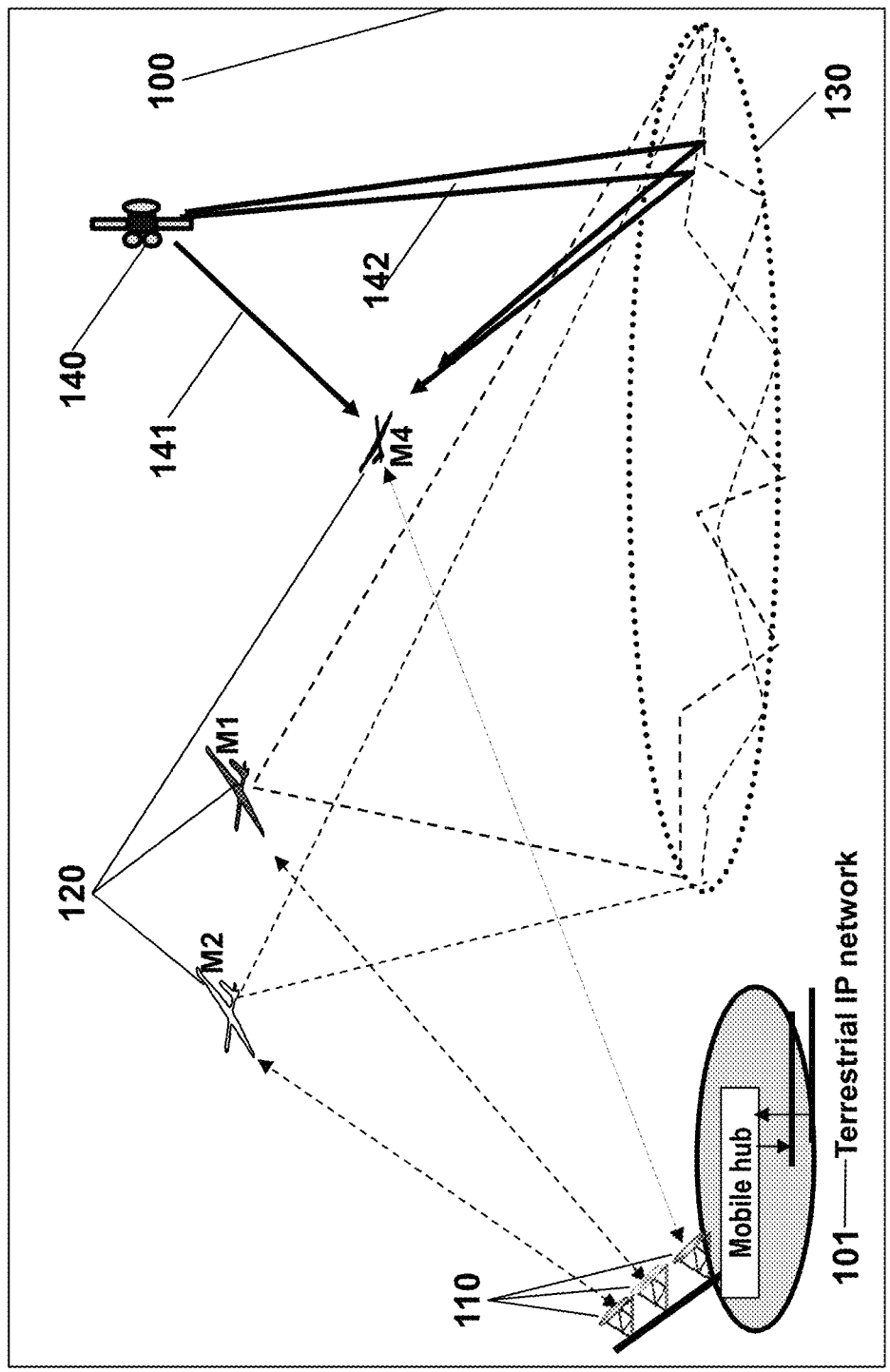
FIG. 16 features a slight deviation of FIG. 1; depicting a scenario of using three separated UAVs as three mobile platforms for emergency and disaster recovery services; UAV M1 for communications among rescue team members, UAV M2 for communications as emergency replacements of mobile and/or fixed wireless base stations for resident communications via their existing mobile phones and/or personal communications devices using WiFi. UAV M4 for surveillances via RF sensors using satellites as RF illuminators.

FIG. 16 features a small deviation for FIG. 1; depicting a scenario of using three separated UAVs 120 as three mobile platforms for emergency and disaster recovery services; UAV M1 for communications among rescue team members, UAV M2 as emergency replacements of mobile and/or fixed wireless base stations for resident communications via their existing mobile phones and/or personal communications devices using wifi. The third UAV platform M4 performs real time imaging and surveillances via passive RF sensors including bi-static Radars using satellite RF radiations as RF illumination sources.

All three platforms are connected to a ground hub 110 via feeder-links in Ku and/or Ka band spectrum. The ground hub 110 will serve as gateways and have access to terrestrial networks 101. As a result, rescue works in a coverage area 130 will have access to real time imaging, and communications among co-workers and dispatching centers connected by the hub 110. Residents in disaster/emergency recovery areas 130 will also be provided with ad hoc networks of communications via their own personal devices to the outside world, to rescue teams, and/or disaster/emergency recovery authorities.

The feeder-links of the three platforms M1, M2, and M4 are identical in Ku and/or Ka bands. Only the three payloads (P/L) are different; the P/L on the first UAV M1 enables networks for communications in public safety spectrum among members of rescue team; the P/L on the second UAV M2 is to restore resident cell phone and/or fixed wireless communications at L/S band, and the P/L on the third UAV M4 is an RF imaging sensor for real time surveillance.

Three independent technologies are discussed; (1) retro-directive array, (2) ground based beam forming, and (3) wavefront multiplexing and demultiplexing (WF muxing/demuxing). Retro-directive links for feeder-links are to make the feeder links payload on UAVs to communicate with designated ground hubs more effectively, using less power, reaching hubs in further distances, and/or more throughputs.

RF payloads may feature passive sensors such as RF radiometers or bi-static Radar receivers; both of which will feature architectures of ground based beam forming (GBBF), or remote beam forming (RBF), for UAV platforms 120-M4 supporting and accomplishing designed missions using P/L with smaller SW&P. Multiple tracking beams from a Radar receiving array will be formed via a GBBF facility (not shown but similar to the one 412 in FIG. 4) in the mobile hub 110. Dynamic diagnostic beams from UAV M4 may be used to facilitate the missions.

For the functions of bi-static radar receivers, the UAV M4 shall feature capabilities of capturing RF radiations from a satellite 140 via a direct path 141 and also those reflected by earth surfaces and objects on or near earth surface via reflective paths 142. Correlations between the radiations from the direct path 141 and those from reflected paths provide the discriminant information on the targeted reflective surfaces near or on the earth surface. Thus the images of the RF reflected surfaces are derived.

Many M4 may be deployed concurrently. There are many choices for the selections of RF radiations from illuminating satellites, such as the satellite 140, for various bi-static Radar applications. RF radiations at L-band from GNSS satellites at medium earth orbit (MEO) or Geo-synchronous earth orbit (GEO) may be selected by our UAV M4 for global coverage. L/S band radiations from Low-Earth Orbit (LEO) communications satellites shall be considered as candidates. Strong Ku band radiations from many direct TV broadcasting satellite radiations or S-band Satellite Digital Audio Radios (SDARS) from satellites in GEO or inclined orbits may be used for land mass or near land mass coverage. Ka band spot beams near equatorial coverage from MEO/GEO satellites, C-band near global coverage from GEO satellite, UHF global coverage, and Ku band regional coverage may also be used concurrently for special missions using various radiations at multiple spectrums from different satellites reflected from same image coverage. These techniques are based on correlations among signals from two paths; the direct path signals as references for "Radar illuminations", and reflected radiations as Radar returns from targeted areas or volumes near the earth surfaces.

Multiple received signals from the array elements of the array on the UAV M4 will be sent to the GBBF facility via back channels in a feeder link. Wavefront multiplexing and demuxing techniques will be applied for UAV M4, among many other applications for calibrating back channels in feeder-links, enabling a simple and cost effective GBBF.

GBBF architectures are used for illustrations in here. However, similar RBF architecture shall be developed for the platforms which may be mobile, re-locatable, fixed, and/or combinations of all above to perform remote beam forming functions.

The special features for the communications P/L's on UAVs are highlighted below.

a. Retro-directivity for Ku feeder links

Ku-band arrays are used for UAVs as feeder link antennas to transfer all signals to and from L/S or C-band elements channels to a gateway where a GBBF processing will perform both Tx and Rx array functions including beam forming, beam steering, beam shaping, null steering, and/or null broadening for multiple concurrent beams. The Ku band "smart" arrays will feature retro-directivity via on-board analogue beam forming network (BFN) and beam controller technologies. The 3-dB beam widths are allocated less than 50° for a 2 dimensional 4-element array with element spacing ~0.5 wavelengths.

b. Remote beam forming network (RBFN) or ground based beam forming (GBBF).

c. Digital beam forming (DBF) will be implemented remotely using FPGAs and PCs in the GBBF processing located at the gateway facility. The processing will perform far field beam forming for foreground arrays on UAVs. A single gateway will support multiple UAVs; at least one for communications network at 4.9 GHz for rescue teams; the other one for community in disaster areas, using existing cell phone bands. The UAVs for the local community operating at commercial cell-phone bands, and is to replace cell towers which may have been damaged by the disaster.

d. Wavefront multiplexing/demultiplexing (WF Muxing/demuxing).

WF muxing/demuxing transformations feature two unique characteristics; (1) orthogonality among WF vectors, and (2) redundancy and signals security. The first characteristics are utilized for (a) back-channel calibrations on feeder-link transmission for RBFN/GBBF, and (b) coherent power combining in receivers on signals from different channels on various UAV. The second characteristics are used for (c) secured transmissions with redundancies via UAVs.

Furthermore, in most our examples, multiple communication channels in frequency domain as Frequency division multiplexed (FDM) channels and/or same frequency on various platforms (space division multiplexed) channels have been illustrated. WF muxing/demuxing may be implemented via concurrent channels in other conventional multiplexed channels such as TDM, CDM, or combinations of all above.

e. Continuous Calibration Capability in GBBF

Ground processing must have "current knowledge" of the geometry, location, and orientation of the array on board an air platform. Based on that, a real time continuous calibration capability is designed to compensate for effects caused by propagation variations, dynamic array geometry, unbalanced electronic channels, and/or aging electronics. The calibration will include adjustments on time delays, amplitudes and phases among the subarrays through modifications and adjustment on beam weight vectors (BWVs) obtained through real time optimization process. They are highly dependent on the array geometries.

f. Cross-Correlation Techniques

These techniques facilitate the calibration significantly improving efficiencies on equalizing multiple signal channels for various beam positions. With continuous calibration capability for distributed dynamic arrays, the precision knowledge of slow varying subarray positions and orientations may be relaxed significantly.

What is claimed is:

1. A communications system for providing recovery communication service to users in a coverage area affected by an emergency disruption of normal communication services, the system comprising:
    a ground hub serving as a gateway to terrestrial networks including a dispatch center, the ground hub being configured to communicate with at least three mobile airborne platforms roving over the coverage area via respective feeder-links in a Ku or Ka band;
    a first mobile airborne platform of the at least three mobile airborne platforms, configured to communicate in a first frequency band with emergency workers that are working in the coverage area and associated with the dispatch center;
    a second mobile airborne platform of the at least three mobile airborne platforms, configured to communicate, in place of at least one disrupted base station in the coverage area, with user mobile phones in mobile phone frequency bands or user personal devices in WiFi bands located in the coverage area; and
    a third mobile airborne platform of the at least three mobile airborne platforms, configured to generate real-time imaging of surfaces located in the coverage area,
    wherein the ground hub comprises:
    a remote beam forming network to transform source signals into beam signals;
    a wavefront multiplexer coupled to the remote beam forming network, the wavefront multiplexer performing a wavefront multiplexing transformation on input signals that include the beam signals and known diagnostic signals and generating wavefront multiplexed signals;
    a bank of adaptive filters coupled to the wavefront multiplexer to equalize the wavefront multiplexed signals; and
    an optimization unit coupled to the bank of adaptive filters to modify weightings of the adaptive filters based on differences between the known diagnostic signals and recovered diagnostic signals received from one of the at least three airborne platforms via a respective feeder-link.

2. The communications system of claim 1, wherein the ground hub comprises a remote beam forming network to provide remote beam forming for each of the at least three mobile airborne platforms.

3. The communications system of claim 1, wherein each of the at least three mobile airborne platforms comprises a retrodirective antenna system for transmitting and receiving in the Ku or Ka band.

4. The communications system of claim 1, wherein one of the at least three mobile airborne platforms comprises:
    an antenna system to receive a signal from the ground hub via a respective feeder-link;
    a receive frontend system coupled to the antenna system to condition the signal;
    a frequency demultiplexing system coupled to the receive frontend system to frequency down convert and demultiplex the conditioned signal and generate baseband signals; and
    a wavefront demultiplexer coupled to the frequency demultiplexing system to perform a wavefront demultiplexing transformation on the baseband signals and generate wavefront demultiplexed signals including recovered beam signals and recovered forward-link diagnostic signals.

5. The communications system of claim 1, wherein the ground hub further comprises:
a first antenna system for receiving a signal from one of the first and second mobile airborne platforms;
a receive frontend system coupled to the antenna system to condition the signal;
a frequency demultiplexing system coupled to the receive frontend system to frequency down convert and demultiplex the conditioned signal and generate baseband signals;
a bank of adaptive filters coupled to the frequency demultiplexing system to equalize the baseband signals;
a wavefront demultiplexer coupled to the bank of adaptive filters to perform a wavefront demultiplexing transformation on the baseband signals and generate wavefront demultiplexed signals including recovered element signals and recovered return-link diagnostic signals;
a receive digital beam forming network coupled to the wavefront demultiplexer to convert the recovered element signals to beam signals; and
a return-link optimization unit coupled to the wavefront demultiplexer and the bank of adaptive filters to modify weightings of the adaptive filters based on at least differences between the recovered diagnostic signals and known diagnostic signals.

6. The communications system of claim 5, wherein each of the first and second mobile airborne platforms comprises:
a second antenna system to capture signals radiated from the coverage area and generate captured signals;
low-noise amplifiers coupled to the second antenna system to amplify the captured signals;
frequency converter units coupled to the low-noise amplifiers to frequency-convert the amplified captured signals and generate element signals;
a wavefront multiplexer coupled to the frequency converter units, the wavefront multiplexer performing a wavefront multiplexing transformation on input signals that include the element signals, the known diagnostic signals, and recovered forward-link diagnostic signals that are previously obtained from a forward-link calibration, and generating wavefront multiplexed signals;
a frequency multiplexing system coupled to the wavefront multiplexer to transform the wavefront multiplexed signals into at least one frequency multiplexed signal;
a transmit frontend system coupled to the frequency multiplexing system to frequency up-convert and amplify the at least one frequency multiplexed signal and generate at least one amplified signal; and
a third antenna system coupled to the transmit frontend system to receive and radiate the at least one amplified signal.

7. The communications system of claim 1, wherein the third mobile airborne platform is configured to perform a radar function.

8. The communications system of claim 1, wherein the at least three mobile airborne platforms comprise a group of fourth mobile airborne platforms including the third mobile airborne platform to generate real-time imaging of the surfaces, the group of fourth mobile airborne platforms is configured to perform multi-static radar functions.

9. The communications system of claim 1, wherein the third mobile airborne platform comprises a bi-static radar receiver to capture radio-frequency radiations originated from a satellite via a direct path and via reflected paths from the surfaces located in the coverage area.

10. The communications system of claim 9, wherein the satellite is one of communications satellites and direct broadcasting satellites.

11. The communications system of claim 9, wherein the ground hub comprises a remote beam forming network to remotely form beams for the bi-static radar receiver.

12. The communications system of claim 1, wherein the third mobile airborne platform comprises at least one of optical sensors, infrared sensors, microwave sensors.

13. A communications system for providing recovery communication service to users in a coverage area affected by an emergency disruption of normal communication services, the system comprising:
a ground hub serving as a gateway to terrestrial networks including a dispatch center, the ground hub being configured to communicate with at least three mobile airborne platforms roving over the coverage area via respective feeder-links in a Ku or Ka band;
a first mobile airborne platform of the at least three mobile airborne platforms, configured to communicate in a first frequency band with emergency workers that are working in the coverage area and associated with the dispatch center;
a second mobile airborne platform of the at least three mobile airborne platforms, configured to communicate, in place of at least one disrupted base station in the coverage area, with user mobile phones in mobile phone frequency bands or user personal devices in WiFi bands located in the coverage area; and
a third mobile airborne platform of the at least three mobile airborne platforms, configured to generate real-time imaging of surfaces located in the coverage area, the third mobile airborne platform comprising a bi-static radar receiver to capture satellite signals originated from a satellite via a direct path and via reflected paths from the surfaces.

14. The communications system of claim 13, wherein the satellite is one of communications satellites and direct broadcasting satellites.

15. The communications system of claim 13, wherein the ground hub comprises a remote beam forming network to remotely form beams for the bi-static radar receiver.

16. The communications system of claim 13, wherein the third mobile airborne platform comprises at least one of optical sensors, infrared sensors, microwave sensors.

17. A communications system for providing real-time imaging of surfaces located in a coverage area affected by an emergency disruption of normal communication services, the system comprising:
a first mobile airborne platform configured to communicate in a first frequency band with emergency workers that are working in the coverage area and associated with a dispatch center;
a second mobile airborne platform configured to communicate, in place of at least one disrupted base station in the coverage area, with user mobile phones in mobile phone frequency bands or user personal devices in WiFi bands located in the coverage area;
a third mobile airborne platform configured to provide real-time imaging of the surfaces located in the coverage area, the third mobile airborne platform comprising a bi-static radar receiver to capture satellite signals originated from a satellite via a direct path and via reflected paths from the surfaces, the satellite being one of communications satellites and direct broadcasting satellites; and a ground hub configured to communicate concurrently and independently with each of the first, second and third mobile airborne platforms via respective feeder-links in a Ku or Ka band.

18. The communications system of claim 17, wherein the ground hub comprises a remote beam forming network to remotely form beams for the bi-static radar receiver.

19. The communications system of claim 17, wherein the third mobile airborne platform comprises at least one of optical sensors, infrared sensors, microwave sensors.

\* \* \* \* \*